United States Patent
Oliner et al.

(10) Patent No.: US 11,748,358 B2
(45) Date of Patent: Sep. 5, 2023

(54) FEEDBACK ON INFERRED SOURCETYPES

(71) Applicant: Splunk, Inc., San Francisco, CA (US)

(72) Inventors: Adam Oliner, San Francisco, CA (US); Eric Sammer, San Francisco, CA (US); Kristal Curtis, San Francisco, CA (US); Nghi Nguyen, Union City, CA (US)

(73) Assignee: Splunk Inc., San Francisco, CA (US)

( * ) Notice: Subject to any disclaimer, the term of this patent is extended or adjusted under 35 U.S.C. 154(b) by 1106 days.

(21) Appl. No.: 16/175,642

(22) Filed: Oct. 30, 2018

(65) Prior Publication Data

US 2020/0104731 A1 Apr. 2, 2020

Related U.S. Application Data

(60) Provisional application No. 62/738,896, filed on Sep. 28, 2018, provisional application No. 62/738,901, filed on Sep. 28, 2018.

(51) Int. Cl.
| | |
|---|---|
| *G06F 16/245* | (2019.01) |
| *G06F 16/2455* | (2019.01) |
| *G06F 40/205* | (2020.01) |
| *G06F 16/248* | (2019.01) |
| *G06N 5/04* | (2023.01) |

(52) U.S. Cl.
CPC ...... *G06F 16/24568* (2019.01); *G06F 16/248* (2019.01); *G06F 16/24564* (2019.01); *G06F 40/205* (2020.01); *G06N 5/04* (2013.01)

(58) Field of Classification Search
CPC ........ G06F 16/248; G06F 40/205; G06N 5/00
See application file for complete search history.

(56) References Cited

U.S. PATENT DOCUMENTS

| | | | |
|---|---|---|---|
| 7,937,344 B2 | 5/2011 | Baum et al. |
| 8,112,425 B2 | 2/2012 | Baum et al. |
| 8,751,529 B2 | 6/2014 | Zhang et al. |
| 8,788,525 B2 | 7/2014 | Neels et al. |
| 9,215,240 B2 | 12/2015 | Merza et al. |

(Continued)

OTHER PUBLICATIONS

Splunk Enterprise 8.0.0 Overview, available online, retrieved May 20, 2020 from docs.splunk.com.

(Continued)

*Primary Examiner* — Li Wu Chang
(74) *Attorney, Agent, or Firm* — Shook, Hardy & Bacon L.L.P.

(57) ABSTRACT

As described herein, a portion of machine data of a message may be analyzed to infer, using an inference model, a sourcetype of the message. The portion of machine data may be generated by one or more components in an information technology environment. Based on the inference, a set of extraction rules associated with the sourcetype may be selected. Each extraction rule may define criteria for identifying a sub-portion of text from the portion of machine data of the message to produce a value. The set of extraction rules may be applied to the portion of machine data of the message to produce a result set that indicates a number of values identified using the set of extraction rules. Based on the result set, at least one action may be performed on one or more of inference data associated with the inference model and one or more messages.

28 Claims, 29 Drawing Sheets

(56) References Cited

U.S. PATENT DOCUMENTS

| | | |
|---|---|---|
| 9,286,413 B1 | 3/2016 | Coates et al. |
| 9,942,228 B2 | 4/2018 | Hauser |
| 10,127,258 B2 | 11/2018 | Lamas et al. |
| 11,038,905 B2 * | 6/2021 | Zadeh .............. H04L 63/1425 |
| 2005/0132053 A1 | 6/2005 | Roth et al. |
| 2006/0053156 A1 | 3/2006 | Kaushansky et al. |
| 2009/0119696 A1 | 5/2009 | Chow et al. |
| 2010/0174881 A1 | 7/2010 | Anglin et al. |
| 2012/0191585 A1 | 7/2012 | Lefebvre et al. |
| 2012/0324123 A1 | 12/2012 | Fox et al. |
| 2015/0278083 A1 | 10/2015 | Hwang et al. |
| 2016/0020945 A1 | 1/2016 | Terwilliger et al. |
| 2017/0031659 A1 | 2/2017 | Burke et al. |
| 2017/0139996 A1 * | 5/2017 | Marquardt .......... G06F 16/2272 |
| 2017/0220633 A1 | 8/2017 | Porath et al. |
| 2017/0243132 A1 | 8/2017 | Sainani et al. |
| 2018/0069917 A1 | 3/2018 | Ge et al. |
| 2018/0192433 A1 | 7/2018 | Duyang et al. |
| 2018/0279016 A1 | 9/2018 | Tang |
| 2019/0007295 A1 | 1/2019 | Hanaoka |
| 2019/0098106 A1 | 3/2019 | Mungel et al. |
| 2019/0342234 A1 | 11/2019 | Belling et al. |
| 2020/0089529 A1 | 3/2020 | Brownsword et al. |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pds/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

| Time 2135 | Host 2136 | Source 2137 | Source Type 2138 | Event 2139 |
|---|---|---|---|---|
| 2131 — 10/10/2000 1:55 p.m. | www1 | access.log | access_combined | 2140  2141  2142<br>127.0.0.1 - frank [10/Oct/2000:13:55:36-0700]<br>"GET /apache.gif HTTP/1.0" 200 2326 0.0947 — 2145<br>2143 |
| 2132 — 10/10/2000 1:56 p.m. | www2 | access.log | access_combined | 127.0.0.1 - bob [10/Oct/2000:13:56:36-0700] "GET/<br>mickey_mouse.gif HTTP/1.0" 200 2980 0.0899<br>2146 |
| 2133 — 10/10/2000 1:57 p.m. | www2 | access.log | access_combined | 127.0.0.1 - carlos [10/Oct/2000:13:57:36-0700]<br>"GET/donald_duck.gif HTTP/1.0" 200 2900 0.0857 |
| 2134 — 10/10/2000 1:58 p.m. | www2 | error.log | apache_error | [Sunday Oct 10 1:58:33 2010] [error] [client<br>127.10.1.1.015] File does not exist: /home/reba/<br>public_html/images/daffy_duck.gif |

Data Summary

| Hosts (5) | Sources (8) | Sourcetypes (3) | | ✕ |

( filter )

| Host ⋄ | | Count ⋄ | Last Update ⋄ |
|---|---|---|---|
| mailsv | ⋅⋅⋅ | 9,829 | 4/29/14 1:32:47.000 PM |
| vendor_sales | ⋅⋅⋅ ⋁ | 30,244 | 4/29/14 1:32:46.000 PM |
| www1 | ⋅⋅⋅ ⋁ | 24,221 | 4/29/14 1:32:44.000 PM |
| www2 | ⋅⋅⋅ ⋁ | 22,595 | 4/29/14 1:32:47.000 PM |
| www3 | ⋅⋅⋅ ⋁ | 22,975 | 4/29/14 1:32:45.000 PM |

INCIDENT REVIEW DATSHBOARD 3310

Incident Review | Actions▾

| Status: | Urgency: high | Owner: | Title: |
| --- | --- | --- | --- |
| Security domain: | Governance: pci | Search: | |

24 hour window ▸
- Last 15 minutes
- Last 60 minutes
- Last 4 hours
- Last 24 hours
- Last 7 days
- Last 30 days
- Last year
- Real-time
- Other
- All time
- Custom time...

*TIME RANGE FIELD 3312*

INCIDENT ATTRIBUTE FIELDS 3311

◂ i 🖶 💾 Save ▾   Linear scale ▾   1 bar = 1 hour   📊 Create ▾

TIMELINE 3313   120   60

✓ 225 matching events

⊟ Hide   🔍 Zoom out   🔍 Zoom to selection   [↻] Deselect 120
60

4:00 AM   6:00 AM   8:00 AM
Sun Aug 26
2012

225 events in a 24 hour window (real-time) (from 11:29:20 AM August 25 to 11:29:20 AM August 26, 2012)

Select all | Unselect all   « prev  1  2  3  4  5  6  7  8  9  10  next »   |   Edit selected events   |   Edit all 225 matching

EVENTS LIST 3314

| Select | Options | Time | Security Domain | Title | Urgency | Status | Owner | |
| --- | --- | --- | --- | --- | --- | --- | --- | --- |
| ☐ | ▶ | 8/26/12 11:11:03.000 AM | Access ▾ | Insecure Or Cleartext Authentication Detected ▾ | ⊙ High ▾ | New ▾ | unassigned ▾ | View details |
| ☐ | ▶ | 8/26/12 11:10:07.000 AM | Access ▾ | Insecure Or Cleartext Authentication Detected ▾ | ⊙ High ▾ | New ▾ | unassigned ▾ | View details |
| ☐ | ▶ | 8/26/12 11:00:39.000 AM | Access ▾ | Account (bilnebry) Deleted On (PROD-POS-001) ▾ | ⊙ High ▾ | New ▾ | unassigned ▾ | View details |
| ☐ | ▶ | 8/26/12 11:00:39.000 AM | Access ▾ | Account (beu) Deleted On (COREDEV-006) ▾ | ⊙ High ▾ | New ▾ | unassigned ▾ | View details |
| ☐ | ▶ | 8/26/12 11:00:39.000 AM | Access ▾ | Account (combs) Deleted On (HOST-005) ▾ | ⊙ High ▾ | New ▾ | unassigned ▾ | View details |
| ☐ | ▶ | 8/28/12 | Access ▾ | Account (wisner) Deleted On (BUSDEV-005) ▾ | ⊙ High ▾ | New ▾ | unassigned ▾ | View details |

US 11,748,358 B2

FEEDBACK ON INFERRED SOURCETYPES

CROSS-REFERENCE TO RELATED APPLICATIONS

This application claims priority to provisional application Ser. No. 62/738,896, filed on Sep. 28, 2018, and titled "Feedback on Inferred Sourcetypes," and to provisional application Ser. No. 62/738,901, filed on Sep. 28, 2018, and titled "Conditional Processing based on Inferred Sourcetypes." The entire contents of each application are hereby incorporated by reference in their entireties for all purposes.

FIELD

At least one embodiment of the present disclosure pertains to one or more tools for facilitating searching and analyzing large sets of data to locate data of interest.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it.

Minimally processing the raw data may include segmenting the raw data into predetermined sized blocks and annotating each block with metadata. In particular, one metadata field may be a sourcetype. When these blocks are searched or otherwise processed, the sourcetype metadata field may be the basis for selecting extraction rules to identify fields in the raw data and/or values of those fields. In order to properly process the raw data and to process the appropriate data (e.g., to provide useful search results), it may be imperative that the sourcetype is assigned, and done so accurately.

BRIEF DESCRIPTION OF THE DRAWINGS

The present disclosure is illustrated by way of example, and not limitation, in the figures of the accompanying drawings, in which like reference numerals indicate similar elements.

FIG. 6C provides a visual representation of the manner in which a pipelined search language or query operates, in accordance with example embodiments.

FIG. 9A is an interface diagram of an example user interface for a search screen, in accordance with example embodiments.

FIG. 9B is an interface diagram of an example user interface for a data summary dialog that enables a user to select various data sources, in accordance with example embodiments.

FIG. 11B is an interface diagram of an example user interface of an incident review dashboard, in accordance with example embodiments.

DETAILED DESCRIPTION

Figure 1:
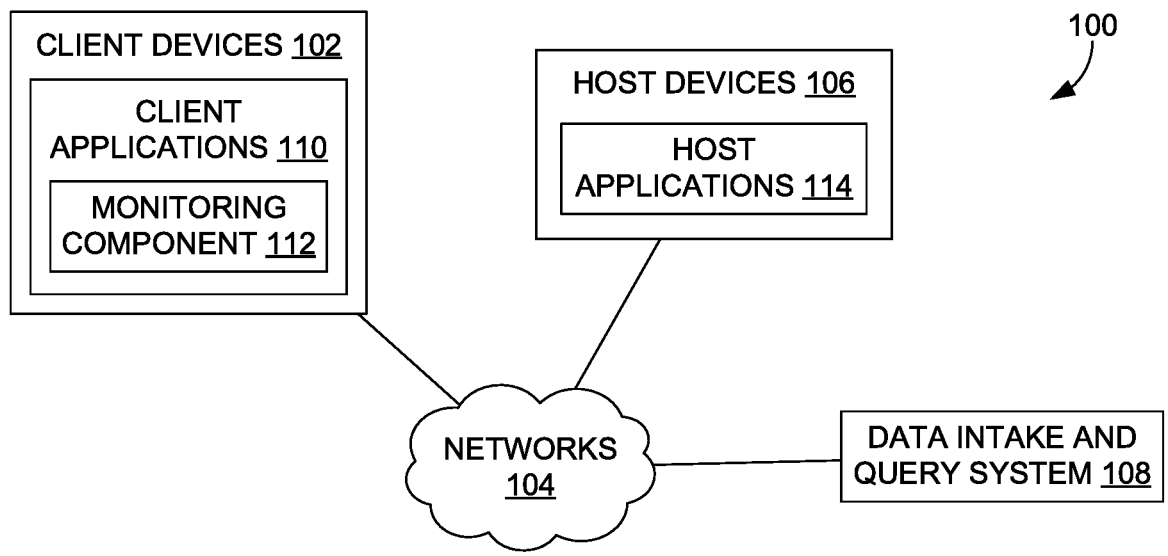
FIG. 1 is a block diagram of an example networked computer environment, in accordance with example embodiments.

Embodiments are described herein according to the following outline:
 1.0. General Overview
 2.0. Operating Environment
 2.1. Host Devices
 2.2. Client Devices
 2.3. Client Device Applications
 2.4. Data Intake and Query System Overview
 3.0. Data Intake and Query System Architecture
 3.1. Intake System
   3.1.1 Forwarder
   3.1.2 Data Retrieval Subsystem
   3.1.3 Ingestion Buffer
   3.1.4 Streaming Data Processors
 3.4. Common Storage
 3.5. Data Store Catalog
 3.6. Query Acceleration Data Store
 4.0. Data Intake and Query System Functions
 4.1. Ingestion
   4.1.1 Publication to Intake Topic(s)
   4.1.2 Transmission to Streaming Data Processors
   4.1.3 Messages Processing
   4.1.4 Transmission to Subscribers
   4.1.5 Data Resiliency and Security
   4.1.6 Message Processing Algorithm
 4.4. Data Ingestion, Indexing, and Storage Flow
   4.4.1. Input
   4.4.2. Parsing
   4.4.3. Indexing
 4.6. Pipelined Search Language
 4.7. Field Extraction
 4.8. Example Search Screen
   4.12. Security Features
   4.13. Data Center Monitoring
   4.14. IT Service Monitoring
 4.15. Other Architectures
 5.0. Sourcetype Inference and Smart Sourcetyping
 6.0. Feedback on Sourcetypes Associated with Messages
 7.0. Conditional Processing based on Inferred Sourcetypes
 8.0. Example Embodiments
 8.1. Example Graphical Interface Elements
 9.0. Other Architectures
 10.0. Terminology
 11.0. Additional Examples

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 8A).

2.0. Operating Environment

FIG. 1 is a block diagram of an example networked computer environment 100, in accordance with example embodiments. It will be understood that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer, and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Intake and Query System Overview

The data intake and query system 108 can process and store data received data from the data sources client devices 102 or host devices 106, and execute queries on the data in response to requests received from one or more computing devices. In some cases, the data intake and query system 108 can generate events from the received data and store the events in buckets in a common storage system. In response to received queries, the data intake and query system can assign one or more search nodes to search the buckets in the common storage.

In certain embodiments, the data intake and query system 108 can include various components that enable it to provide stateless services or enable it to recover from an unavailable or unresponsive component without data loss in a time efficient manner. For example, the data intake and query system 108 can store contextual information about its various components in a distributed way such that if one of the components becomes unresponsive or unavailable, the data intake and query system 108 can replace the unavailable component with a different component and provide the replacement component with the contextual information. In this way, the data intake and query system 108 can quickly recover from an unresponsive or unavailable component while reducing or eliminating the loss of data that was being processed by the unavailable component.

3.0. Data Intake and Query System Architecture

Figure 2:
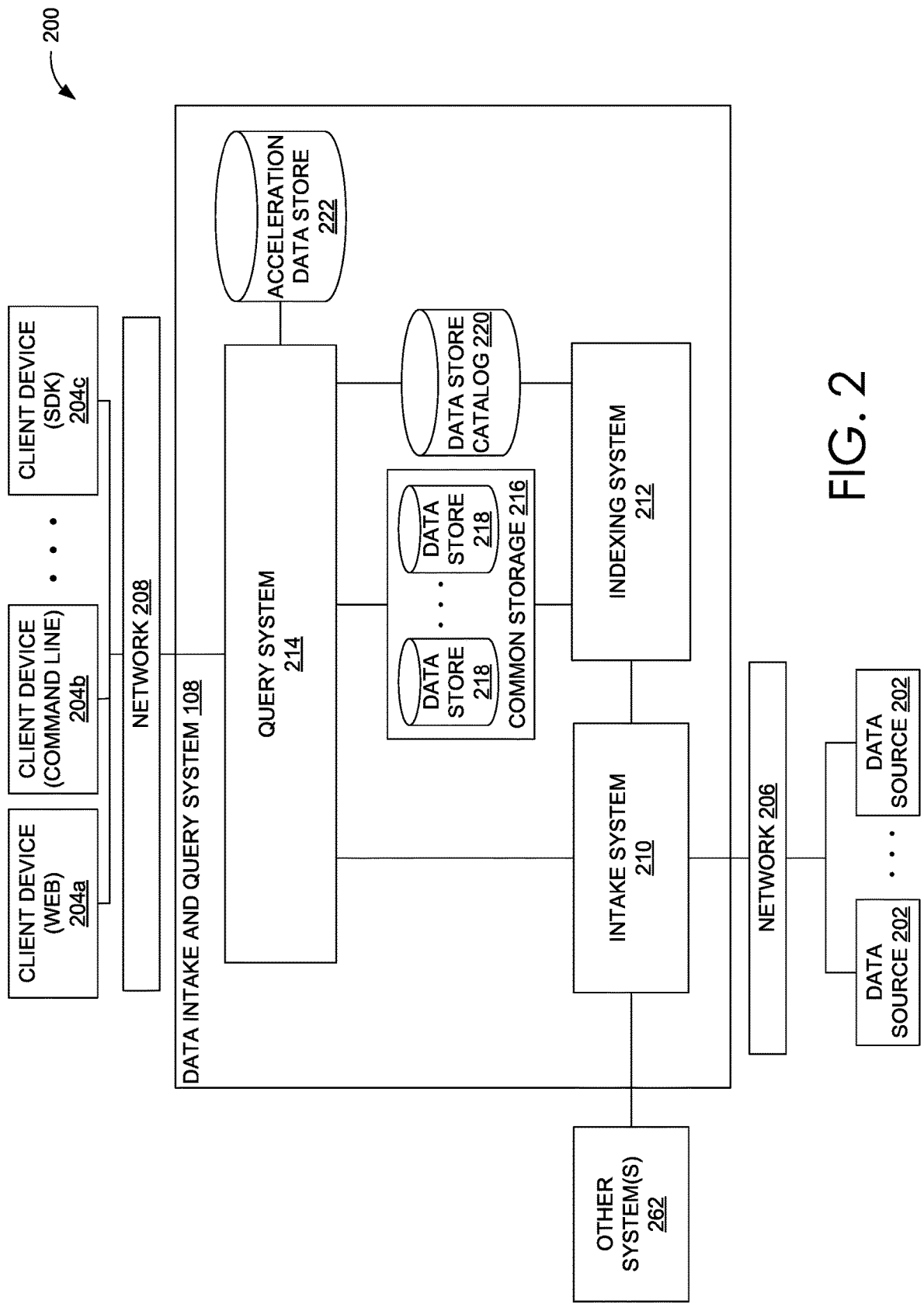
FIG. 2 is a block diagram of an example data intake and query system, in accordance with example embodiments.

FIG. 2 is a block diagram of an embodiment of a data processing environment 200. In the illustrated embodiment, the environment 200 includes data sources 202 and client devices 204a, 204b, 204c (generically referred to as client device(s) 204) in communication with a data intake and query system 108 via networks 206, 208, respectively. The networks 206, 208 may be the same network, may correspond to the network 104, or may be different networks. Further, the networks 206, 208 may be implemented as one or more LANs, WANs, cellular networks, intranetworks, and/or internetworks using any of wired, wireless, terrestrial microwave, satellite links, etc., and may include the Internet.

Each data source 202 broadly represents a distinct source of data that can be consumed by the data intake and query system 108. Examples of data sources 202 include, without limitation, data files, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), performance metrics, etc.

The client devices 204 can be implemented using one or more computing devices in communication with the data intake and query system 108, and represent some of the different ways in which computing devices can submit queries to the data intake and query system 108. For example, the client device 204a is illustrated as communicating over an Internet (Web) protocol with the data intake and query system 108, the client device 204b is illustrated as communicating with the data intake and query system 108 via a command line interface, and the client device 204b is illustrated as communicating with the data intake and query system 108 via a software developer kit (SDK). However, it will be understood that the client devices 204 can communicate with and submit queries to the data intake and query system 108 in a variety of ways.

The data intake and query system 108 can process and store data received from the data sources 202 and execute queries on the data in response to requests received from the client devices 204. In the illustrated embodiment, the data intake and query system 108 includes an intake system 210, an indexing system 212, a query system 214, common storage 216 including one or more data stores 218, a data store catalog 220, and a query acceleration data store 222.

As mentioned, the data intake and query system 108 can receive data from different sources 202. In some cases, the data sources 202 can be associated with different tenants or customers. Further, each tenant may be associated with one or more indexes, hosts, sources, sourcetypes, or users. For example, company ABC, Inc. can correspond to one tenant and company XYZ, Inc. can correspond to a different tenant. While the two companies may be unrelated, each company may have a main index and test index associated with it, as well as one or more data sources or systems (e.g., billing system, CRM system, etc.). The data intake and query system 108 can concurrently receive and process the data from the various systems and sources of ABC, Inc. and XYZ, Inc.

In certain cases, although the data from different tenants can be processed together or concurrently, the data intake and query system 108 can take steps to avoid combining or co-mingling data from the different tenants. For example, the data intake and query system 108 can assign a tenant identifier for each tenant and maintain a separation between the data using the tenant identifier. In some cases, the tenant identifier can be assigned to the data at the data sources 202, or can be assigned to the data by the data intake and query system 108 at ingest.

As will be described in greater detail herein, at least with reference to FIGS. 3A and 3B, the intake system 210 can receive data from the data sources 202, perform one or more preliminary processing operations on the data, and communicate the data to the indexing system 212, query system 214, or to other systems 262 (which may include, for example, data processing systems, telemetry systems, real-time analytics systems, data stores, databases, etc., any of which may be operated by an operator of the data intake and query system 108 or a third party). The intake system 210 can receive data from the data sources 202 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc. The intake system 210 can process the data based on the form in which it is received. In some cases, the intake system 210 can utilize one or more rules to process data and to make the data available to downstream systems (e.g., the indexing system 212, query system 214, etc.). Illustratively, the intake system 210 can enrich the received data. For example, the intake system may add one or more fields to the data received from the data sources 202, such as fields denoting the host, source, sourcetype, index, or tenant associated with the incoming data. In certain embodiments, the intake system 210 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

The indexing system 212 can process the data and store it, for example, in common storage 216. As part of processing the data, the indexing system can identify timestamps associated with the data, organize the data into buckets or time series buckets, convert editable buckets to non-editable buckets, store copies of the buckets in common storage 216, merge buckets, generate indexes of the data, etc. In addition, the indexing system 212 can update the data store catalog 220 with information related to the buckets (pre-merged or merged) or data that is stored in common storage 216, and can communicate with the intake system 210 about the status of the data storage.

The query system 214 can receive queries that identify a set of data to be processed and a manner of processing the set of data from one or more client devices 204, process the queries to identify the set of data, and execute the query on the set of data. In some cases, as part of executing the query, the query system 214 can use the data store catalog 220 to identify the set of data to be processed or its location in common storage 216 and/or can retrieve data from common storage 216 or the query acceleration data store 222. In addition, in some embodiments, the query system 214 can store some or all of the query results in the query acceleration data store 222.

As mentioned and as will be described in greater detail below, the common storage 216 can be made up of one or more data stores 218 storing data that has been processed by the indexing system 212. The common storage 216 can be configured to provide high availability, highly resilient, low loss data storage. In some cases, to provide the high availability, highly resilient, low loss data storage, the common storage 216 can store multiple copies of the data in the same and different geographic locations and across different types of data stores (e.g., solid state, hard drive, tape, etc.). Further, as data is received at the common storage 216 it can be automatically replicated multiple times according to a replication factor to different data stores across the same and/or different geographic locations. In some embodiments, the common storage 216 can correspond to cloud storage, such as Amazon Simple Storage Service (S3) or Elastic Block Storage (EBS), Google Cloud Storage, Microsoft Azure Storage, etc.

In some embodiments, indexing system 212 can read to and write from the common storage 216. For example, the indexing system 212 can copy buckets of data from its local or shared data stores to the common storage 216. In certain embodiments, the query system 214 can read from, but cannot write to, the common storage 216. For example, the query system 214 can read the buckets of data stored in common storage 216 by the indexing system 212, but may not be able to copy buckets or other data to the common storage 216. In some embodiments, the intake system 210 does not have access to the common storage 216. However, in some embodiments, one or more components of the intake system 210 can write data to the common storage 216 that can be read by the indexing system 212.

In some embodiments, data in the data intake and query system 108 (e.g., in the data stores of the indexers of the indexing system 212, common storage 216, or search nodes of the query system 214) can be stored in one or more time series buckets. Each bucket can include raw machine data associated with a time stamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The data store catalog 220 can store information about the data stored in common storage 216, such as, but not limited to an identifier for a set of data or buckets, a location of the set of data, tenants or indexes associated with the set of data, timing information about the data, etc. For example, in embodiments where the data in common storage 216 is stored as buckets, the data store catalog 220 can include a bucket identifier for the buckets in common storage 216, a location of or path to the bucket in common storage 216, a time range of the data in the bucket (e.g., range of time between the first-in-time event of the bucket and the last-in-time event of the bucket), a tenant identifier identifying a customer or computing device associated with the bucket, and/or an index (also referred to herein as a partition) associated with the bucket, etc. In certain embodiments, the data intake and query system 108 includes multiple data store catalogs 220. For example, in some embodiments, the data intake and query system 108 can include a data store catalog 220 for each tenant (or group of tenants), each partition of each tenant (or group of indexes), etc. In some cases, the data intake and query system 108 can include a single data store catalog 220 that includes information about buckets associated with multiple or all of the tenants associated with the data intake and query system 108.

The indexing system 212 can update the data store catalog 220 as the indexing system 212 stores data in common storage 216. Furthermore, the indexing system 212 or other computing device associated with the data store catalog 220 can update the data store catalog 220 as the information in the common storage 216 changes (e.g., as buckets in common storage 216 are merged, deleted, etc.). In addition, as described herein, the query system 214 can use the data store catalog 220 to identify data to be searched or data that satisfies at least a portion of a query. In some embodiments, the query system 214 makes requests to and receives data from the data store catalog 220 using an application programming interface ("API").

The query acceleration data store 222 can store the results or partial results of queries, or otherwise be used to accelerate queries. For example, if a user submits a query that has no end date, the system can query system 214 can store an initial set of results in the query acceleration data store 222. As additional query results are determined based on additional data, the additional results can be combined with the initial set of results, and so on. In this way, the query system 214 can avoid re-searching all of the data that may be responsive to the query and instead search the data that has not already been searched.

In some environments, a user of a data intake and query system 108 may install and configure, on computing devices owned and operated by the user, one or more software applications that implement some or all of these system components. For example, a user may install a software application on server computers owned by the user and configure each server to operate as one or more of intake system 210, indexing system 212, query system 214, common storage 216, data store catalog 220, or query acceleration data store 222, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In certain embodiments, one or more of the components of a data intake and query system 108 can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources. For example, a service provider may provide a data intake and query system 108 by managing computing resources configured to implement various aspects of the system (e.g., intake system 210, indexing system 212, query system 214, common storage 216, data store catalog 220, or query acceleration data store 222, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences. When implemented as a cloud-based service, various components of the system 108 can be implemented using containerization or operating-system-level virtualization, or other virtualization technique. For example, one or more components of the intake system 210, indexing system 212, or query system 214 can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

3.1. Intake System

As detailed below, data may be ingested at the data intake and query system 108 through an intake system 210 configured to conduct preliminary processing on the data, and make the data available to downstream systems or components, such as the indexing system 212, query system 214, third party systems, etc.

Figure 3A:
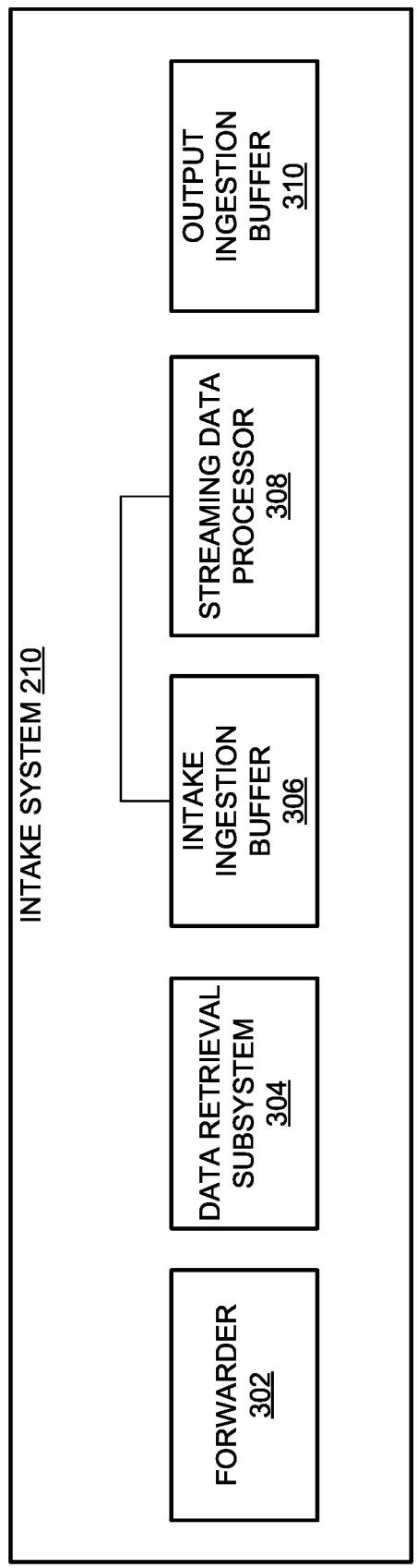
FIG. 3A is a block diagram of one embodiment an intake system.

One example configuration of an intake system 210 is shown in FIG. 3A. As shown in FIG. 3A, the intake system 210 includes a forwarder 302, a data retrieval subsystem 304, an intake ingestion buffer 306, a streaming data processor 308, and an output ingestion buffer 310. As described in detail below, the components of the intake system 210 may be configured to process data according to a streaming data model, such that data ingested into the data intake and query system 108 is processed rapidly (e.g., within seconds or minutes of initial reception at the intake system 210) and made available to downstream systems or components. The initial processing of the intake system 210 may include search or analysis of the data ingested into the intake system 210. For example, the initial processing can transform data ingested into the intake system 210 sufficiently, for example, for the data to be searched by a query system 214, thus enabling "real-time" searching for data on the data intake and query system 108 (e.g., without requiring indexing of the data). Various additional and alternative uses for data processed by the intake system 210 are described below.

Although shown as separate components, the forwarder 302, data retrieval subsystem 304, intake ingestion buffer 306, streaming data processors 308, and output ingestion buffer 310, in various embodiments, may reside on the same machine or be distributed across multiple machines in any combination. In one embodiment, any or all of the components of the intake system can be implemented using one or more computing devices as distinct computing devices or as one or more container instances or virtual machines across one or more computing devices. It will be appreciated by those skilled in the art that the intake system 210 may have more of fewer components than are illustrated in FIGS. 3A and 3B. In addition, the intake system 210 could include various web services and/or peer-to-peer network configurations or inter container communication network provided by an associated container instantiation or orchestration platform. Thus, the intake system 210 of FIGS. 3A and 3B should be taken as illustrative. For example, in some embodiments, components of the intake system 210, such as the ingestion buffers 306 and 310 and/or the streaming data processors 308, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment. Accordingly, the hosted computing environment can include any proprietary or open source extensible computing technology, such as Apache Rink or Apache Spark, to enable fast or on-demand horizontal compute capacity scaling of the streaming data processor 308.

In some embodiments, some or all of the elements of the intake system 210 (e.g., forwarder 302, data retrieval subsystem 304, intake ingestion buffer 306, streaming data processors 308, and output ingestion buffer 310, etc.) may reside on one or more computing devices, such as servers, which may be communicatively coupled with each other and with the data sources 202, query system 214, indexing system 212, or other components. In other embodiments, some or all of the elements of the intake system 210 may be implemented as worker nodes as disclosed in U.S. patent application Ser. Nos. 15/665,159, 15/665,148, 15/665,187, 15/665,248, 15/665,197, 15/665,279, 15/665,302, and 15/665,339, each of which is incorporated by reference herein in its entirety (hereinafter referred to as "the Relevant Applications").

As noted above, the intake system 210 can function to conduct preliminary processing of data ingested at the data intake and query system 108. As such, the intake system 210 illustratively includes a forwarder 302 that obtains data from a data source 202 and transmits the data to a data retrieval subsystem 304. The data retrieval subsystem 304 may be configured to convert or otherwise format data provided by the forwarder 302 into an appropriate format for inclusion at the intake ingestion buffer and transmit the message to the intake ingestion buffer 306 for processing. Thereafter, a streaming data processor 308 may obtain data from the intake ingestion buffer 306, process the data according to one or more rules, and republish the data to either the intake ingestion buffer 306 (e.g., for additional processing) or to the output ingestion buffer 310, such that the data is made available to downstream components or systems. In this manner, the intake system 210 may repeatedly or iteratively process data according to any of a variety of rules, such that the data is formatted for use on the data intake and query system 108 or any other system. As discussed below, the intake system 210 may be configured to conduct such processing rapidly (e.g., in "real-time" with little or no perceptible delay), while ensuring resiliency of the data.

3.1.1. Forwarder

The forwarder 302 can include or be executed on a computing device configured to obtain data from a data source 202 and transmit the data to the data retrieval subsystem 304. In some implementations the forwarder 302 can be installed on a computing device associated with the data source 202. While a single forwarder 302 is illustratively shown in FIG. 3A, the intake system 210 may include a number of different forwarders 302. Each forwarder 302 may illustratively be associated with a different data source 202. A forwarder 302 initially may receive the data as a raw data stream generated by the data source 202. For example, a forwarder 302 may receive a data stream from a log file generated by an application server, from a stream of network data from a network device, or from any other source of data. In some embodiments, a forwarder 302 receives the raw data and may segment the data stream into "blocks", possibly of a uniform data size, to facilitate subsequent processing steps. The forwarder 302 may additionally or alternatively modify data received, prior to forwarding the data to the data retrieval subsystem 304. Illustratively, the forwarder 302 may "tag" metadata for each data block, such as by specifying a source, sourcetype, or host associated with the data, or by appending one or more timestamp or time ranges to each data block.

In some embodiments, a forwarder 302 may comprise a service accessible to data sources 202 via a network 206. For example, one type of forwarder 302 may be capable of consuming vast amounts of real-time data from a potentially large number of data sources 202. The forwarder 302 may, for example, comprise a computing device which implements multiple data pipelines or "queues" to handle forwarding of network data to data retrieval subsystems 304.

3.1.2. Data Retrieval Subsystem

The data retrieval subsystem 304 illustratively corresponds to a computing device which obtains data (e.g., from the forwarder 302), and transforms the data into a format suitable for publication on the intake ingestion buffer 306. Illustratively, where the forwarder 302 segments input data into discrete blocks, the data retrieval subsystem 304 may generate a message for each block, and publish the message to the intake ingestion buffer 306. Generation of a message for each block may include, for example, formatting the data of the message in accordance with the requirements of a streaming data system implementing the intake ingestion buffer 306, the requirements of which may vary according to the streaming data system. In one embodiment, the intake ingestion buffer 306 formats messages according to the protocol buffers method of serializing structured data. Thus, the intake ingestion buffer 306 may be configured to convert data from an input format into a protocol buffer format. Where a forwarder 302 does not segment input data into discrete blocks, the data retrieval subsystem 304 may itself segment the data. Similarly, the data retrieval subsystem 304 may append metadata to the input data, such as a source, sourcetype, or host associated with the data.

Generation of the message may include "tagging" the message with various information, which may be included as metadata for the data provided by the forwarder 302, and determining a "topic" for the message, under which the message should be published to the intake ingestion buffer 306. In general, the "topic" of a message may reflect a categorization of the message on a streaming data system. Illustratively, each topic may be associated with a logically distinct queue of messages, such that a downstream device or system may "subscribe" to the topic in order to be provided with messages published to the topic on the streaming data system.

In one embodiment, the data retrieval subsystem 304 may obtain a set of topic rules (e.g., provided by a user of the data intake and query system 108 or based on automatic inspection or identification of the various upstream and downstream components of the data intake and query system 108) that determine a topic for a message as a function of the received data or metadata regarding the received data. For example, the topic of a message may be determined as a function of the data source 202 from which the data stems. After generation of a message based on input data, the data retrieval subsystem can publish the message to the intake ingestion buffer 306 under the determined topic.

While the data retrieval and subsystem 304 is depicted in FIG. 3A as obtaining data from the forwarder 302, the data retrieval and subsystem 304 may additionally or alternatively obtain data from other sources. In some instances, the data retrieval and subsystem 304 may be implemented as a plurality of intake points, each functioning to obtain data from one or more corresponding data sources (e.g., the forwarder 302, data sources 202, or any other data source), generate messages corresponding to the data, determine topics to which the messages should be published, and to publish the messages to one or more topics of the intake ingestion buffer 306.

Figure 3B:
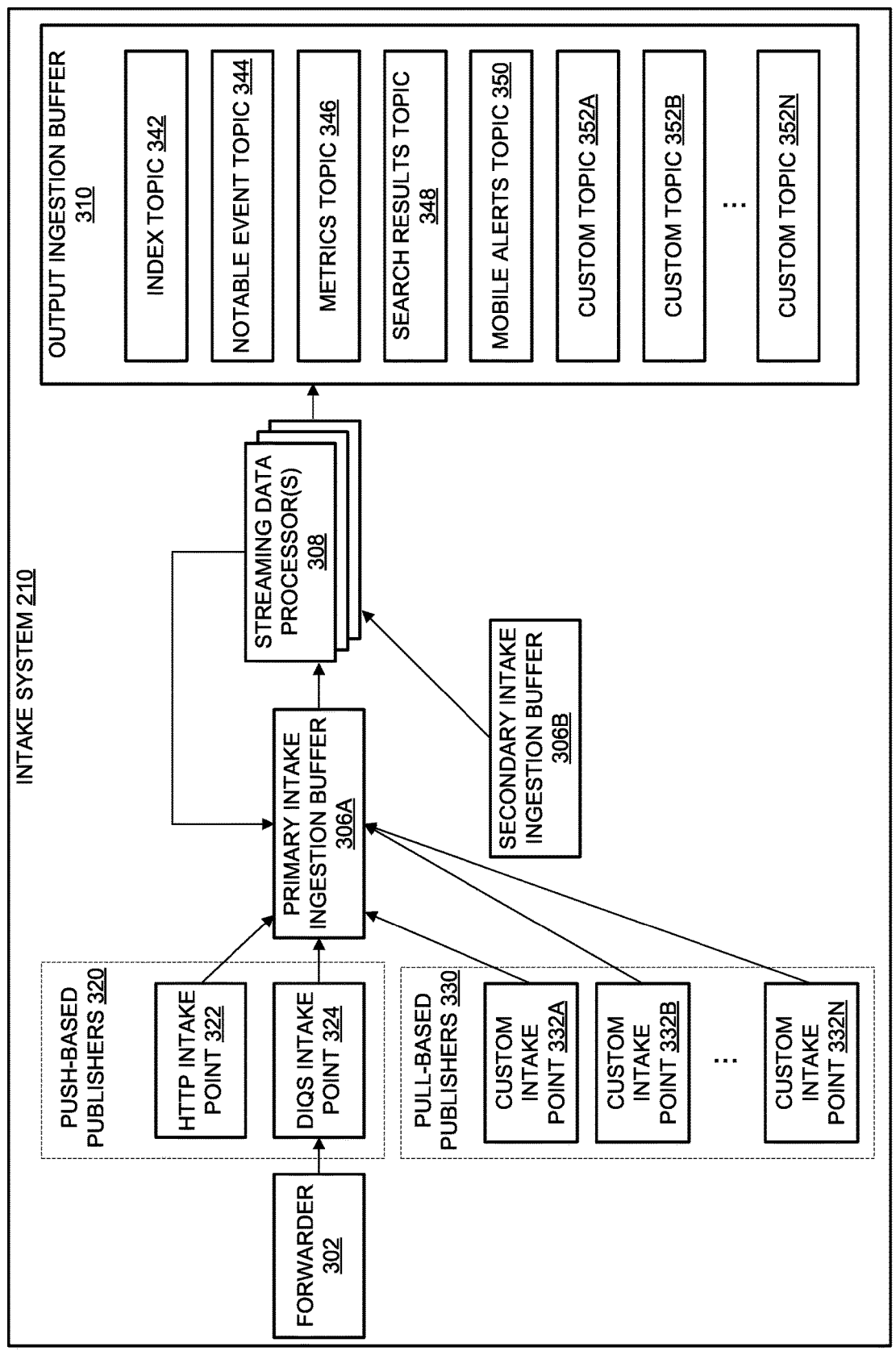
FIG. 3B is a block diagram of another embodiment of an intake system.

One illustrative set of intake points implementing the data retrieval and subsystem 304 is shown in FIG. 3B. Specifically, as shown in FIG. 3B, the data retrieval and subsystem 304 of FIG. 3A may be implemented as a set of push-based publishers 320 or a set of pull-based publishers 330. The illustrative push-based publishers 320 operate on a "push" model, such that messages are generated at the push-based publishers 320 and transmitted to an intake ingestion buffer 306 (shown in FIG. 3B as primary and secondary intake ingestion buffers 306A and 306B, which are discussed in more detail below). As will be appreciated by one skilled in the art, "push" data transmission models generally correspond to models in which a data source determines when data should be transmitted to a data target. A variety of mechanisms exist to provide "push" functionality, including "true push" mechanisms (e.g., where a data source independently initiates transmission of information) and "emulated push" mechanisms, such as "long polling" (a mechanism whereby a data target initiates a connection with a data source, but allows the data source to determine within a timeframe when data is to be transmitted to the data source).

As shown in FIG. 3B, the push-based publishers 320 illustratively include an HTTP intake point 322 and a data intake and query system (DIQS) intake point 324. The HTTP intake point 322 can include a computing device configured to obtain HTTP-based data (e.g., as JavaScript Object Notation, or JSON messages) to format the HTTP-based data as a message, to determine a topic for the message (e.g., based on fields within the HTTP-based data), and to publish the message to the primary intake ingestion buffer 306A. Similarly, the DIQS intake point 324 can be configured to obtain data from a forwarder 302, to format the forwarder data as a message, to determine a topic for the message, and to publish the message to the primary intake ingestion buffer 306A. In this manner, the DIQS intake point 324 can function in a similar manner to the operations described with respect to the data retrieval subsystem 304 of FIG. 3A.

In addition to the push-based publishers 320, one or more pull-based publishers 330 may be used to implement the data retrieval subsystem 304. The pull-based publishers 330 may function on a "pull" model, whereby a data target (e.g., the primary intake ingestion buffer 306A) functions to continuously or periodically (e.g., each n seconds) query the pull-based publishers 330 for new messages to be placed on the primary intake ingestion buffer 306A. In some instances, development of pull-based systems may require less coordination of functionality between a pull-based publisher 330 and the primary intake ingestion buffer 306A. Thus, for example, pull-based publishers 330 may be more readily developed by third parties (e.g., other than a developer of the data intake a query system 108), and enable the data intake and query system 108 to ingest data associated with third party data sources 202. Accordingly, FIG. 3B includes a set of custom intake points 332A through 332N, each of which functions to obtain data from a third-party data source 202, format the data as a message for inclusion in the primary intake ingestion buffer 306A, determine a topic for the message, and make the message available to the primary intake ingestion buffer 306A in response to a request (a "pull") for such messages.

While the pull-based publishers 330 are illustratively described as developed by third parties, push-based publishers 320 may also in some instances be developed by third parties. Additionally or alternatively, pull-based publishers may be developed by the developer of the data intake and query system 108. To facilitate integration of systems potentially developed by disparate entities, the primary intake ingestion buffer 306A may provide an API through which an intake point may publish messages to the primary intake ingestion buffer 306A. Illustratively, the API may enable an intake point to "push" messages to the primary intake ingestion buffer 306A, or request that the primary intake ingestion buffer 306A "pull" messages from the intake point. Similarly, the streaming data processors 308 may provide an API through which ingestions buffers may register with the streaming data processors 308 to facilitate pre-processing of messages on the ingestion buffers, and the output ingestion buffer 310 may provide an API through which the streaming data processors 308 may publish messages or through which downstream devices or systems may subscribe to topics on the output ingestion buffer 310. Furthermore, any one or more of the intake points 322 through 332N may provide an API through which data sources 202 may submit data to the intake points. Thus, any one or more of the components of FIGS. 3A and 3B may be made available via APIs to enable integration of systems potentially provided by disparate parties.

The specific configuration of publishers 320 and 330 shown in FIG. 3B is intended to be illustrative in nature. For example, the specific number and configuration of intake points may vary according to embodiments of the present application. In some instances, one or more components of the intake system 210 may be omitted. For example, a data source 202 may in some embodiments publish messages to an intake ingestion buffer 306, and thus an intake point 324 may be unnecessary. Other configurations of the intake system 210 are possible.

3.1.3. Ingestion Buffer

The intake system 210 is illustratively configured to ensure message resiliency, such that data is persisted in the event of failures within the intake system 210. Specifically, the intake system 210 may utilize one or more ingestion buffers, which operate to resiliently maintain data received at the intake system 210 until the data is acknowledged by downstream systems or components. In one embodiment, resiliency is provided at the intake system 210 by use of ingestion buffers that operate according to a publish-subscribe ("pub-sub") message model. In accordance with the pub-sub model, data ingested into the data intake and query system 108 may be atomized as "messages," each of which is categorized into one or more "topics." An ingestion buffer can maintain a queue for each such topic, and enable devices to "subscribe" to a given topic. As messages are published to the topic, the ingestion buffer can function to transmit the messages to each subscriber, and ensure message resiliency until at least each subscriber has acknowledged receipt of the message (e.g., at which point the ingestion buffer may delete the message). In this manner, the ingestion buffer may function as a "broker" within the pub-sub model. A variety of techniques to ensure resiliency at a pub-sub broker are known in the art, and thus will not be described in detail herein. In one embodiment, an ingestion buffer is implemented by a streaming data source. As noted above, examples of streaming data sources include (but are not limited to) Amazon's Simple Queue Service ("SQS") or Kinesis™ services, devices executing Apache Kafka™ software, or devices implementing the Message Queue Telemetry Transport (MQTT) protocol. Any one or more of these example streaming data sources may be utilized to implement an ingestion buffer in accordance with embodiments of the present disclosure.

With reference to FIG. 3A, the intake system 210 may include at least two logical ingestion buffers: an intake ingestion buffer 306 and an output ingestion buffer 310. As noted above, the intake ingestion buffer 306 can be configured to receive messages from the data retrieval subsystem 304 and resiliently store the message. The intake ingestion buffer 306 can further be configured to transmit the message to the streaming data processors 308 for processing. As further described below, the streaming data processors 308 can be configured with one or more data transformation rules to transform the messages, and republish the messages to one or both of the intake ingestion buffer 306 and the output ingestion buffer 310. The output ingestion buffer 310, in turn, may make the messages available to various subscribers to the output ingestion buffer 310, which subscribers may include the query system 214, the indexing system 212, or other third-party devices (e.g., client devices 102, host devices 106, etc.).

Both the input ingestion buffer 306 and output ingestion buffer 310 may be implemented on a streaming data source, as noted above. In one embodiment, the intake ingestion buffer 306 operates to maintain source-oriented topics, such as topics for each data source 202 from which data is obtained, while the output ingestion buffer operates to maintain content-oriented topics, such as topics to which the data of an individual message pertains. As discussed in more detail below, the streaming data processors 308 can be configured to transform messages from the intake ingestion buffer 306 (e.g., arranged according to source-oriented topics) and publish the transformed messages to the output ingestion buffer 310 (e.g., arranged according to content-oriented topics). In some instances, the streaming data processors 308 may additionally or alternatively republish transformed messages to the intake ingestion buffer 306, enabling iterative or repeated processing of the data within the message by the streaming data processors 308.

While shown in FIG. 3A as distinct, these ingestion buffers 306 and 310 may be implemented as a common ingestion buffer. However, use of distinct ingestion buffers may be beneficial, for example, where a geographic region in which data is received differs from a region in which the data is desired. For example, use of distinct ingestion buffers may beneficially allow the intake ingestion buffer 306 to operate in a first geographic region associated with a first set of data privacy restrictions, while the output ingestion buffer 310 operates in a second geographic region associated with a second set of data privacy restrictions. In this manner, the intake system 210 can be configured to comply with all relevant data privacy restrictions, ensuring privacy of data processed at the data intake and query system 108.

Moreover, either or both of the ingestion buffers 306 and 310 may be implemented across multiple distinct devices, as either a single or multiple ingestion buffers. Illustratively, as shown in FIG. 3B, the intake system 210 may include both a primary intake ingestion buffer 306A and a secondary intake ingestion buffer 306B. The primary intake ingestion buffer 306A is illustratively configured to obtain messages from the data retrieval subsystem 304 (e.g., implemented as a set of intake points 322 through 332N). The secondary intake ingestion buffer 306B is illustratively configured to provide an additional set of messages (e.g., from other data sources 202). In one embodiment, the primary intake ingestion buffer 306A is provided by an administrator or developer of the data intake and query system 108, while the secondary intake ingestion buffer 306B is a user-supplied ingestion buffer (e.g., implemented externally to the data intake and query system 108).

As noted above, an intake ingestion buffer 306 may in some embodiments categorize messages according to source-oriented topics (e.g., denoting a data source 202 from which the message was obtained). In other embodiments, an intake ingestion buffer 306 may in some embodiments categorize messages according to intake-oriented topics (e.g., denoting the intake point from which the message was obtained). The number and variety of such topics may vary, and thus are not shown in FIG. 3B. In one embodiment, the intake ingestion buffer 306 maintains only a single topic (e.g., all data to be ingested at the data intake and query system 108).

The output ingestion buffer 310 may in one embodiment categorize messages according to content-centric topics (e.g., determined based on the content of a message). Additionally or alternatively, the output ingestion buffer 310 may categorize messages according to consumer-centric topics (e.g., topics intended to store messages for consumption by a downstream device or system). An illustrative number of topics are shown in FIG. 3B, as topics 342 through 352N. Each topic may correspond to a queue of messages (e.g., in accordance with the pub-sub model) relevant to the corresponding topic. As described in more detail below, the streaming data processors 308 may be configured to process messages from the intake ingestion buffer 306 and determine which topics of the topics 342 through 352N into which to place the messages. For example, the index topic 342 may be intended to store messages holding data that should be consumed and indexed by the indexing system 212. The notable event topic 344 may be intended to store messages holding data that indicates a notable event at a data source 202 (e.g., the occurrence of an error or other notable event). The metrics topic 346 may be intended to store messages holding metrics data for data sources 202. The search results topic 348 may be intended to store messages holding data responsive to a search query. The mobile alerts topic 350 may be intended to store messages holding data for which an end user has requested alerts on a mobile device. A variety of custom topics 352A through 352N may be intended to hold data relevant to end-user-created topics.

As will be described below, by application of message transformation rules at the streaming data processors 308, the intake system 210 may divide and categorize messages from the intake ingestion buffer 306, partitioning the message into output topics relevant to a specific downstream consumer. In this manner, specific portions of data input to the data intake and query system 108 may be "divided out" and handled separately, enabling different types of data to be handled differently, and potentially at different speeds. Illustratively, the index topic 342 may be configured to include all or substantially all data included in the intake ingestion buffer 306. Given the volume of data, there may be a significant delay (e.g., minutes or hours) before a downstream consumer (e.g., the indexing system 212) processes a message in the index topic 342. Thus, for example, searching data processed by the indexing system 212 may incur significant delay.

Conversely, the search results topic 348 may be configured to hold only messages corresponding to data relevant to a current query. Illustratively, on receiving a query from a client device 204, the query system 214 may transmit to the intake system 210 a rule that detects, within messages from the intake ingestion buffer 306A, data potentially relevant to the query. The streaming data processors 308 may republish these messages within the search results topic 348, and the query system 214 may subscribe to the search results topic 348 in order to obtain the data within the messages. In this manner, the query system 214 can "bypass" the indexing system 212 and avoid delay that may be caused by that system, thus enabling faster (and potentially real time) display of search results.

While shown in FIGS. 3A and 3B as a single output ingestion buffer 310, the intake system 210 may in some instances utilize multiple output ingestion buffers 310.

3.1.4. Streaming Data Processors

As noted above, the streaming data processors 308 may apply one or more rules to process messages from the intake ingestion buffer 306A into messages on the output ingestion buffer 310. These rules may be specified, for example, by an end user of the data intake and query system 108 or may be automatically generated by the data intake and query system 108 (e.g., in response to a user query).

Illustratively, each rule may correspond to a set of selection criteria indicating messages to which the rule applies, as well as one or more processing sub-rules indicating an action to be taken by the streaming data processors 308 with respect to the message. The selection criteria may include any number or combination of criteria based on the data included within a message or metadata of the message (e.g., a topic to which the message is published). In one embodiment, the selection criteria are formatted in the same manner or similarly to extraction rules, discussed in more detail below. For example, selection criteria may include regular expressions that derive one or more values or a sub-portion of text from the portion of machine data in each message to produce a value for the field for that message. When a message is located within the intake ingestion buffer 306 that matches the selection criteria, the streaming data processors 308 may apply the processing rules to the message. Processing sub-rules may indicate, for example, a topic of the output ingestion buffer 310 into which the message should be placed. Processing sub-rules may further indicate transformations, such as field or unit normalization operations to be performed on the message. Illustratively, a transformation may include modifying data within the message, such as altering a format in which the data is conveyed (e.g., converting millisecond timestamps values to microsecond timestamp values, converting imperial units to metric units, etc.), or supplementing the data with additional information (e.g., appending an error descriptor to an error code). In some instances, the streaming data processors 308 may be in communication with one or more external data stores (the locations of which may be specified within a rule) that provide information used to supplement or enrich messages processed at the streaming data processors 308. For example, a specific rule may include selection criteria identifying an error code within a message of the primary ingestion buffer 306A, and specifying that when the error code is detected within a message, that the streaming data processors 308 should conduct a lookup in an external data source (e.g., a database) to retrieve the human-readable descriptor for that error code, and inject the descriptor into the message. In this manner, rules may be used to process, transform, or enrich messages.

The streaming data processors 308 may include a set of computing devices configured to process messages from the intake ingestion buffer 306 at a speed commensurate with a rate at which messages are placed into the intake ingestion buffer 306. In one embodiment, the number of streaming data processors 308 used to process messages may vary based on a number of messages on the intake ingestion buffer 306 awaiting processing. Thus, as additional messages are queued into the intake ingestion buffer 306, the number of streaming data processors 308 may be increased to ensure that such messages are rapidly processed. In some instances, the streaming data processors 308 may be extensible on a per topic basis. Thus, individual devices implementing the streaming data processors 308 may subscribe to different topics on the intake ingestion buffer 306, and the number of devices subscribed to an individual topic may vary according to a rate of publication of messages to that topic (e.g., as measured by a backlog of messages in the topic). In this way, the intake system 210 can support ingestion of massive amounts of data from numerous data sources 202.

In some embodiments, an intake system may comprise a service accessible to client devices 102 and host devices 106 via a network 104. For example, one type of forwarder may be capable of consuming vast amounts of real-time data from a potentially large number of client devices 102 and/or host devices 106. The forwarder may, for example, comprise a computing device which implements multiple data pipelines or "queues" to handle forwarding of network data to indexers. A forwarder may also perform many of the functions that are performed by an indexer. For example, a forwarder may perform keyword extractions on raw data or parse raw data to create events. A forwarder may generate time stamps for events. Additionally or alternatively, a forwarder may perform routing of events to indexers. Data store 218 may contain events derived from machine data from a variety of sources all pertaining to the same component in an IT environment, and this data may be produced by the machine in question or by other components in the IT environment.

3.4. Common Storage

Returning to FIG. 2, the common storage 216 can be used to store data indexed by the indexing system 212, and can be implemented using one or more data stores 218.

3.5. Data Store Catalog

The data store catalog 220 can store information about the data stored in common storage 216, and can be implemented using one or more data stores.

3.6. Query Acceleration Data Store

With continued reference to FIG. 2, the query acceleration data store 222 can be used to store query results or datasets for accelerated access, and can be implemented as, a distributed in-memory database system, storage subsystem, local or networked storage (e.g., cloud storage), and so on, which can maintain (e.g., store) datasets in both low-latency memory (e.g., random access memory, such as volatile or non-volatile memory) and longer-latency memory (e.g., solid state storage, disk drives, and so on).

4.0. Data Intake and Query System Functions

As described herein, the various components of the data intake and query system 108 can perform a variety of functions associated with the intake, indexing, storage, and querying of data from a variety of sources. It will be understood that any one or any combination of the functions described herein can be combined as part of a single routine or method. For example, a routine can include any one or any combination of one or more data ingestion functions, one or more indexing functions, and/or one or more searching functions.

4.1 Ingestion

Figure 4:
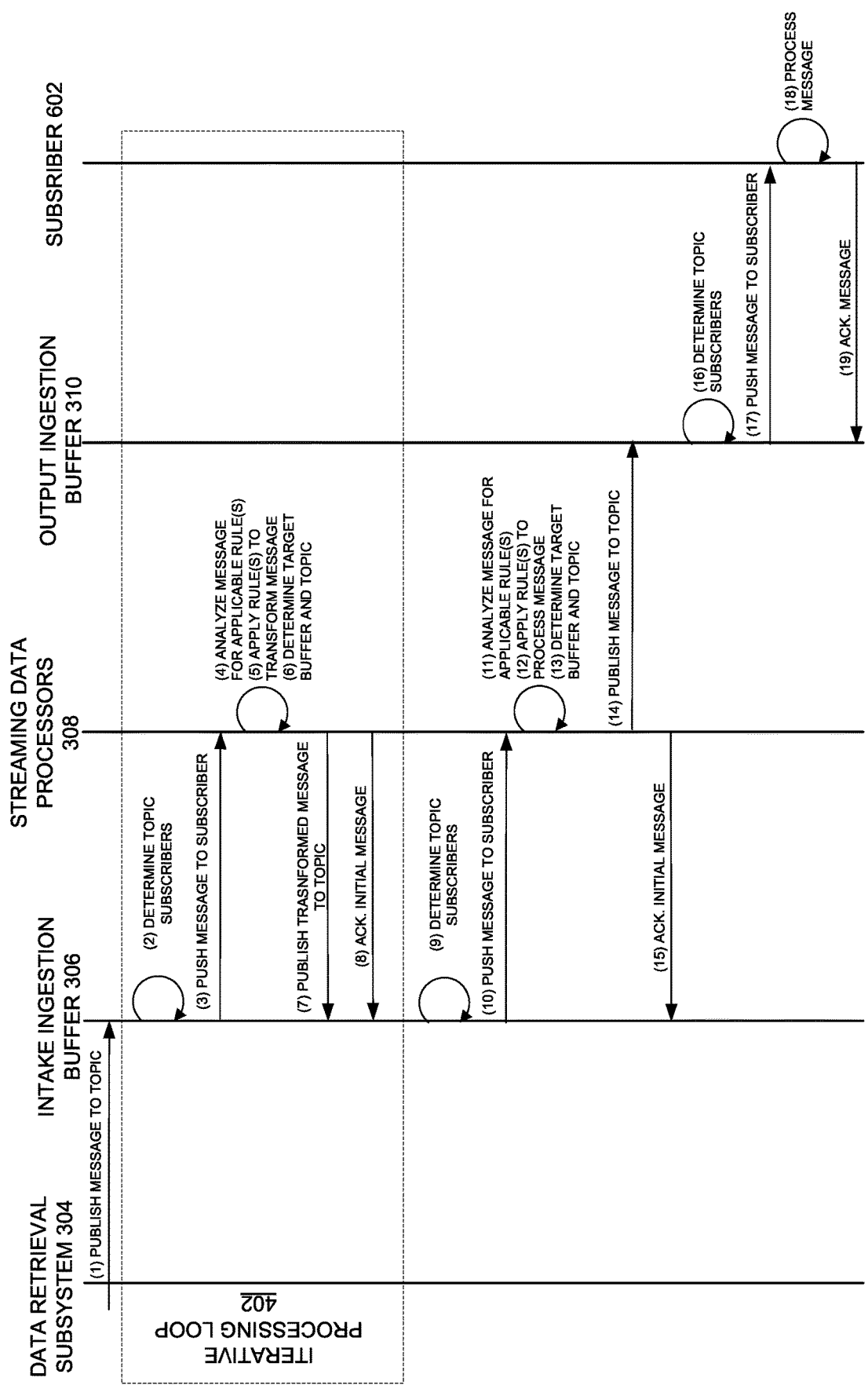
FIG. 4 is a flow diagram depicting illustrative interactions for processing data through an intake system, in accordance with example embodiments.

As discussed above, ingestion into the data intake and query system 108 can be facilitated by an intake system 210, which functions to process data according to a streaming data model, and make the data available as messages on an output ingestion buffer 310, categorized according to a number of potential topics. Messages may be published to the output ingestion buffer 310 by a streaming data processors 308, based on preliminary processing of messages published to an intake ingestion buffer 306. The intake ingestion buffer 306 is, in turn, populated with messages by one or more publishers, each of which may represent an intake point for the data intake and query system 108. The publishers may collectively implement a data retrieval subsystem 304 for the data intake and query system 108, which subsystem 304 functions to retrieve data from a data source 202 and publish the data in the form of a message on the intake ingestion buffer 306. A flow diagram depicting an illustrative embodiment for processing data at the intake system 210 is shown at FIG. 4. While the flow diagram is illustratively described with respect to a single message, the same or similar interactions may be used to process multiple messages at the intake system 210.

4.1.1 Publication to Intake Topic(s)

As shown in FIG. 4, processing of data at the intake system 210 can illustratively begin at (1), where a data retrieval subsystem 304 or a data source 202 publishes a message to a topic at the intake ingestion buffer 306. Generally described, the data retrieval subsystem 304 may include either or both push-based and pull-based publishers. Push-based publishers can illustratively correspond to publishers which independently initiate transmission of messages to the intake ingestion buffer 306. Pull-based publishes can illustratively correspond to publishers which await an inquiry by the intake ingestion buffer 306 for messages to be published to the buffer 306. The publication of a message at (1) is intended to include publication under either push- or pull-based models.

As discussed above, the data retrieval subsystem 304 may generate the message based on data received from a forwarder 302 and/or from one or more data sources 202. In some instances, generation of a message may include converting a format of the data into a format suitable for publishing on the intake ingestion buffer 306. Generation of a message may further include determining a topic for the message. In one embodiment, the data retrieval subsystem 304 selects a topic based on a data source 202 from which the data is received, or based on the specific publisher (e.g., intake point) on which the message is generated. For example, each data source 202 or specific publisher may be associated with a particular topic on the intake ingestion buffer 306 to which corresponding messages are published. In some instances, the same source data may be used to generate multiple messages to the intake ingestion buffer 306 (e.g., associated with different topics).

4.1.2 Transmission to Streaming Data Processors

After receiving a message from a publisher, the intake ingestion buffer 306, at (2), determines subscribers to the topic. For the purposes of example, it will be associated that at least one device of the streaming data processors 308 has subscribed to the topic (e.g., by previously transmitting to the intake ingestion buffer 306 a subscription request). As noted above, the streaming data processors 308 may be implemented by a number of (logically or physically) distinct devices. As such, the streaming data processors 308, at (2), may operate to determine which devices of the streaming data processors 308 have subscribed to the topic (or topics) to which the message was published.

Thereafter, at (3), the intake ingestion buffer 306 publishes the message to the streaming data processors 308 in accordance with the pub-sub model. This publication may correspond to a "push" model of communication, whereby an ingestion buffer determines topic subscribers and initiates transmission of messages within the topic to the subscribers. While interactions of FIG. 4 are described with reference to such a push model, in some embodiments a pull model of transmission may additionally or alternatively be used. Illustratively, rather than an ingestion buffer determining topic subscribers and initiating transmission of messages for the topic to a subscriber (e.g., the streaming data processors 308), an ingestion buffer may enable a subscriber to query for unread messages for a topic, and for the subscriber to initiate transmission of the messages from the ingestion buffer to the subscriber. Thus, an ingestion buffer (e.g., the intake ingestion buffer 306) may enable subscribers to "pull" messages from the buffer. As such, interactions of FIG. 4 (e.g., including interactions (2) and (3) as well as (9), (10), (16), and (17) described below) may be modified to include pull-based interactions (e.g., whereby a subscriber queries for unread messages and retrieves the messages from an appropriate ingestion buffer).

4.1.3 Messages Processing

On receiving a message, the streaming data processors 308, at (4), analyze the message to determine one or more rules applicable to the message. As noted above, rules maintained at the streaming data processors 308 can generally include selection criteria indicating messages to which the rule applies. This selection criteria may be formatted in the same manner or similarly to extraction rules, discussed in more detail below, and may include any number or combination of criteria based on the data included within a message or metadata of the message, such as regular expressions based on the data or metadata.

On determining that a rule is applicable to the message, the streaming data processors 308 can apply to the message one or more processing sub-rules indicated within the rule. Processing sub-rules may include modifying data or metadata of the message. Illustratively, processing sub-rules may edit or normalize data of the message (e.g., to convert a format of the data) or inject additional information into the message (e.g., retrieved based on the data of the message). For example, a processing sub-rule may specify that the data of the message be transformed according to a transformation algorithmically specified within the sub-rule. Thus, at (5), the streaming data processors 308 applies the sub-rule to transform the data of the message.

In addition or alternatively, processing sub-rules can specify a destination of the message after the message is processed at the streaming data processors 308. The destination may include, for example, a specific ingestion buffer (e.g., intake ingestion buffer 306, output ingestion buffer 310, etc.) to which the message should be published, as well as the topic on the ingestion buffer to which the message should be published. For example, a particular rule may state that messages including metrics within a first format (e.g., imperial units) should have their data transformed into a second format (e.g., metric units) and be republished to the intake ingestion buffer 306. At such, at (6), the streaming data processors 308 can determine a target ingestion buffer and topic for the transformed message based on the rule determined to apply to the message. Thereafter, the streaming data processors 308 publishes the message to the destination buffer and topic.

For the purposes of illustration, the interactions of FIG. 4 assume that, during an initial processing of a message, the streaming data processors 308 determines (e.g., according to a rule of the data processor) that the message should be republished to the intake ingestion buffer 306, as shown at (7). The streaming data processors 308 further acknowledges the initial message to the intake ingestion buffer 306, at (8), thus indicating to the intake ingestion buffer 306 that the streaming data processors 308 has processed the initial message or published it to an intake ingestion buffer. The intake ingestion buffer 306 may be configured to maintain a message until all subscribers have acknowledged receipt of the message. Thus, transmission of the acknowledgement at (8) may enable the intake ingestion buffer 306 to delete the initial message.

It is assumed for the purposes of these illustrative interactions that at least one device implementing the streaming data processors 308 has subscribed to the topic to which the transformed message is published. Thus, the streaming data processors 308 is expected to again receive the message (e.g., as previously transformed the streaming data processors 308), determine whether any rules apply to the message, and process the message in accordance with one or more applicable rules. In this manner, interactions (2) through (8) may occur repeatedly, as designated in FIG. 4 by the iterative processing loop 402. By use of iterative processing, the streaming data processors 308 may be configured to progressively transform or enrich messages obtained at data sources 202. Moreover, because each rule may specify only a portion of the total transformation or enrichment of a message, rules may be created without knowledge of the entire transformation. For example, a first rule may be provided by a first system to transform a message according to the knowledge of that system (e.g., transforming an error code into an error descriptor), while a second rule may process the message according to the transformation (e.g., by detecting that the error descriptor satisfies alert criteria). Thus, the streaming data processors 308 enable highly granulized processing of data without requiring an individual entity (e.g., user or system) to have knowledge of all permutations or transformations of the data.

After completion of the iterative processing loop 402, the interactions of FIG. 4 proceed to interaction (9), where the intake ingestion buffer 306 again determines subscribers of the message. The intake ingestion buffer 306, at (10), the transmits the message to the streaming data processors 308, and the streaming data processors 308 again analyze the message for applicable rules, process the message according to the rules, determine a target ingestion buffer and topic for the processed message, and acknowledge the message to the intake ingestion buffer 306, at interactions (11), (12), (13), and (15). These interactions are similar to interactions (4), (5), (6), and (8) discussed above, and therefore will not be re-described. However, in contrast to interaction (13), the streaming data processors 308 may determine that a target ingestion buffer for the message is the output ingestion buffer 310. Thus, the streaming data processors 308, at (14), publishes the message to the output ingestion buffer 310, making the data of the message available to a downstream system.

FIG. 4 illustrates one processing path for data at the streaming data processors 308. However, other processing paths may occur according to embodiments of the present disclosure. For example, in some instances, a rule applicable to an initially published message on the intake ingestion buffer 306 may cause the streaming data processors 308 to publish the message out ingestion buffer 310 on first processing the data of the message, without entering the iterative processing loop 402. Thus, interactions (2) through (8) may be omitted.

In other instances, a single message published to the intake ingestion buffer 306 may spawn multiple processing paths at the streaming data processors 308. Illustratively, the streaming data processors 308 may be configured to maintain a set of rules, and to independently apply to a message all rules applicable to the message. Each application of a rule may spawn an independent processing path, and potentially a new message for publication to a relevant ingestion buffer. In other instances, the streaming data processors 308 may maintain a ranking of rules to be applied to messages, and may be configured to process only a highest ranked rule which applies to the message. Thus, a single message on the intake ingestion buffer 306 may result in a single message or multiple messages published by the streaming data processors 308, according to the configuration of the streaming data processors 308 in applying rules.

As noted above, the rules applied by the streaming data processors 308 may vary during operation of those processors 308. For example, the rules may be updated as user queries are received (e.g., to identify messages whose data is relevant to those queries). In some instances, rules of the streaming data processors 308 may be altered during the processing of a message, and thus the interactions of FIG. 4 may be altered dynamically during operation of the streaming data processors 308.

While the rules above are described as making various illustrative alterations to messages, various other alterations are possible within the present disclosure. For example, rules in some instances be used to remove data from messages, or to alter the structure of the messages to conform to the format requirements of a downstream system or component. Removal of information may be beneficial, for example, where the messages include private, personal, or confidential information which is unneeded or should not be made available by a downstream system. In some instances, removal of information may include replacement of the information with a less confidential value. For example, a mailing address may be considered confidential information, whereas a postal code may not be. Thus, a rule may be implemented at the streaming data processors 308 to replace mailing addresses with a corresponding postal code, to ensure confidentiality. Various other alterations will be apparent in view of the present disclosure.

4.1.4 Transmission to Subscribers

As discussed above, the rules applied by the streaming data processors 308 may eventually cause a message containing data from a data source 202 to be published to a topic on an output ingestion buffer 310, which topic may be specified, for example, by the rule applied by the streaming data processors 308. The output ingestion buffer 310 may thereafter make the message available to downstream systems or components. These downstream systems or components may be generally referred to herein as "subscribers." For example, the indexing system 212 may subscribe to an indexing topic 342, the query system 214 may subscribe to a search results topic 348, a client device 102 may subscribe to a custom topic 352A, etc. In accordance with the pub-sub model, the output ingestion buffer 310 may transmit each message published to a topic to each subscriber of that topic, and resiliently store the messages until acknowledged by each subscriber (or potentially until an error is logged with respect to a subscriber). As noted above, other models of communication are possible and contemplated within the present disclosure. For example, rather than subscribing to a topic on the output ingestion buffer 310 and allowing the output ingestion buffer 310 to initiate transmission of messages to the subscriber 602, the output ingestion buffer 310 may be configured to allow a subscriber 602 to query the buffer 310 for messages (e.g., unread messages, new messages since last transmission, etc.), and to initiate transmission of those messages form the buffer 310 to the subscriber 602. In some instances, such querying may remove the need for the subscriber 602 to separately "subscribe" to the topic.

Accordingly, at (16), after receiving a message to a topic, the output ingestion buffer 310 determines the subscribers to the topic (e.g., based on prior subscription requests transmitted to the output ingestion buffer 310). At (17), the output ingestion buffer 310 transmits the message to a subscriber 602. Thereafter, the subscriber may process the message at (18). Illustrative examples of such processing are described below, and may include (for example) preparation of search results for a client device 204, indexing of the data at the indexing system 212, and the like. After processing, the subscriber can acknowledge the message to the output ingestion buffer 310, thus confirming that the message has been processed at the subscriber.

4.1.5 Data Resiliency and Security

In accordance with embodiments of the present disclosure, the interactions of FIG. 4 may be ordered such that resiliency is maintained at the intake system 210. Specifically, as disclosed above, data streaming systems (which may be used to implement ingestion buffers) may implement a variety of techniques to ensure the resiliency of messages stored at such systems, absent systematic or catastrophic failures. Thus, the interactions of FIG. 4 may be ordered such that data from a data source 202 is expected or guaranteed to be included in at least one message on an ingestion system until confirmation is received that the data is no longer required.

For example, as shown in FIG. 4, interaction (8)—wherein the streaming data processors 308 acknowledges receipt of an initial message at the intake ingestion buffer 306—can illustratively occur after interaction (7)—wherein the streaming data processors 308 republishes the data to the intake ingestion buffer 306. Similarly, interaction (15)—wherein the streaming data processors 308 acknowledges receipt of an initial message at the intake ingestion buffer 306—can illustratively occur after interaction (14)—wherein the streaming data processors 308 republishes the data to the intake ingestion buffer 306. This ordering of interactions can ensure, for example, that the data being processed by the streaming data processors 308 is, during that processing, always stored at the ingestion buffer 306 in at least one message. Because an ingestion buffer 306 can be configured to maintain and potentially resend messages until acknowledgement is received from each subscriber, this ordering of interactions can ensure that, should a device of the streaming data processors 308 fail during processing, another device implementing the streaming data processors 308 can later obtain the data and continue the processing.

Similarly, as shown in FIG. 4, each subscriber 602 may be configured to acknowledge a message to the output ingestion buffer 310 after processing for the message is completed. In this manner, should a subscriber 602 fail after receiving a message but prior to completing processing of the message, the processing of the subscriber 602 can be restarted to successfully process the message. Thus, the interactions of FIG. 4 can maintain resiliency of data on the system 108 commensurate with the resiliency provided by an individual ingestion buffer 306.

While message acknowledgement is described herein as an illustrative mechanism to ensure data resiliency at an intake system 210, other mechanisms for ensuring data resiliency may additionally or alternatively be used.

As will be appreciated in view of the present disclosure, the configuration and operation of the intake system 210 can further provide high amounts of security to the messages of that system. Illustratively, the intake ingestion buffer 306 or output ingestion buffer 310 may maintain an authorization record indicating specific devices or systems with authorization to publish or subscribe to a specific topic on the ingestion buffer. As such, an ingestion buffer may ensure that only authorized parties are able to access sensitive data. In some instances, this security may enable multiple entities to utilize the intake system 210 to manage confidential information, with little or no risk of that information being shared between the entities. The managing of data or processing for multiple entities is in some instances referred to as "multi-tenancy."

Illustratively, a first entity may publish messages to a first topic on the intake ingestion buffer 306, and the intake ingestion buffer 306 may verify that any intake point or data source 202 publishing to that first topic be authorized by the first entity to do so. The streaming data processors 308 may maintain rules specific to the first entity, which the first entity may illustrative provide through authenticated session on an interface (e.g., GUI, API, command line interface (CLI), etc.). The rules of the first entity may specify one or more entity-specific topics on the output ingestion buffer 310 to which messages containing data of the first entity should be published by the streaming data processors 308. The output ingestion buffer 310 may maintain authorization records for such entity-specific topics, thus restricting messages of those topics to parties authorized by the first entity. In this manner, data security for the first entity can be ensured across the intake system 210. Similar operations may be performed for other entities, thus allowing multiple entities to separately and confidentially publish data to and retrieve data from the intake system.

4.1.6 Message Processing Algorithm

Figure 5:
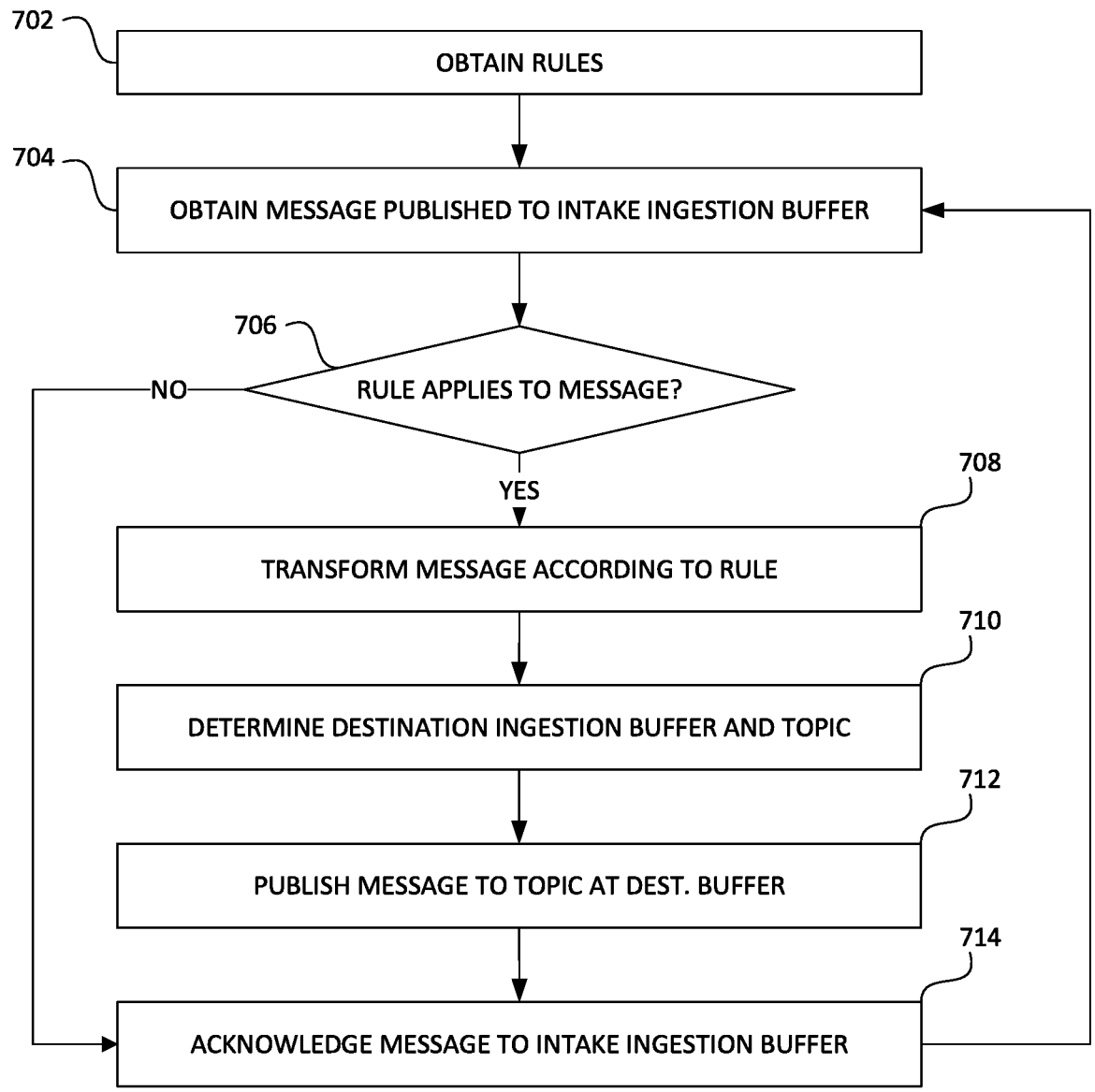
FIG. 5 is a flowchart depicting an illustrative routine for processing data at an intake system, according to example embodiments.

With reference to FIG. 5, an illustrative algorithm or routine for processing messages at the intake system 210 will be described in the form of a flowchart. The routine begins at block b102, where the intake system 210 obtains one or more rules for handling messages enqueued at an intake ingestion buffer 306. As noted above, the rules may, for example, be human-generated, or may be automatically generated based on operation of the data intake and query system 108 (e.g., in response to user submission of a query to the system 108).

At block 704, the intake system 210 obtains a message at the intake ingestion buffer 306. The message may be published to the intake ingestion buffer 306, for example, by the data retrieval subsystem 304 (e.g., working in conjunction with a forwarder 302) and reflect data obtained from a data source 202.

At block 706, the intake system 210 determines whether any obtained rule applies to the message. Illustratively, the intake system 210 (e.g., via the streaming data processors 308) may apply selection criteria of each rule to the message to determine whether the message satisfies the selection criteria. Thereafter, the routine varies according to whether a rule applies to the message. If no rule applies, the routine can continue to block 714, where the intake system 210 transmits an acknowledgement for the message to the intake ingestion buffer 306, thus enabling the buffer 306 to discard the message (e.g., once all other subscribers have acknowledged the message). In some variations of the routine, a "default rule" may be applied at the intake system 210, such that all messages are processed as least according to the default rule. The default rule may, for example, forward the message to an indexing topic 342 for processing by an indexing system 212. In such a configuration, block 706 may always evaluate as true.

In the instance that at least one rule is determined to apply to the message, the routine continues to block 708, where the intake system 210 (e.g., via the streaming data processors 308) transforms the message as specified by the applicable rule. For example, a processing sub-rule of the applicable rule may specify that data or metadata of the message be converted from one format to another via an algorithmic transformation. As such, the intake system 210 may apply the algorithmic transformation to the data or metadata of the message at block 708 to transform the data or metadata of the message. In some instances, no transformation may be specified within intake system 210, and thus block 708 may be omitted.

At block 710, the intake system 210 determines a destination ingestion buffer to which to publish the (potentially transformed) message, as well as a topic to which the message should be published. The destination ingestion buffer and topic may be specified, for example, in processing sub-rules of the rule determined to apply to the message. In one embodiment, the destination ingestion buffer and topic may vary according to the data or metadata of the message. In another embodiment, the destination ingestion buffer and topic may be fixed with respect to a particular rule.

At block 712, the intake system 210 publishes the (potentially transformed) message to the determined destination ingestion buffer and topic. The determined destination ingestion buffer may be, for example, the intake ingestion buffer 306 or the output ingestion buffer 310. Thereafter, at block 714, the intake system 210 acknowledges the initial message on the intake ingestion buffer 306, thus enabling the intake ingestion buffer 306 to delete the message.

Thereafter, the routine returns to block 704, where the intake system 210 continues to process messages from the intake ingestion buffer 306. Because the destination ingestion buffer determined during a prior implementation of the routine may be the intake ingestion buffer 306, the routine may continue to process the same underlying data within multiple messages published on that buffer 306 (thus implementing an iterative processing loop with respect to that data). The routine may then continue to be implemented during operation of the intake system 210, such that data published to the intake ingestion buffer 306 is processed by the intake system 210 and made available on an output ingestion buffer 310 to downstream systems or components.

While the routine of FIG. 5 is described linearly, various implementations may involve concurrent or at least partially parallel processing. For example, in one embodiment, the intake system 210 is configured to process a message according to all rules determined to apply to that message. Thus for example if at block 706 five rules are determined to apply to the message, the intake system 210 may implement five instances of blocks 708 through 714, each of which may transform the message in different ways or publish the message to different ingestion buffers or topics. These five instances may be implemented in serial, parallel, or a combination thereof. Thus, the linear description of FIG. 5 is intended simply for illustrative purposes.

While the routine of FIG. 5 is described with respect to a single message, in some embodiments streaming data processors 308 may be configured to process multiple messages concurrently or as a batch. Similarly, all or a portion of the rules used by the streaming data processors 308 may apply to sets or batches of messages. Illustratively, the streaming data processors 308 may obtain a batch of messages from the intake ingestion buffer 306 and process those messages according to a set of "batch" rules, whose criteria and/or processing sub-rules apply to the messages of the batch collectively. Such rules may, for example, determine aggregate attributes of the messages within the batch, sort messages within the batch, group subsets of messages within the batch, and the like. In some instances, such rules may further alter messages based on aggregate attributes, sorting, or groupings. For example, a rule may select the third messages within a batch, and perform a specific operation on that message. As another example, a rule may determine how many messages within a batch are contained within a specific group of messages. Various other examples for batch-based rules will be apparent in view of the present disclosure. Batches of messages may be determined based on a variety of criteria. For example, the streaming data processors 308 may batch messages based on a threshold number of messages (e.g., each thousand messages), based on timing (e.g., all messages received over a ten minute window), or based on other criteria (e.g., the lack of new messages posted to a topic within a threshold period of time).

4.4. Data Ingestion, Indexing, and Storage Flow

Figure 6A:
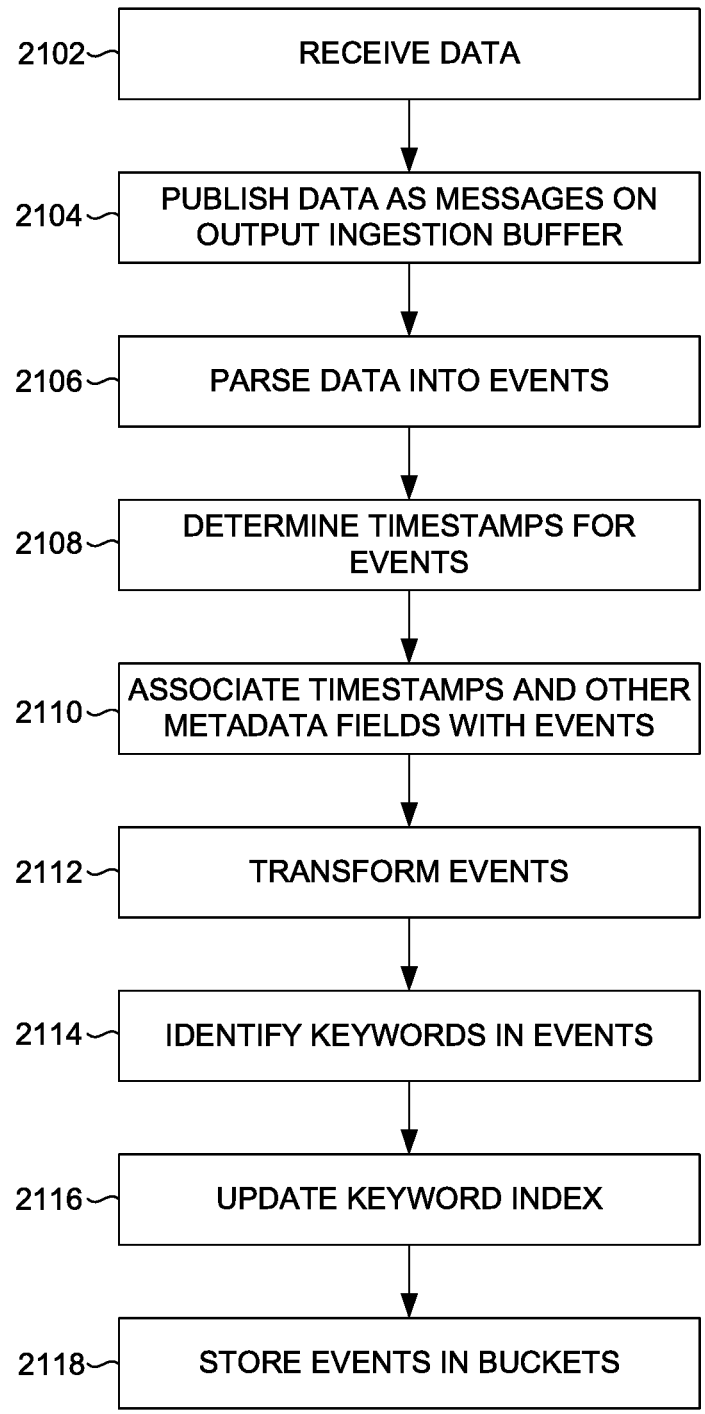
FIG. 6A is a flowchart of an example method that illustrates how indexers process, index, and store data received from intake system, in accordance with example embodiments.

FIG. 6A is a flow diagram of an example method that illustrates how a data intake and query system 108 processes, indexes, and stores data received from data sources 202, in accordance with example embodiments. The data flow illustrated in FIG. 6A is provided for illustrative purposes only; it will be understood that one or more of the steps of the processes illustrated in FIG. 6A may be removed or that the ordering of the steps may be changed. Furthermore, for the purposes of illustrating a clear example, one or more particular system components are described in the context of performing various operations during each of the data flow stages. For example, the intake system 210 is described as receiving and processing machine data during an input phase; the indexing system 212 is described as parsing and indexing machine data during parsing and indexing phases; and a query system 214 is described as performing a search query during a search phase. However, other system arrangements and distributions of the processing steps across system components may be used.

4.4.1. Input

At block 2102, the intake system 210 receives data from an input source, such as a data source 202 shown in FIG. 2. The intake system 210 initially may receive the data as a raw data stream generated by the input source. For example, the intake system 210 may receive a data stream from a log file generated by an application server, from a stream of network data from a network device, or from any other source of data. In some embodiments, the intake system 210 receives the raw data and may segment the data stream into messages, possibly of a uniform data size, to facilitate subsequent processing steps. The intake system 210 may thereafter process the messages in accordance with one or more rules, as discussed above for example with reference to FIGS. 6 and 7, to conduct preliminary processing of the data. In one embodiment, the processing conducted by the intake system 210 may be used to indicate one or more metadata fields applicable to each message. For example, the intake system 210 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included during the input phase, such as a character encoding of the data, if known, and possibly other values that provide information relevant to later processing steps.

At block 2104, the intake system 210 publishes the data as messages on an output ingestion buffer 310. Illustratively, other components of the data intake and query system 108 may be configured to subscribe to various topics on the output ingestion buffer 310, thus receiving the data of the messages when published to the buffer 310.

4.4.2. Parsing

At block 2106, the indexing system 212 receives messages from the intake system 210 (e.g., by obtaining the messages from the output ingestion buffer 310) and parses the data of the message to organize the data into events. In some embodiments, to organize the data into events, the indexing system 212 may determine a sourcetype associated with each message (e.g., by extracting a sourcetype label from the metadata fields associated with the message, etc.) and refer to a sourcetype configuration corresponding to the identified sourcetype. The sourcetype definition may include one or more properties that indicate to the indexing system 212 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 212, the indexing system 212 may infer a sourcetype for the data by examining the structure of the data. Then, the indexing system 212 can apply an inferred sourcetype definition to the data to create the events.

At block 2108, the indexing system 212 determines a timestamp for each event. Similar to the process for parsing machine data, an indexing system 212 may again refer to a sourcetype definition associated with the data to locate one or more properties that indicate instructions for determining a timestamp for each event. The properties may, for example, instruct the indexing system 212 to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 2110, the indexing system 212 associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 2104, the default metadata fields associated with each event may include a host, source, and sourcetype field including or in addition to a field storing the timestamp.

At block 2112, the indexing system 212 may optionally apply one or more transformations to data included in the events created at block 2106. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more sourcetype definitions.

Figure 6B:
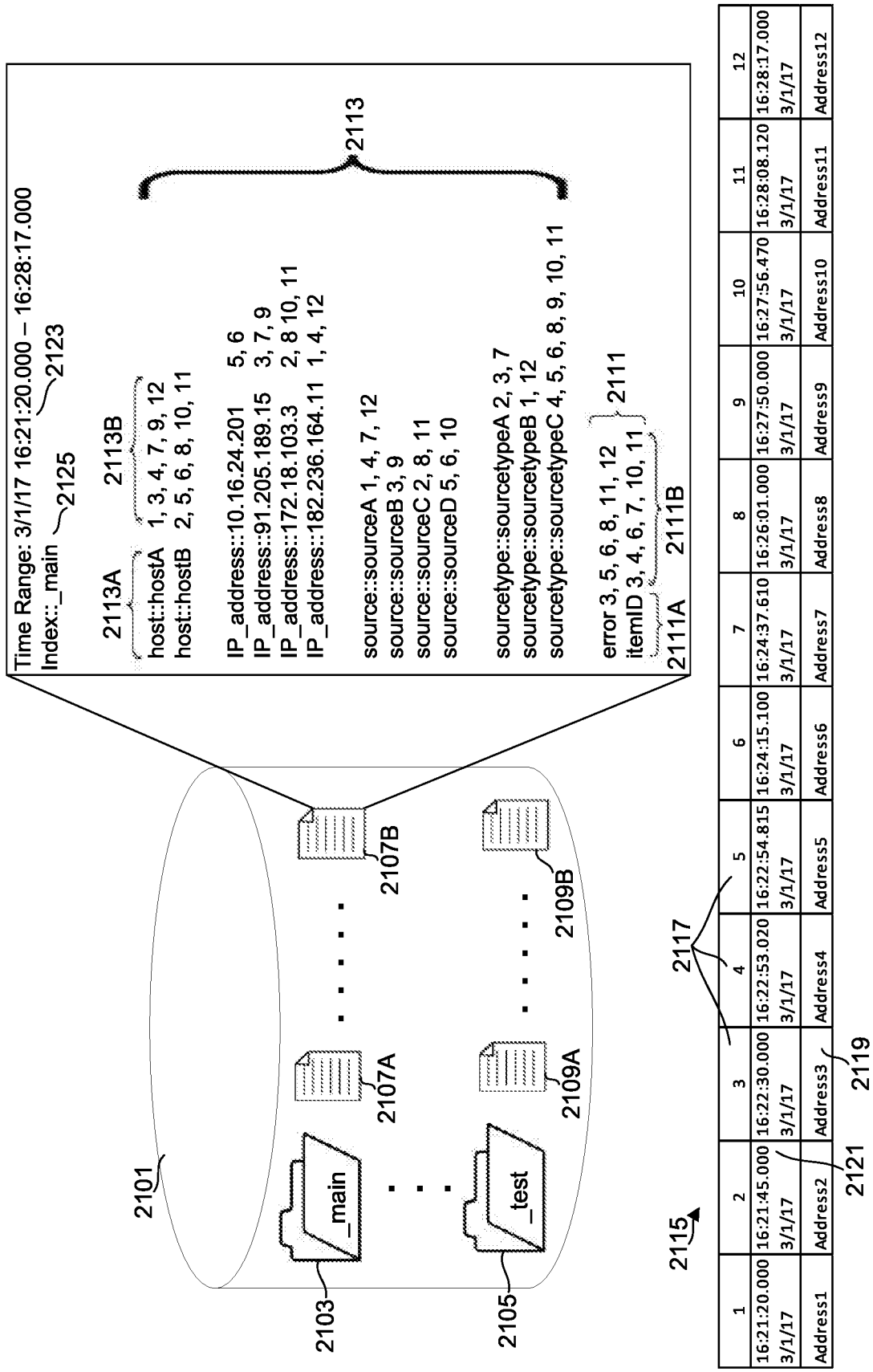
FIG. 6B is a block diagram of a data structure in which time-stamped event data can be stored in a data store, in accordance with example embodiments.
Figure 7A:
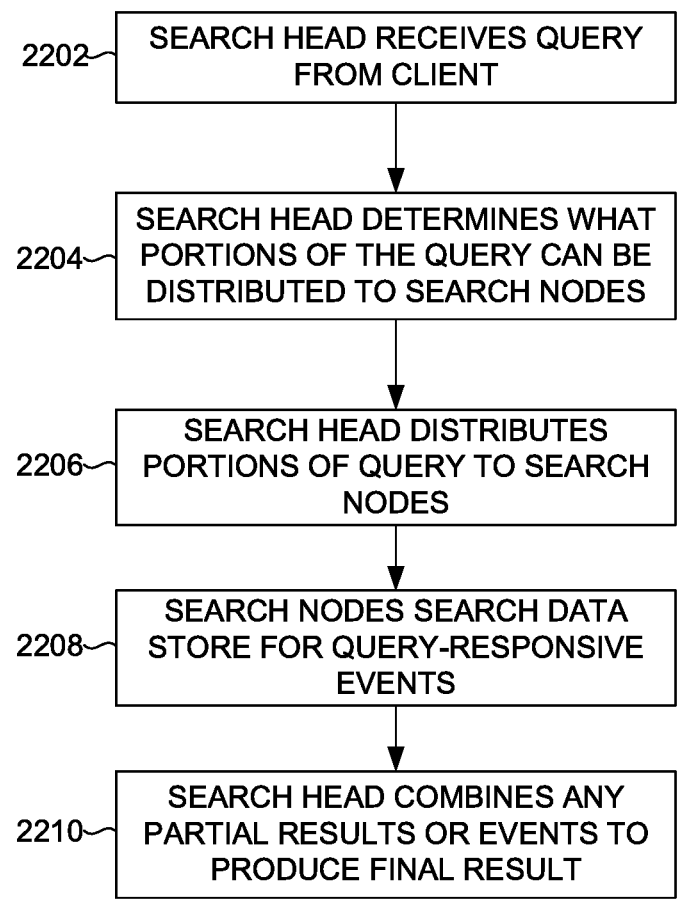
FIG. 7A is a flow diagram of an example method that illustrates how a search head and indexers perform a search query, in accordance with example embodiments.

FIG. 6B illustrates an illustrative example of how machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 6B is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 2136, source 2137, sourcetype 2138 and timestamps 2135 can be generated for each event, and associated with a corresponding portion of machine data 2139 when storing the event data in a data store, e.g., data store 218. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexing system 212 based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 6B, the first three rows of the table represent events 2131, 2132, and 2133 and are related to a server access log that records requests from multiple clients processed by a server, as indicated by entry of "access.log" in the source column 2136.

In the example shown in FIG. 6B, each of the events 2131-2133 is associated with a discrete request made from a client device. The raw machine data generated by the server and extracted from a server access log can include the IP address of the client 2140, the user id of the person requesting the document 2141, the time the server finished processing the request 2142, the request line from the client 2143, the status code returned by the server to the client 2145, the size of the object returned to the client (in this case, the gif file requested by the client) 2146 and the time spent to serve the request in microseconds 2144. As seen in FIG. 6B, all the raw machine data retrieved from the server access log is retained and stored as part of the corresponding events, 2131-2133 in the data store.

Event 2134 is associated with an entry in a server error log, as indicated by "error.log" in the source column 2137 that records errors that the server encountered when processing a client request. Similar to the events related to the server access log, all the raw machine data in the error log file pertaining to event 2134 can be preserved and stored as part of the event 2134.

Saving minimally processed or unprocessed machine data in a data store associated with metadata fields in the manner similar to that shown in FIG. 6B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

4.4.3. Indexing

At blocks 2114 and 2116, the indexing system 212 can optionally generate a keyword index to facilitate fast keyword searching for events. To build a keyword index, at block 2114, the indexing system 212 identifies a set of keywords in each event. At block 2116, the indexing system 212 includes the identified keywords in an index, which associates each stored keyword with reference pointers to events containing that keyword (or to locations within events where that keyword is located, other location identifiers, etc.). When the data intake and query system 108 subsequently receives a keyword-based query, the query system 214 can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dent" may be created for the event, and assigned a value of "10.0.1.2".

At block 2118, the indexing system 212 stores the events with an associated timestamp in a local data store 218 and/or common storage 216. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 212 may be responsible for storing the events contained in various data stores 218 of common storage 216. By distributing events among the data stores in common storage 216, the query system 214 can analyze events for a query in parallel. For example, using map-reduce techniques, each search node can return partial responses for a subset of events to a search head that combines the results to produce an answer for the query. By storing events in buckets for specific time ranges, the indexing system 212 may further optimize the data retrieval process by enabling search nodes to search buckets corresponding to time ranges that are relevant to a query.

In some embodiments, each indexing node of the indexing system 212 has a home directory and a cold directory. The home directory stores hot buckets and warm buckets, and the cold directory stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexing node may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexing node may store old, archived data in a frozen bucket that is not capable of being searched at search time. In some embodiments, a frozen bucket may be stored in slower and/or larger memory, such as a hard disk, and may be stored in offline and/or remote storage.

In some embodiments, an indexing node may not include a cold directory and/or cold or frozen buckets. For example, as warm buckets and/or merged buckets are copied to common storage 216, they can be deleted from the indexing node. In certain embodiments, one or more data stores 218 of the common storage 216 can include a home directory that includes warm buckets copied from the indexing nodes and a cold directory of cold or frozen buckets as described above.

Moreover, events and buckets can also be replicated across different indexing nodes and data stores 218 of the common storage 216.

4.6. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 7B:
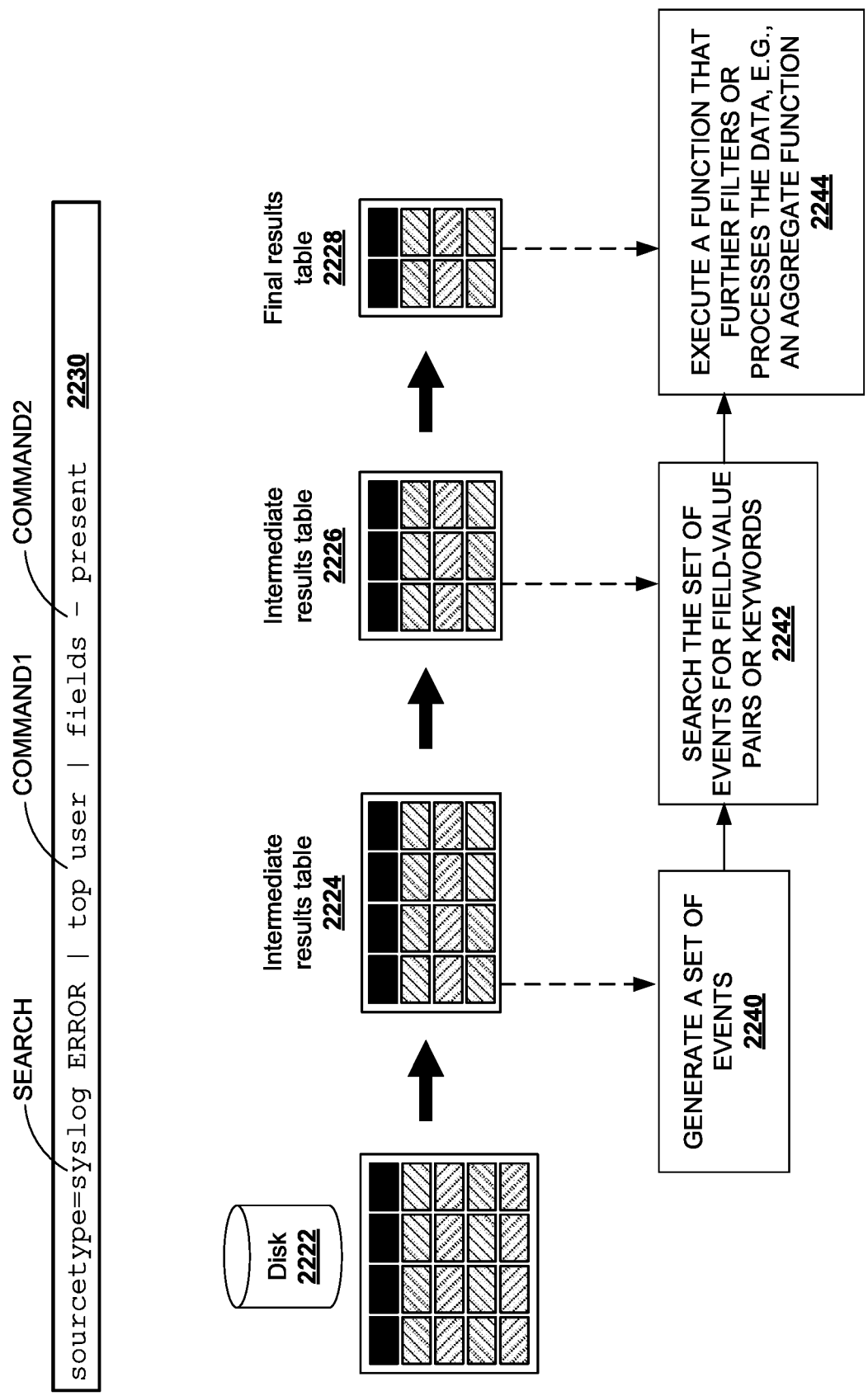
FIG. 7B provides a visual representation of an example manner in which a pipelined command language or query operates, in accordance with example embodiments.

FIG. 7B provides a visual representation of the manner in which a pipelined command language or query operates in accordance with the disclosed embodiments. The query 2230 can be inputted by the user into a search. The query comprises a search, the results of which are piped to two commands (namely, command 1 and command 2) that follow the search step.

Disk 2222 represents the event data in the raw record data store.

When a user query is processed, a search step will precede other queries in the pipeline in order to generate a set of events at block 2240. For example, the query can comprise search terms "sourcetype=syslog ERROR" at the front of the pipeline as shown in FIG. 7B. Intermediate results table 2224 shows fewer rows because it represents the subset of events retrieved from the index that matched the search terms "sourcetype=syslog ERROR" from search command 2230. By way of further example, instead of a search step, the set of events at the head of the pipeline may be generating by a call to a pre-existing inverted index (as will be explained later).

At block 2242, the set of events generated in the first part of the query may be piped to a query that searches the set of events for field-value pairs or for keywords. For example, the second intermediate results table 2226 shows fewer columns, representing the result of the top command, "top user" which summarizes the events into a list of the top 10 users and displays the user, count, and percentage.

Finally, at block 2244, the results of the prior stage can be pipelined to another stage where further filtering or processing of the data can be performed, e.g., preparing the data for display purposes, filtering the data based on a condition, performing a mathematical calculation with the data, etc. As shown in FIG. 7B, the "fields—percent" part of command 2230 removes the column that shows the percentage, thereby, leaving a final results table 2228 without a percentage column. In different embodiments, other query languages, such as the Structured Query Language ("SQL"), can be used to create a query.

4.7. Field Extraction

The query system 214 allows users to search and visualize events generated from machine data received from homogenous data sources. The query system 214 also allows users to search and visualize events generated from machine data received from heterogeneous data sources. The query system 214 includes various components for processing a query, such as, but not limited to a query system manager, one or more search heads having one or more search masters and search managers, and one or more search nodes. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, a search head (e.g., a search master or search manager) can use extraction rules to extract values for fields in the events being searched. The search head can obtain extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head can apply the extraction rules to events that it receives from search nodes. The search nodes may apply the extraction rules to events in an associated data store or common storage 216. Extraction rules can be applied to all the events in a data store or common storage 216 or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 8A:
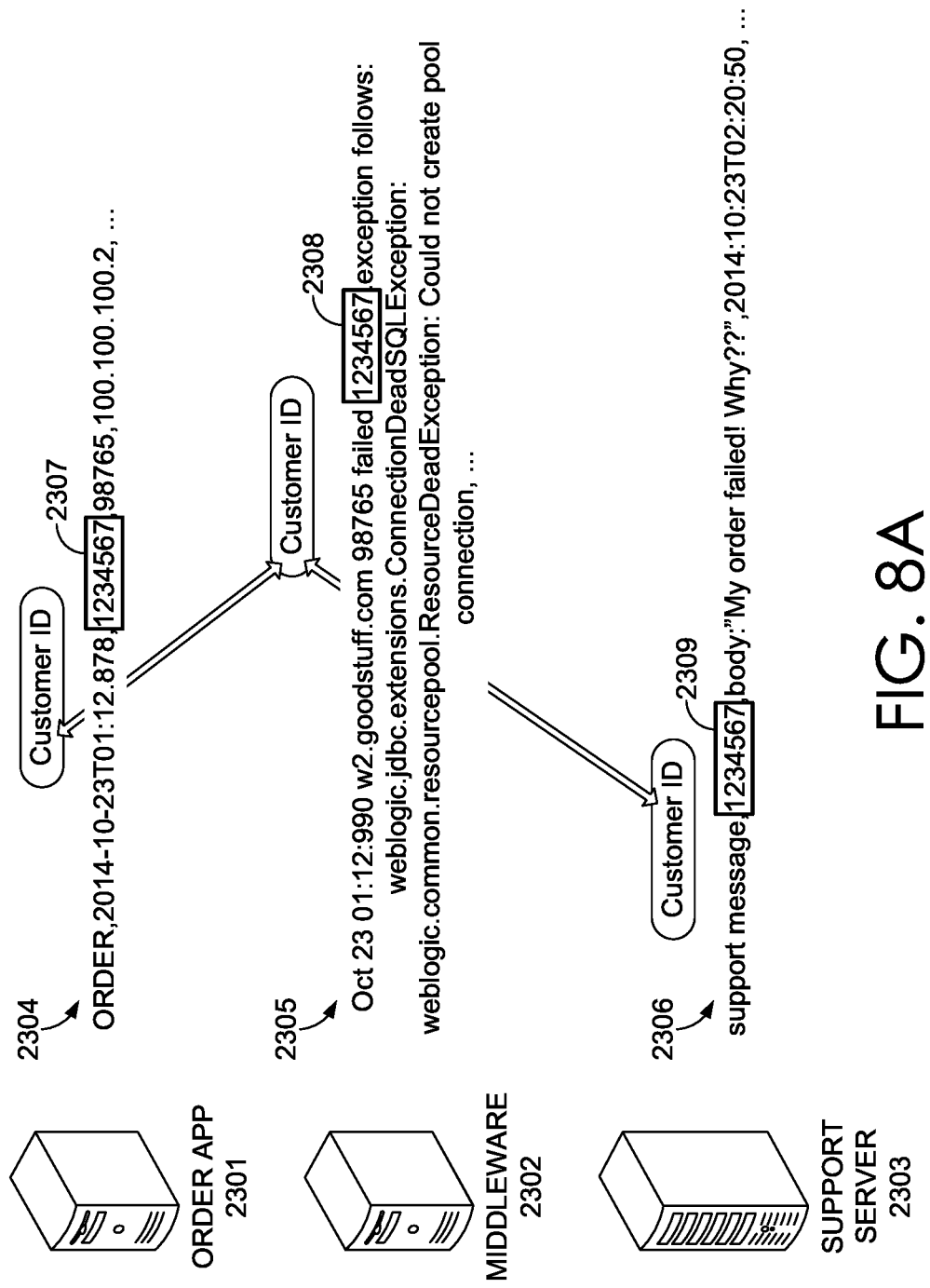
FIG. 8A is a diagram of an example scenario where a common customer identifier is found among log data received from three disparate data sources, in accordance with example embodiments.

FIG. 8A is a diagram of an example scenario where a common customer identifier is found among log data received from three disparate data sources, in accordance with example embodiments. In this example, a user submits an order for merchandise using a vendor's shopping application program 2301 running on the user's system. In this example, the order was not delivered to the vendor's server due to a resource exception at the destination server that is detected by the middleware code 2302. The user then sends a message to the customer support server 2303 to complain about the order failing to complete. The three systems 2301, 2302, and 2303 are disparate systems that do not have a common logging format. The order application 2301 sends log data 2304 to the data intake and query system 108 in one format, the middleware code 2302 sends error log data 2305 in a second format, and the support server 2303 sends log data 2306 in a third format.

Using the log data received at the data intake and query system 108 from the three systems, the vendor can uniquely obtain an insight into user activity, user experience, and system behavior. The query system 214 allows the vendor's administrator to search the log data from the three systems, thereby obtaining correlated information, such as the order number and corresponding customer ID number of the person placing the order. The system also allows the administrator to see a visualization of related events via a user interface. The administrator can query the query system 214 for customer ID field value matches across the log data from the three systems that are stored in common storage 216. The customer ID field value exists in the data gathered from the three systems, but the customer ID field value may be located in different areas of the data given differences in the architecture of the systems. There is a semantic relationship between the customer ID field values generated by the three systems. The query system 214 requests events from the one or more data stores 218 to gather relevant events from the three systems. The search head then applies extraction rules to the events in order to extract field values that it can correlate. The search head may apply a different extraction rule to each set of events from each system when the event format differs among systems. In this example, the user interface can display to the administrator the events corresponding to the common customer ID field values 2307, 2308, and 2309, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

The query system 214 enables users to run queries against the stored data to retrieve events that meet criteria specified in a query, such as containing certain keywords or having specific values in defined fields.

Figure 8B:
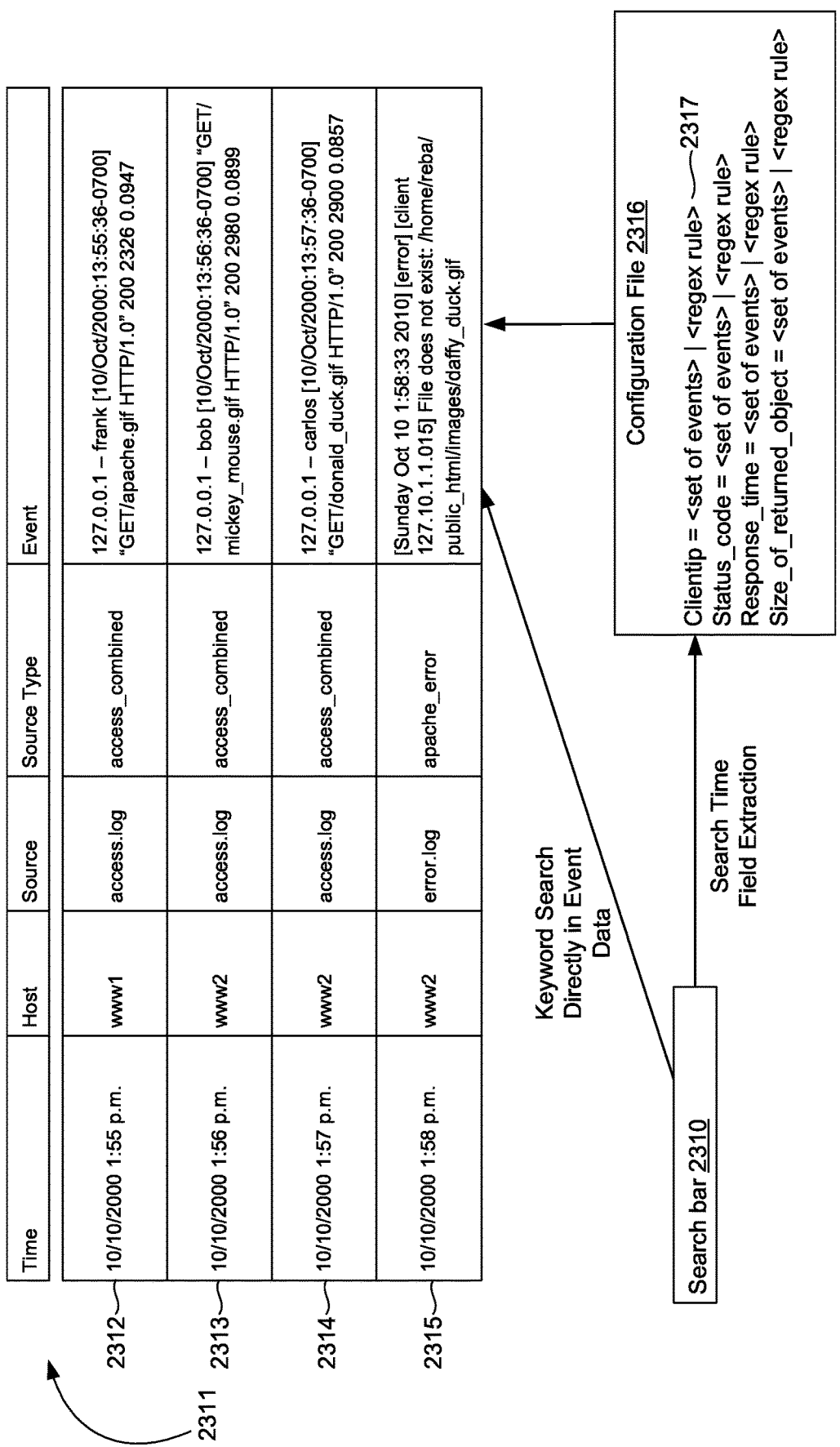
FIG. 8B illustrates an example of processing keyword searches and field searches, in accordance with disclosed embodiments.
Figure 10:
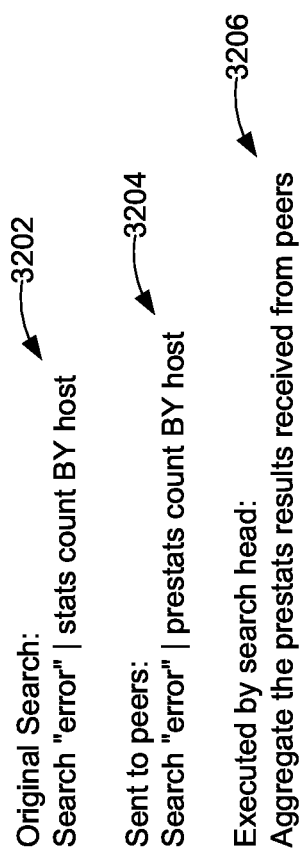
FIG. 10 is an example search query received from a client and executed by search peers, in accordance with example embodiments.

FIG. 8B illustrates the manner in which keyword searches and field searches are processed in accordance with disclosed embodiments.

If a user inputs a search query into search bar 2310 that includes only keywords (also known as "tokens"), e.g., the keyword "error" or "warning", the query system 214 of the data intake and query system 108 can search for those keywords directly in the event data 2311 stored in the raw record data store. Note that while FIG. 8B only illustrates four events 2312, 2313, 2314, 2315, the raw record data store (corresponding to data store 218 in FIG. 2) may contain records for millions of events.

As disclosed above, the indexing system 212 can optionally generate a keyword index to facilitate fast keyword searching for event data. The indexing system 212 can include the identified keywords in an index, which associates each stored keyword with reference pointers to events containing that keyword (or to locations within events where that keyword is located, other location identifiers, etc.). When the query system 214 subsequently receives a keyword-based query, the query system 214 can access the keyword index to quickly identify events containing the keyword. For example, if the keyword "HTTP" was indexed by the indexing system 212 at index time, and the user searches for the keyword "HTTP", the events 2312, 2313, and 2314, will be identified based on the results returned from the keyword index. As noted above, the index contains reference pointers to the events containing the keyword, which allows for efficient retrieval of the relevant events from the raw record data store.

If a user searches for a keyword that has not been indexed by the indexing system 212, the data intake and query system 108 may nevertheless be able to retrieve the events by searching the event data for the keyword in the raw record data store directly as shown in FIG. 8B. For example, if a user searches for the keyword "frank", and the name "frank" has not been indexed at search time, the query system 214 can search the event data directly and return the first event 2312. Note that whether the keyword has been indexed at index time or search time or not, in both cases the raw data with the events 2311 is accessed from the raw data record store to service the keyword search. In the case where the keyword has been indexed, the index will contain a reference pointer that will allow for a more efficient retrieval of the event data from the data store. If the keyword has not been indexed, the query system 214 can search through the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the query system 214 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system 108 advantageously allows for search time field extraction. In other words, fields can be extracted from the event data at search time using late-binding schema as opposed to at data ingestion time, which was a major limitation of the prior art systems.

In response to receiving the search query, a search head of the query system 214 can use extraction rules to extract values for the fields associated with a field or fields in the event data being searched. The search head can obtain extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 8B illustrates the manner in which configuration files may be used to configure custom fields at search time in accordance with the disclosed embodiments. In response to receiving a search query, the data intake and query system 108 determines if the query references a "field." For example, a query may request a list of events where the "clientip" field equals "127.0.0.1." If the query itself does not specify an extraction rule and if the field is not a metadata field, e.g., time, host, source, sourcetype, etc., then in order to determine an extraction rule, the query system 214 may, in one or more embodiments, need to locate configuration file 2316 during the execution of the search as shown in FIG. 8B.

Configuration file 2316 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 2316.

In some embodiments, the indexing system 212 can automatically discover certain custom fields at index time and the regular expressions for those fields will be automatically generated at index time and stored as part of extraction rules in configuration file 2316. For example, fields that appear in the event data as "key=value" pairs may be automatically extracted as part of an automatic field discovery process. Note that there may be several other ways of adding field definitions to configuration files in addition to the methods discussed herein.

The search head can apply the extraction rules derived from configuration file 2316 to event data that it receives from search nodes. The search nodes may apply the extraction rules from the configuration file to events in an associated data store or common storage 216. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 2316 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 2315 also contains "clientip" field, however, the "clientip" field is in a different format from events 2312, 2313, and 2314. To address the discrepancies in the format and content of the different types of events, the configuration file will also need to specify the set of events that an extraction rule applies to, e.g., extraction rule 2317 specifies a rule for filtering by the type of event and contains a regular expression for parsing out the field value. Accordingly, each extraction rule can pertain to only a particular type of event. If a particular field, e.g., "clientip" occurs in multiple types of events, each of those types of events can have its own corresponding extraction rule in the configuration file 2316 and each of the extraction rules would comprise a different regular expression to parse out the associated field value. The most common way to categorize events is by sourcetype because events generated by a particular source can have the same format.

The field extraction rules stored in configuration file 2316 perform search-time field extractions. For example, for a query that requests a list of events with sourcetype "access_combined" where the "clientip" field equals "127.0.0.1," the query system 214 can first locate the configuration file 2316 to retrieve extraction rule 2317 that allows it to extract values associated with the "clientip" field from the event data 2320 "where the sourcetype is "access_combined. After the "clientip" field has been extracted from all the events comprising the "clientip" field where the sourcetype is "access_combined," the query system 214 can then execute the field criteria by performing the compare operation to filter out the events where the "clientip" field equals "127.0.0.1." In the example shown in FIG. 8B, the events 2312, 2313, and 2314 would be returned in response to the user query. In this manner, the query system 214 can service queries containing field criteria in addition to queries containing keyword criteria (as explained above).

In some embodiments, the configuration file 2316 can be created during indexing. It may either be manually created by the user or automatically generated with certain predetermined field extraction rules. The events may be distributed across several data stores in common storage 216, wherein various indexing nodes may be responsible for storing the events in the common storage 216 and various search nodes may be responsible for searching the events contained in common storage 216.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system 108 maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different sourcetypes. This allows the data intake and query system 108 to search and correlate data across heterogeneous sources flexibly and efficiently.

Further, by providing the field definitions for the queried fields at search time, the configuration file 2316 allows the record data store to be field searchable. In other words, the raw record data store can be searched using keywords as well as fields, wherein the fields are searchable name/value pairings that distinguish one event from another and can be defined in configuration file 2316 using extraction rules. In comparison to a search containing field names, a keyword search does not need the configuration file and can search the event data directly as shown in FIG. 8B.

It should also be noted that any events filtered out by performing a search-time field extraction using a configuration file 2316 can be further processed by directing the results of the filtering step to a processing step using a pipelined search language. Using the prior example, a user can pipeline the results of the compare step to an aggregate function by asking the query system 214 to count the number of events where the "clientip" field equals "127.0.0.1."

4.8. Example Search Screen

Figure 9A:
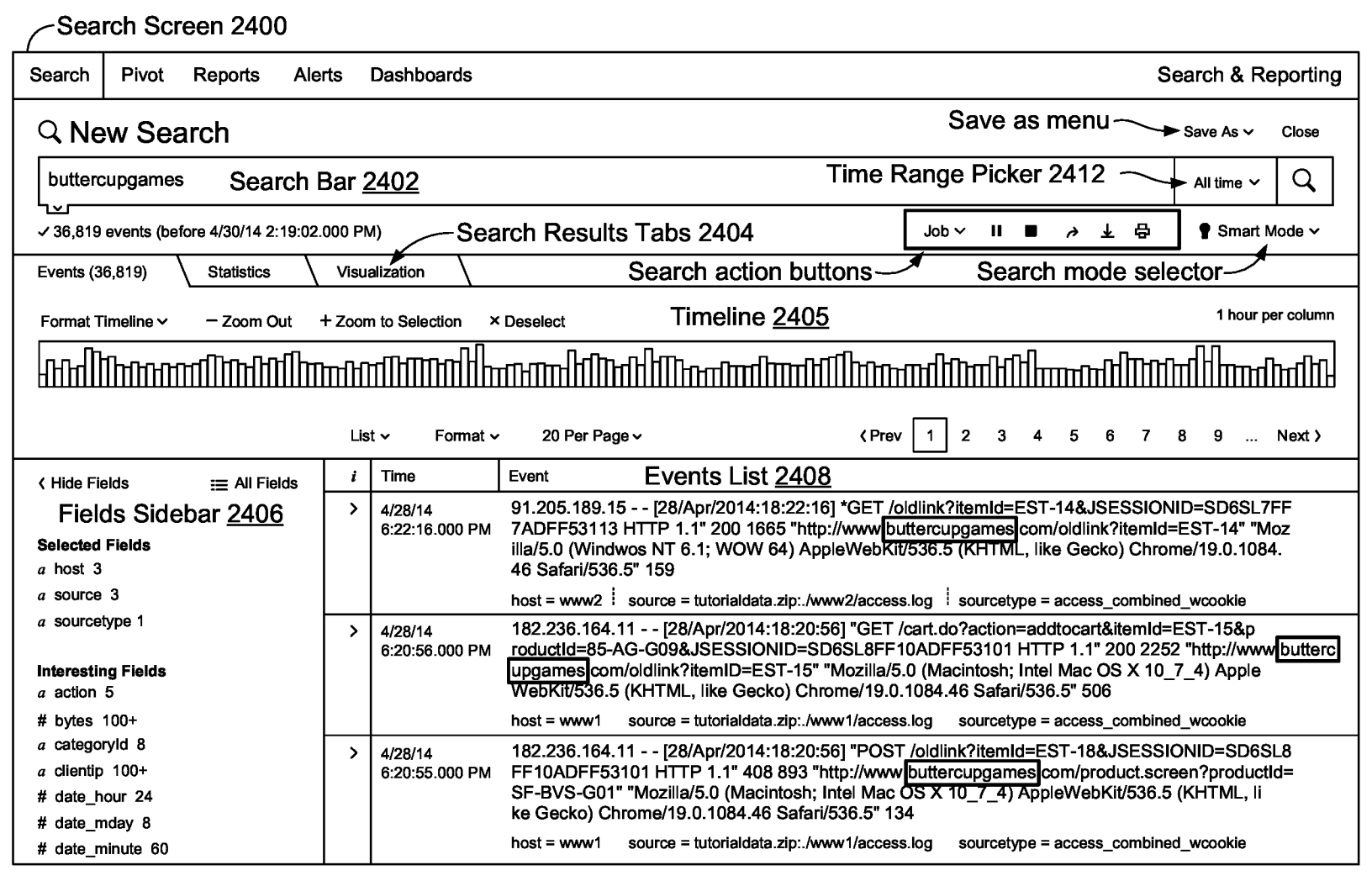

FIG. 9A is an interface diagram of an example user interface for a search screen 2400, in accordance with example embodiments. Search screen 2400 includes a search bar 2402 that accepts user input in the form of a search string. It also includes a time range picker 2412 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 2400 also initially displays a "data summary" dialog as is illustrated in FIG. 9B that enables the user to select different sources for the events, such as by selecting specific hosts and log files.

After the search is executed, the search screen 2400 in FIG. 9A can display the results through search results tabs 2404, wherein search results tabs 2404 includes: an "events tab" that displays various information about events returned by the search; a "statistics tab" that displays statistics about the search results; and a "visualization tab" that displays various visualizations of the search results. The events tab illustrated in FIG. 9A displays a timeline graph 2405 that graphically illustrates the number of events that occurred in one-hour intervals over the selected time range. The events tab also displays an events list 2408 that enables a user to view the machine data in each of the returned events.

The events tab additionally displays a sidebar that is an interactive field picker 2406. The field picker 2406 may be displayed to a user in response to the search being executed and allows the user to further analyze the search results based on the fields in the events of the search results. The field picker 2406 includes field names that reference fields present in the events in the search results. The field picker may display any Selected Fields 2420 that a user has pre-selected for display (e.g., host, source, sourcetype) and may also display any Interesting Fields 2422 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 2424.

Each field name in the field picker 2406 has a value type identifier to the left of the field name, such as value type identifier 2426. A value type identifier identifies the type of value for the respective field, such as an "a" for fields that include literal values or a "#" for fields that include numerical values.

Each field name in the field picker also has a unique value count to the right of the field name, such as unique value count 2428. The unique value count indicates the number of unique values for the respective field in the events of the search results.

Each field name is selectable to view the events in the search results that have the field referenced by that field name. For example, a user can select the "host" field name, and the events shown in the events list 2408 will be updated with events in the search results that have the field that is reference by the field name "host."

4.12. Security Features

The data intake and query system 108 provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system 108. The enterprise security application provides the security practitioner with visibility into security-relevant threats found in the enterprise infrastructure by capturing, monitoring, and reporting on data from enterprise security devices, systems, and applications. Through the use of the data intake and query system 108 searching and reporting capabilities, the enterprise security application provides a top-down and bottom-up view of an organization's security posture.

The enterprise security application leverages the data intake and query system 108 search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF A14ESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF A14ESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME A14ESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 11A:
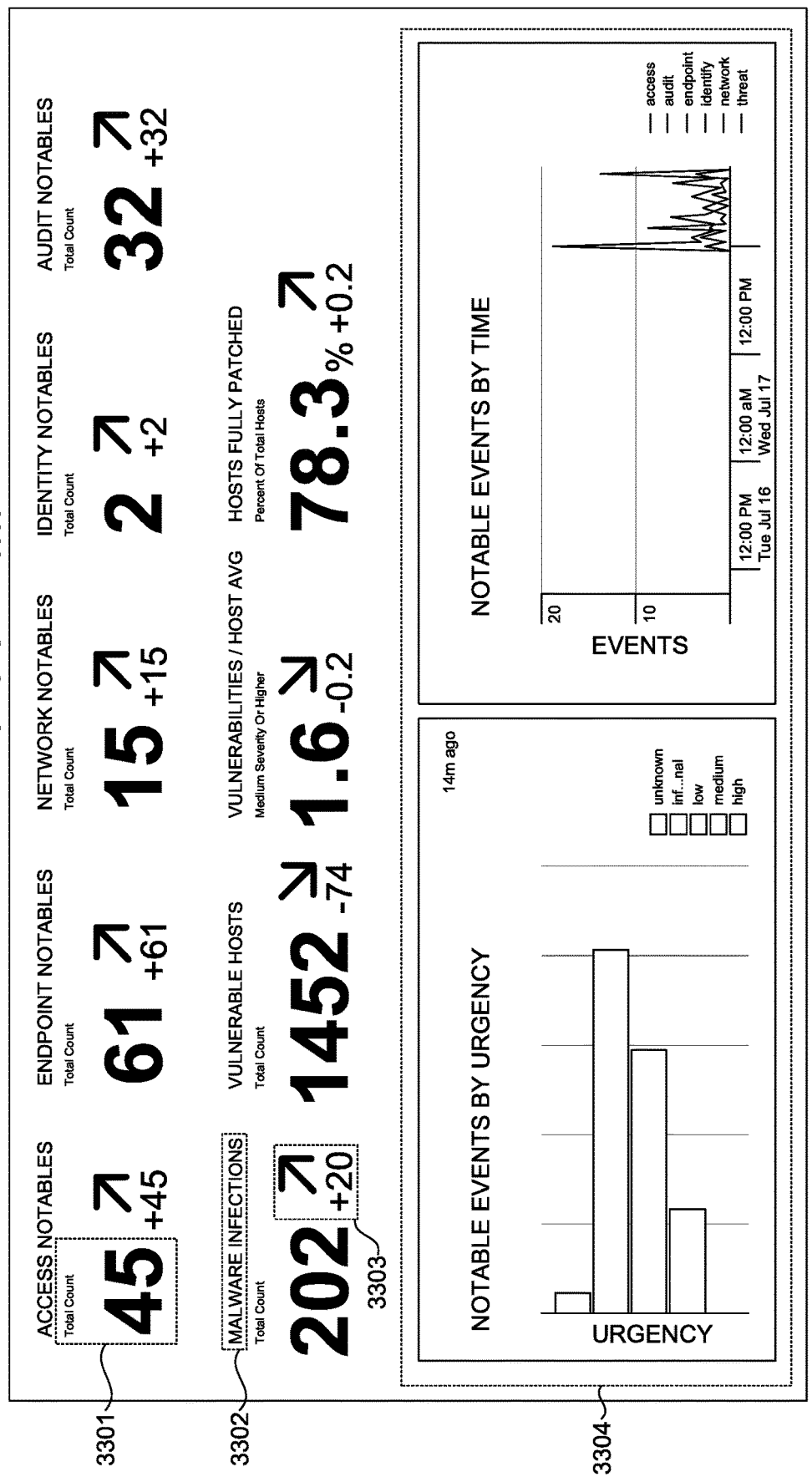
FIG. 11A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 11A illustrates an example key indicators view 3300 that comprises a dashboard, which can display a value 3301, for various security-related metrics, such as malware infections 3302. It can also display a change in a metric value 3303, which indicates that the number of malware infections increased by 63 during the preceding interval. Key indicators view 3300 additionally displays a histogram panel 3304 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 11B illustrates an example incident review dashboard 3310 that includes a set of incident attribute fields 3311 that, for example, enables a user to specify a time range field 3312 for the displayed events. It also includes a timeline 3313 that graphically illustrates the number of incidents that occurred in time intervals over the selected time range. It additionally displays an events list 3314 that enables a user to view a list of all of the notable events that match the criteria in the incident attributes fields 3311. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

4.13. Data Center Monitoring

As mentioned above, the data intake and query platform provides various features that simplify the developer's task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 11C:
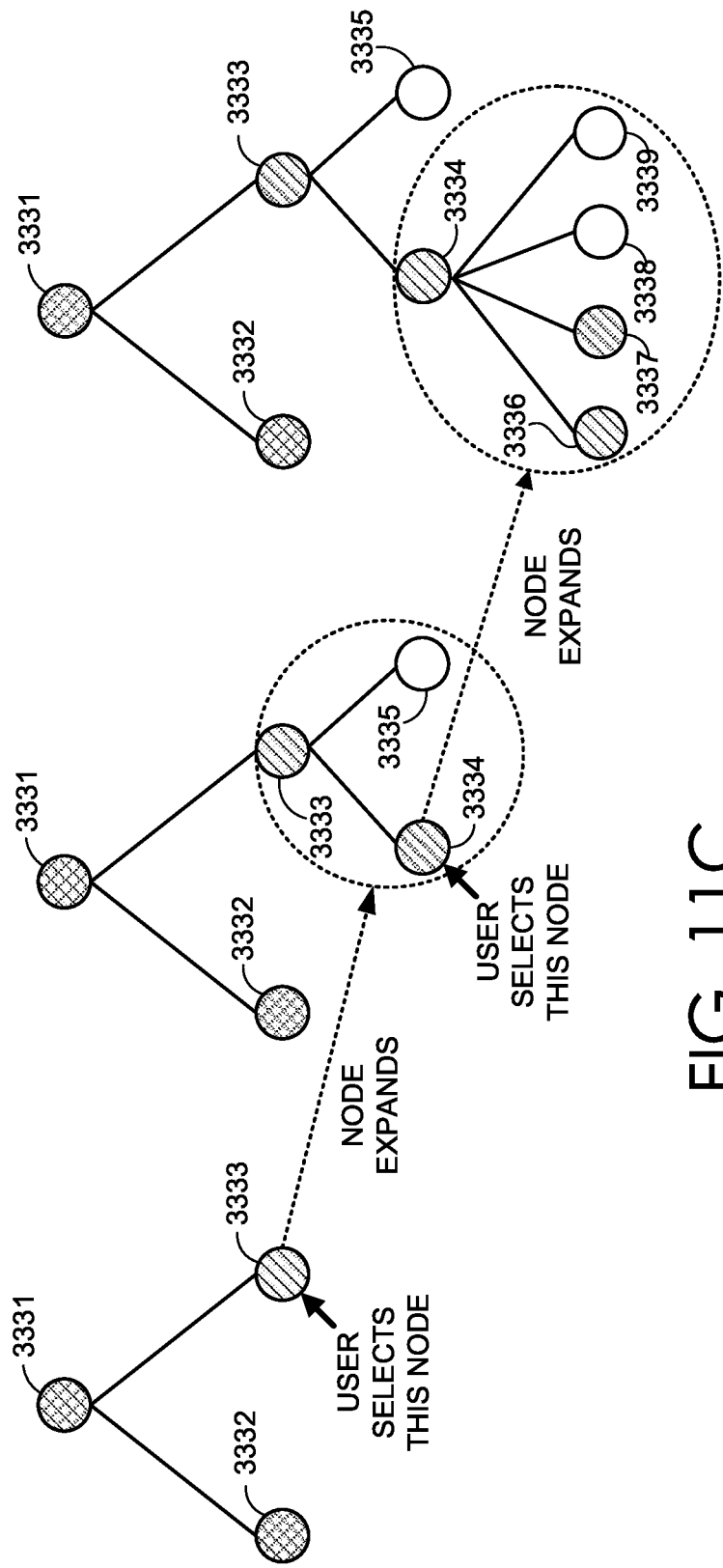
FIG. 11C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 11C, wherein nodes 3333 and 3334 are selectively expanded. Note that nodes 3331-3339 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TR16 WITH SEVERITY STATE SORTING", issued on 10 Nov. 2015, and U.S. Pat. No. 9,426,045, also entitled "PROACTIVE MONITORING TR16 WITH SEVERITY STATE SORTING", issued on 23 Aug. 2016, each of which is hereby incorporated by reference in its entirety for all purposes.

Figure 11D:
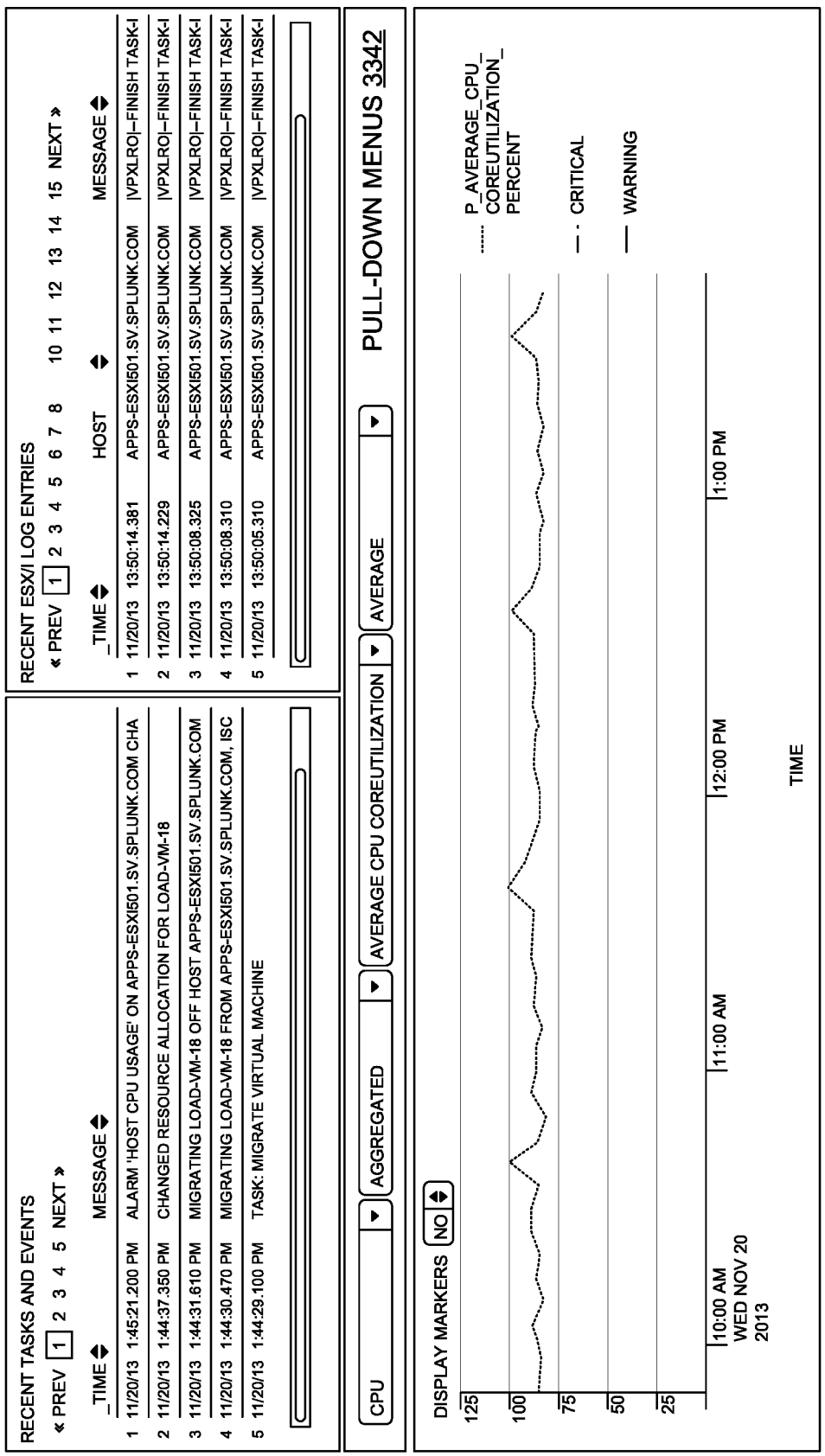
FIG. 11D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 11D displays a listing of recent "tasks and events" and a listing of recent "log entries" for a selected time range above a performance-metric graph for "average CPU core utilization" for the selected time range. Note that a user is able to operate pull-down menus 3342 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

4.14. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system 108 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

One or more Key Performance Indicators (KPI's) are defined for a service within the IT monitoring application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

The IT monitoring application facilitates the production of meaningful aggregate KPI's through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a CSV, another delimited file, or a search query result set). The import may be GUI-mediated or processed using import parameters from a GUI-based import definition process. Entity definitions in the IT monitoring application can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

5.0. Sourcetype Inference and Smart Sourcetyping

Embodiments of the present disclosure relate to inferring sourcetypes of messages using an inference model based on analyzing the messages. As used herein, a "sourcetype" may refer to a type, or category, of a data format of a portion of machine data and/or a lack thereof. In some embodiments, a sourcetype refers to a type, or category, of a data source of the portion of machine data and/or a message (e.g., an event) comprising the portion of machine data. Further, a sourcetype of a message may refer to a value of a field (e.g., a metadata field) that may be assigned to the message to indicate the type, or category, of the message. When these messages are processed, sourcetypes associated with the messages may be a basis for selecting extraction rules to identify fields in the raw data and/or values of those fields. In order to properly process the messages and to process the appropriate data, it may be imperative that sourcetypes are associated with the messages, and done so accurately.

In some cases, sourcetypes may be assigned to messages that are non-specific or inaccurate, or sourcetypes may be unknown for messages. Even where a message has a sourcetype field value that is accurate, the sourcetype value may be less specific than possible. One example is a "syslog" sourcetype which can refer to data in many different possible formats. In adequacies in associating sourcetypes with messages can lead to improper processing of the messages, can limit the ability of users to gain valuable insight into the composition of the messages, and/or can limit the ability of computing systems to processes the data based on the composition of the messages (e.g., to initiate and/or recommend workflows and user cases associated with sourcetypes). Using inferred sourcetypes of messages, users and systems may have a better understanding of the composition of messages.

Figure 12:
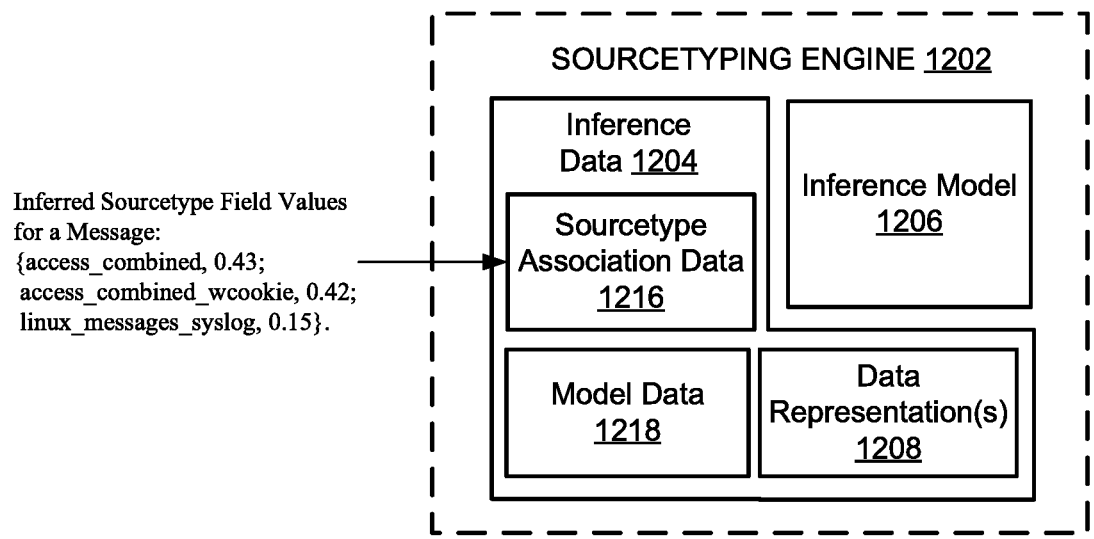
FIG. 12 is a block diagram of an example of a sourcetyping engine, in accordance with example embodiments.

Referring to FIG. 12, a block diagram of an example of a sourcetyping engine 1202 is shown, in accordance with example embodiments. The sourcetyping engine 1202 may be used by and/or incorporated into any of the various components of an intake system (e.g., the intake system 210 of FIG. 2), an indexing system (e.g., the indexing system 212 of FIG. 2), a query system (e.g., the query system 214 of FIG. 2), and/or other systems (e.g., the other system(s) 262), an example of which is later described with respect to FIG. 14. The sourcetyping engine 1202 may be provided in storage of any combination of those systems, wherein the term "storage" refers to a non-transitory computer-readable medium.

Sourcetyping engine 1202 includes inference data 1204 and inference model 1206. Inference model 1206 may refer to one or more logical components operable to make inferences regarding sourcetypes of messages, such as events, that each may include a portion of machine data. These inferences may be used to infer associations between sourcetypes and messages. The inference data 1204 may refer to data used by the inference model 1206 to make such inferences, such as model data 1218 and data representation(s) 1208. Additionally or alternatively, the inference data 1204 may refer to data representative of inferences made by and/or using the inference model 1206.

A sourcetype of a message may be used in various ways by the system(s), such that an unknown or improper sourcetype for a message impacts the ability of the system to operate effectively and without error. For example, the system may perform processing involving a message based on a sourcetype associated with the message. Various examples of such processing are described herein and include processing to filter or select messages, extract information from messages, evaluate and/or determine field values and/or fields associated with messages, calculate statistics regarding messages, order messages, alert and monitor messages, create summaries of messages, perform an aggregation function on messages, to display messages, and/or to execute queries on messages.

In various embodiments, a sourcetype of a message may be used in determining instructions for extracting data from the portion of machine data of the message. As an example, a sourcetype associated with a message may be used to determine a set of extraction rules for extracting values of fields from the portion of machine data of the message. An absence of an associated sourcetype for a message and/or an incorrect sourcetype being associated with a message can prevent one or more fields and/or values thereof from being associated with the message. Further, an incorrect sourcetype being associated with a message can result in erroneous fields and/or values thereof being associated with the message. Therefore, system components that rely on fields and/or field values in processing that involves messages may be impacted by an absence of an associated sourcetype for a message and/or an incorrect sourcetype being associated with a message.

In various embodiments, sourcetyping engine 1202 may receive messages, analyze portions of machine data of the messages and/or associated metadata, and based on the analysis generate the inference data 1204. This may include associating one or more sourcetypes with each message. In some embodiments, sourcetyping engine 1202 receives a message and provides the data representation 1208 of the message to the inference model 1206, which analyzes the data representation 1208 using the model data 1218 to generate an inference regarding the message. A data representation of a message may be a representation of the portion of machine data of the message and may be extracted from and/or generated from the portion of machine data of the message. For example, the data representation 1208 for the message could include a portion of text, such as a character string, that represents the portion of machine data. Additionally or alternatively, the data representation can comprise one or more feature values (in a machine learning context) that correspond to the portion of machine data. As an example, the data representation could include a string of punctuation marks extracted from the portion of machine data of the message. This string may capture a punctuation pattern formed by the character string of the portion of machine data. Additionally, or alternatively, a data representation may include N-grams of a portion of machine data, such as N-grams of the punctuation pattern. A hash value of each N-gram could be generated, compared with one or more hash values of N-grams within training data, where each N-gram in the training data corresponds to a known source type. Based on the one or more comparisons, a predicted source type could be determined for an event. For example, probabilities may be determines that the event corresponds to each of a plurality of known source types (e.g., a probability for one or more known source types). A probability of a first known source type may indicate a likelihood of the event corresponding to the first known source type.

Additionally or alternatively, a vector of the N-grams could be generated for an event. The vector of the N-grams may be compared with one or more vectors of N-grams within training data, wherein each vector in the training data corresponds to a known source type. Based on the one or more comparisons, a predicted source type for the event may be determined. Probabilities may be determined that the event corresponds to each of a plurality of known source types.

The sourcetyping engine 1202 may generate, update, and/or modify the sourcetype association data 1216 based on the inference regarding the message. For example, the sourcetype association data 1216 for the message may include an assignment of at least one sourcetype to a message (e.g., as at least one value of at least one metadata field of the message). Additionally, or alternatively, the sourcetype association data 1216 for the message may include a set of one or more confidence scores (determined by the inference model 1206) that the message corresponds to each of one or more sourcetypes (e.g., a confidence score for each sourcetype). A confidence score may comprise a percentage or other unit of measure capturing a probability regarding an association between one or more messages and one or more sourcetypes. In some embodiments, the set of confidence scores and/or associated sourcetypes may be captured as values of one or more of metadata fields associated with the message. For example, the value(s) may be included in the sourcetype field described herein, or in at least one separate metadata field which may be specific to and/or generated by the sourcetyping engine 1202. As an example, an inferred sourcetype field could include a set of sourcetypes inferred using the inference model 1206 a set of corresponding confidence scores. For example, the sourcetype association data 1216 might include a set of sourcetypes and confidence scores, represented here as (sourcetype name, confidence) pairs such as: {access_combined, 0.43; access_combined_wcookie, 0.42; linux_messages_syslog, 0.15}. In some embodiments, each confidence score for a message is independent and may, for example, range from 0.0 to 1.0 inclusive. In other cases, the confidence scores for a message could be dependent, such as to sum to 1.0. The foregoing is meant to illustrate an example of sourcetype association data 1216 and should not be construed as limiting sourcetype association data 1216 to a specific format, nor describing or implying an actual format of the sourcetype association data 1216. Further, at least some of the sourcetype association data 1216 may include sourcetype associations made by a different component than the sourcetyping engine 1202.

In some embodiments, the sourcetyping engine 1202 may compare the inferred sourcetype(s) for a message with a sourcetype previously assigned to the message, e.g., by a forwarder 302 or an indexing system 212, to determine whether the message was mislabeled. Based on the comparison, the sourcetyping engine 1202 may perform at least one action, such as updating the assigned sourcetype, recording a mislabeling in metadata of the message, and/or performing additional processing of the message to select between the original sourcetype and one or more inferred sourcetypes of the message.

The inference model 1206 may include machine learning logic, convolutional neural network (CNN) logic for performing machine learning techniques, or other artificial intelligence logic that is adapted to analyze the data representation 1208 of a message using the model data 1218 to generate an inference. This may include, for example, comparing the data representation 1208 to previously collected or generated data representations that are captured in the model data 1218 and corresponds to a known sourcetype (more generally an example of "training data" or "example data"). In some embodiments, inference model 1206 may be trained offline using the training data (e.g., away from a specific deployment of the data intake and query system 108).

In embodiments where the inference model 1206 includes a CNN, the CNN may include a plurality of layers (logic modules) that together implement an overall programmatic function, which is generated and tuned. Each of the layers operates both as a portion of the overall programmatic function and as a plurality of operations executed by kernels (i.e., execution elements sometimes called "neurons"), where the operations of each of the layers implement one or more layer functions. The layout and architecture of the CNN in terms of the number and order of the layers and their respective layer functions may vary as appropriate for carrying out the functionality described herein. The CNN may be logically represented by a plurality of executable logic layers including one or more convolution layers, one or more pooling layers, and one or more fully connected/nonlinearity (FCN) layer. These layers generally represent weighting, biasing and spatial reduction operations performed by their convolution logic, pooling logic and FCN logic. In some embodiments, the inference model 1206 is implemented using an ensemble model, which may combine multiple 'individual' (diverse) models together to predict or infer sourcetypes. In some cases, the inference model 1206 is implemented using a cascade model having a simpler model followed by more complex models.

Suitable examples of sourcetype inference and other relevant material is described in U.S. patent application Ser. No. 15/967,428, entitled "INFERRING SOURCE TYPE DATA FROM RAW MACHINE DATA USING MACHINE LEARNING," filed on Apr. 30, 2018, which is hereby incorporated by reference in its entirety for all purposes.

6.0. Feedback on Sourcetypes Associated with Messages

Figure 13:
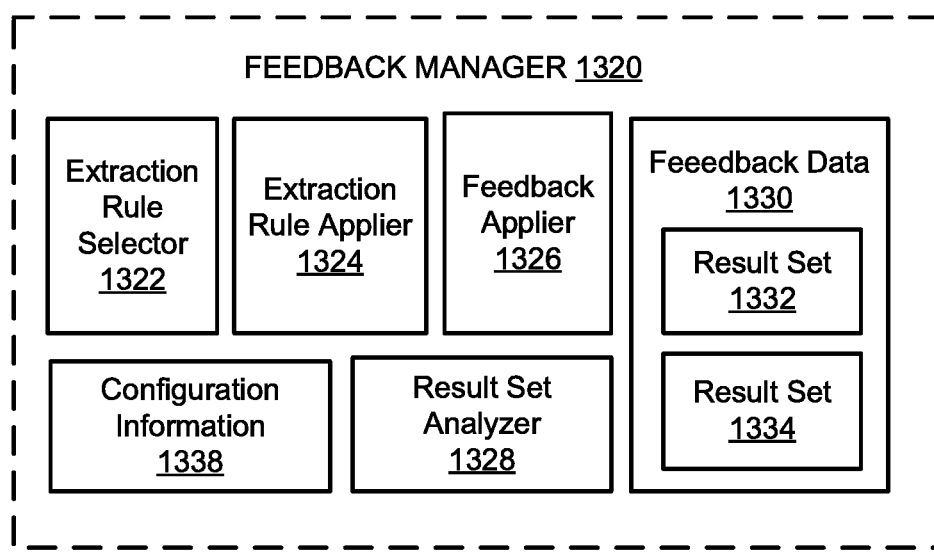
FIG. 13 is a block diagram of an example of a feedback manager, in accordance with example embodiments.

FIG. 13 is a block diagram of an example of a feedback manager 1320, in accordance with example embodiments. The feedback manager 1320 may be used by and/or incorporated into any of the various components of an intake system (e.g., the intake system 210 of FIG. 2), an indexing system (e.g., the indexing system 212 of FIG. 2), a query system (e.g., the query system 214 of FIG. 2), and/or other systems (e.g., the other system(s) 262), an example of which is later described with respect to FIG. 14. The feedback manager 1320 may be provided in storage of any combination of those systems.

The feedback manager 1320 includes an extraction rule selector 1322, an extraction rule applier 1324, a feedback applier 1326, a result set analyzer 1328, and feedback data 1330. The feedback manager 1320 may analyze the portion of machine data of a message(s) based on a sourcetype(s) associated with the message(s) to determine the feedback data 1330 regarding the association between the sourcetype(s) and the message(s) (e.g., the validity and/or accuracy of the association). To do so, the feedback manager 1320 may use the extraction rule selector 1322 to select a set of extraction rules associated with a sourcetype that is associated with a message, and use the extraction rule applier 1324 to apply the selected set of extraction rules to the portion of machine data of the message to generate a result set, such as the result set 1332. Any number of sourcetypes associated with the message may be used to similarly generate a corresponding result set for the message (e.g., the result set 1332 for one sourcetype and the result set 1334 for another sourcetype). The feedback manager 1320 may use the result set analyzer 1328 to analyze any of the various result sets associated with the message in order to determine at least one action based on the feedback data 1330.

The sourcetypes may be associated with the messages in various ways, such as using the sourcetyping engine 1202, as described above. For example, the association may be captured in the sourcetype association data 1216. An association between a sourcetype and a message may be inferred using the sourcetyping engine 1202. Additionally, or alternatively, an association between a sourcetype and a message may be made by another component, system, and/or user (e.g., via an explicit user assignment) that specifies the association prior to sourcetyping engine 1202 (e.g., referred to as an "original sourcetype" associated with a message).

The feedback manager 1320 may generate the feedback data 1330 for a message and/or determine at least one action based on the feedback data 1330 for the message based on determining whether one or more conditions are satisfied. One or more of the conditions may, for example, be based on a sourcetype associated with a message. As an example, a condition may be based at least in part on a message being associated with more than one sourcetype (e.g., in the sourcetype association data 1216, such as a metadata field) and/or a number of sourcetypes associated with the message. As an example, an association with one sourcetype could be inferred using the sourcetyping engine 1202 and an association with another sourcetype could be defined by an original sourcetype assigned to the message. Additionally, or alternatively, multiple associations with multiple sourcetypes could be inferred using the sourcetyping engine 1202.

Additionally, or alternatively, a condition may be based at least in part on a set of confidence scores for a set of sourcetypes associated with a message. For example, the condition may be based on the feedback manager 1320 comparing a confidence score for a sourcetype for a message to a threshold value. Where the feedback manager 1320 determines the confidence score is below the threshold value, the condition may be satisfied. For example, the condition may be satisfied where a single sourcetype is associated with a message and the confidence score is less than or equal to fifty percent. As another example, where the feedback manager 1320 determines the confidence score is above the threshold value, the condition may be satisfied. For example, the condition may be satisfied where a single sourcetype is associated with a message and the confidence score is greater than fifty percent. A further example, the condition may be satisfied where multiple sourcetypes are associated with a message and neither has a confidence score is greater than or equal to fifty percent. Additionally, or alternatively, a condition may be based at least in part on the feedback manager 1320 determining a relative difference between confidence scores associated with a message. For example, where the feedback manager 1320 determines no confidence score is sufficiently different from other confidence scores a condition may be satisfied. Sufficiently different may be defined using a difference metric, which by way of example may involve a standard deviation. As an example, no confidence score may be sufficiently different from other confidence scores where each confidence score is within a standard deviation from other confidence scores. The difference metric could include an absolute value of a difference between confidence scores.

As mentioned above, the extraction rule selector 1322 may select a set of extraction rules associated with a sourcetype that is associated with a message. Extraction rules are described throughout the present application. An extraction rule (e.g., a regular expression) may define criteria for identifying a sub-portion of text from the portion of machine data of a message to identify a value. A field may be defined by an extraction rule (e.g., a regular expression) that derives one or more values or a sub-portion of text from the portion of machine data in each message to produce a value for the field for that message.

In some embodiments, the extraction rule selector 1322 may select a set of extraction rules associated with a sourcetype using configuration information 1338. The configuration information 1338 may define associations between sourcetypes and fields and/or extraction rules. For example, for a given sourcetype, the configuration information 1338 may specify a set of fields and/or extraction rules that correspond to the sourcetype. Where a field is specified for a sourcetype, the extraction rule selector 1322 may optionally lookup an extraction rule for the field, such as using one or more configuration files described herein for custom fields, or a rule base that maps fields to corresponding extraction rules. The configuration information 1338 may in some cases also include criteria the extraction rule selector 1322 uses to determine which of the fields and/or extraction rules defined for a sourcetype correspond to a particular message, such as based on one or more properties of the portion of machine data of the message and/or metadata of the message (e.g., the length of the message, the client associated with the message, the number of sourcetypes associated with the message, particular sourcetypes associated with the message, etc.).

Having selected a set of extraction rules, the extraction rule applier 1324 may apply the set of extraction rules to the portion of machine data of a message to produce a result set (e.g., the result set 1332) for the message. Applying an extraction rule to the portion of machine data may include evaluating the criteria for identifying a sub-portion of text from the portion of machine data of the message to identify the value (e.g., a field value). Where the extraction rule applier 1324 is unable to identify the sub-portion of text or the criteria is otherwise not satisfied, the extraction rule applier 1324 may be unable to identify the value. Where the extraction rule corresponds to a field, the extraction rule applier 1324 may in this case be unable to identify the field from the portion of machine data. As described above, an extraction rule (e.g., regular expression) may define a search pattern used to search for matching characters in text of the portion of machine data. The extraction rule applier 1324 may determine that the portion of machine data does not include a field and/or value for the extraction rule based on failing to identify any matching characters therein.

The result set may include various information, such as information extracted from and/or identified from or in the portion of machine data. For example, the result set may capture a count of fields identified in the portion of machine data using the set of extraction rules, a list of the fields, a count of values identified from the portion of machine data using the set of extraction rules, a list of the values, a count of search patterns defined by the set of extraction rules that have matching character sets in the portion of machine data, and/or a list of the matching character sets.

It is noted that the extraction rule selector 1322 may select a set of extraction rules for any number of sourcetypes associated with a message. Further, the extraction rule selector 1322 may apply the set of extraction rules to produce a result set for any number of the sourcetypes associated with the message. For example, assume a message has at least one inferred sourcetype fields comprising at least one values that indicates sourcetype A and sourcetype B are inferred sourcetypes for the message. For sourcetype A, the extraction rule applier 1324 may produce the result set 1332 using one set of extraction rules, and for sourcetype B, the extraction rule applier 1324 may produce the result set 1334 using another set of extraction rules.

As mentioned above, the feedback manager 1320 may use the result set analyzer 1328 to analyze any of the various result sets associated with the message in order to determine at least one action based on the feedback data 1330. The at least one action may be performed by any combination of an intake system (e.g., the intake system 210 of FIG. 2), an indexing system (e.g., the indexing system 212 of FIG. 2), a query system (e.g., the query system 214 of FIG. 2), and/or other systems (e.g., the other system(s) 262), an example of which is later described with respect to FIG. 14.

The at least one action may be on one or more of inference data, such as the inference data 1204 associated with the inference model 1206 and/or a message, such as the message corresponding to the result set, or other messages associated with the message. As one example, the at least one action may include assigning a sourcetype to a message (e.g., the message corresponding to the result set). For example, based on the analysis of the result set 1332, the feedback manager 1320 may assign the corresponding sourcetype or a different sourcetype to a message (e.g., the sourcetype corresponding to the result set 1334). This may include the feedback manager 1320 determining the corresponding sourcetype and/or the different sourcetype is or is not the sourcetype of the message based on the analysis. The assigning of a sourcetype may include recording the assignment in sourcetype association data (e.g., the sourcetype association data 1216) accordingly (e.g., in a sourcetype field). This may include adding, updating, modifying, and/or deleting associations between a sourcetype and a message in sourcetype association data (e.g., the sourcetype association data 1216), such as metadata of the message).

Additionally, or alternatively, the at least one action may include modifying a confidence score for a sourcetype for a message (e.g., the message corresponding to the result set). For example, based on the analysis of the result set 1332, the feedback manager 1320 may modify the confidence score of the corresponding sourcetype or a different sourcetype for a message (e.g., the sourcetype corresponding to the result set 1334). This may include the feedback manager 1320 determining the corresponding sourcetype is more similar or less similar to another sourcetype associated with the message than is indicated by the confidence scores based on the analysis. The modifying of a confidence score may include recording the modification in sourcetype association data (e.g., the sourcetype association data 1216) accordingly (e.g., in an inferred sourcetype field). This may include updating and/or deleting for a message at least one confidence score for at least one sourcetype in sourcetype association data (e.g., the sourcetype association data 1216), such as metadata of the message.

At least one action on the inference data 1204 associated with the inference model 1206 may refer to at least on action on the sourcetype association data 1216 and/or the model data 1218. For example, an action on the sourcetype association data 1216 associated with the inference model may be with respect to inferences made using the inference model 1206 (e.g., confidence scores, inferred sourcetypes, etc.). An action on the model data 1218 may modify processing of messages performed by the inference model 1206 to make inferences regarding sourcetypes and messages. For example, an action on the model data 1218 may adjust training data used train the inference model 1206 and/or example data used by the inference model 1206 to make the inferences. This may include, for example, adding, deleting, updating, and/or modifying an association between at least one known sourcetype and at least one data representation in the model data 1218. For example, where the feedback manager 1320 determines based on an analysis made by the result set analyzer 1328 that a message was incorrectly assigned a sourcetype, the association may be removed from the model data 1218 for a corresponding data representation. Additionally, or alternatively, a different sourcetype may be associated with the data representation (e.g., where the feedback manager 1320 determines the different sourcetype corresponds to the message based on the analysis). As a further example, where the feedback manager 1320 assigns a sourcetype to a message that is not reflected in the model data 1218, the assignment of the sourcetype to the message may be incorporated into the model data 1218. In various embodiments, where the feedback manager 1320 determines a sourcetype is associated with a message, a corresponding positive example may be incorporated into the model data 1218. Further, where the feedback manager 1320 determines a sourcetype is not associated with a message, a corresponding negative example may be incorporated into the model data 1218. Adjusting the inference data 1204 to adjust inferences of sourcetypes made by the inference model 1206 may result in the inference model 1206 making more accurate inferences regarding sourcetypes and messages.

The at least one action on one or more messages may generally include any action that is based on a sourcetype (or inferred sourcetype) of one or more message and/or any action that causes such action to occur (e.g., assigning a sourcetype to a message or associating the sourcetype with the message). Examples include processing to filter or select messages (e.g., conditionally for further processing, an example of which is described using FIG. 14), extract information from messages, evaluate and/or determine field values and/or fields associated with messages, calculate statistics regarding messages, order messages, alert and monitor messages (e.g., as shown in FIG. 19D), create summaries of messages, perform an aggregation function on messages, to display messages, and/or to execute queries on messages. As a further example, an action may include routing one or more of the data streams and/or messages to one or more particular indexes based on an inferred sourcetype(s) thereof, such as an index associated with a sourcetype inferred for the messages.

Any combination of the actions may correspond to one or more workflows or use cases. The system may select at least one use case and/or workflow for messages based on the inferred sourcetypes associated with the messages. For example, for a network related sourcetype (e.g., cisco_ASA), the system may automatically implement a network traffic monitoring use case or workflow, or may suggest or recommend a use case or workflow, which may include recommending one or more applications and/or user interfaces that may consume the messages or data generated by an action on the messages and/or may include recommending one or more searches (e.g., queries) to be performed on the messages to generate the data and/or to use the data. The use cases or workflows may be learned (e.g., using machine learning) for different inferred sourcetypes, such as by aggregating and analyzing implemented use cases or workflows by multiple users of the system (e.g., recommend a top number of searches, user interfaces, and/or applications associated with an inferred sourcetype and/or mix of inferred sourcetypes for messages of a user).

A sourcetype of a message may be used in various ways by the system(s), such that an unknown or improper sourcetype for a message impacts the ability of the system to operate effectively and without error. For example, the system may perform processing involving a message based on a sourcetype associated with the message. Various examples of such processing are described herein and include processing to filter messages, extract information from messages, evaluate and/or determine field values and/or fields associated with messages, calculate statistics regarding messages, order messages, alert and monitor messages, create summaries of messages, perform an aggregation function on messages, to display messages, and/or to execute queries on messages.

Any of the various actions may be based on an analysis of any combination of the information that may be included in one or more result sets of one or more messages or derived therefrom. Where the result set captures at least one count (e.g., of fields, values, and/or search patterns), the at least one action may be based on any combination of the counts. For example, in some embodiments, the at least one action are based on comparing a count of the result set to a count value that corresponds to the sourcetype. The count value may be defined for the sourcetype (e.g., in the configuration information 1338). As an example, the count value may represent a potential and/or required number of fields and/or values for the sourcetype. Additionally, or alternatively, any of the various actions may be based on comparing the count to a threshold value (e.g., the count value or another value), such may or more not be based on the sourcetype.

Additionally, or alternatively, any of the various actions may be based on an analysis of one or more permissible and/or impermissible combinations of fields and/or values that maybe included in a given message (e.g., a message for this sourcetype may or must include only these fields/values or at least these fields/values). As an example, for a given sourcetype this information may be defined by the configuration information 1338. To illustrate the forgoing, for sourcetype A, fields X, Y, and Z may be a defined permissible combination of fields for a message, fields X and Z may be another defined permissible combination of fields for the message, and fields Y and Z may be a defined impermissible combination for the sourcetype. Where an analysis of the result set 1332 of the message indicates the message includes fields X and Z, the feedback manager 1320 may determine the sourcetype corresponds to the message. In contrast, where an analysis of the result set 1332 of the message indicates the message includes fields Y and Z, the feedback manager 1320 may not determine the sourcetype corresponds to the message.

Additionally, or alternatively, any of the various actions may be based on a comparison between result sets for sourcetypes for a message. For example, the feedback manager 1320 may use the result set analyzer 1328 to compare between result sets one or more of a count of fields identified in the portion of machine data using the set of extraction rules of a result set, a list of the fields, a count of values identified from the portion of machine data using the set of extraction rules of a result set, a list of the values, a count of search patterns defined by the set of extraction rules of a result set that have matching character sets in the portion of machine data, and/or a list of the matching character sets. As an example, the feedback manager 1320 may select a sourcetype for a message based on the results set for the message indicating a greater number of values and/or fields can be identified for the message than the results set for another sourcetype.

In some embodiments, the feedback manager 1320 additionally, or alternatively, receives feedback regarding associations between messages and sourcetypes from user input. For example, the user input may be received by any of the various components of the data intake and query system 108 and may specify and/or indicate an association between a message and a sourcetype. This may include user input assigning or otherwise selecting the sourcetype for the message (e.g., in a GUI). For example, the GUI may present the user with selectable options of sourcetypes (e.g., inferred sourcetypes for one or more messages) and they can provide a correct sourcetype. The feedback applier 1326 may perform the one or more actions described herein based on the feedback.

7.0. Conditional Processing Based on Inferred Sourcetypes

Figure 14:
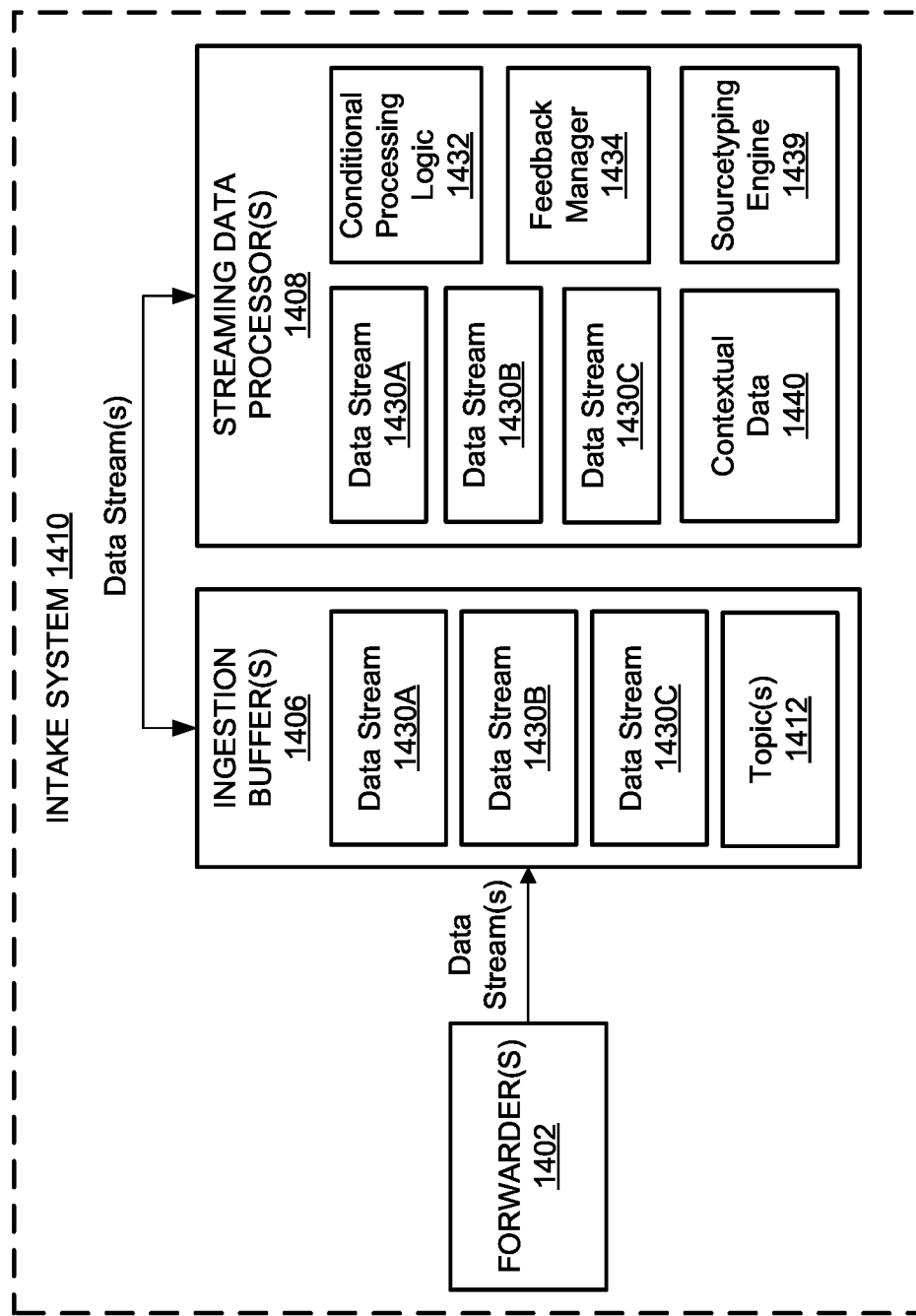
FIG. 14 is a block diagram of an example of an intake system, in accordance with example embodiments.

FIG. 14 is a block diagram of an example of an intake system 1410, in accordance with example embodiments.

In some embodiments the intake system 1410 corresponds to the intake system 210 of FIG. 2, FIG. 3A, and FIG. 3C. The intake system 1410 includes a forwarder 1402, at least one ingestion buffer 1406, and at least one streaming data processor 1408. The forwarder 1402 may correspond to the forwarder 302 of FIG. 3, the ingestion buffer 1406 may correspond to one or more of the intake ingestion buffer 306 and the output ingestion buffer 310 of FIG. 3, and/or the streaming data processor may correspond to the streaming data processor 308 of FIG. 3. Thus, the intake system 1410 may include one or both of the intake ingestion buffer 306 and the output ingestion buffer 310 or an ingestion buffer which performs the functionality of both components. Further, one or more of the ingestion buffers 1406 may operate in accordance with a pub-sub message model, as described above.

Generally, the intake system 1410 may receive data streams using the forwarder(s) 302, store the data streams in the ingestion buffer(s) 1406, perform processing operations on the data streams using the streaming data processor(s) 1408, and provide the processed data streams (and/or data streams generated from the data streams) to one or more downstream components and/or systems (e.g., an indexing system, a query system, a client application, etc.). A data stream may refer to a queue of messages. The data streams provided by the intake system 1410 may enable real-time or near real-time provision of machine data from data sources to the downstream components, such as for real-time or near real-time exposure to users in end user applications and services.

In various embodiments, the streaming data processor 1408 is operable to process data streams, such as a data stream 1430A, in accordance with conditional processing logic 1432. The conditional processing logic 1432 may comprise at least one condition that defines processing of at least one data stream by the streaming data processor 1408 to generate one or more data streams from a data stream. A generated data stream may refer a queue of messages, which may or may not be a logically distinct queue (e.g., a topic as described above) from the originating data stream. Data streams 1430B and 1430C are examples of such data streams that may be generated from the data stream 1430A. The data stream 1430A may comprise messages from another data stream(s), or may represent a data stream received by the intake system 1410 from a data source (e.g., the same logical queue). A generated data stream may comprise messages from an originating data stream(s) in an order or sequence defined by an order or sequence of the messages in the originating data stream (e.g., in a same order or sequence). For example, the generated data steam may include each message from the originating data stream(s) or a subset of messages of the originating data stream(s). Generating a data stream from an originating stream may result in a copy of the message (or pointer to the message data) being included in each data stream. In particular, the originating stream may continue to include the message in its queue of message. In other cases, the originating stream may no longer include the message.

In some embodiments, at least some of the conditional processing logic 1432 is user-defined. For example, a user (e.g., using one or more client devices 102) may provide user input to a user device that specifies and/or defines one or more conditions (e.g., as predicates and/or logical expressions) used by the conditional processing logic 1432 and/or one or more associated data streams that the one or more conditions are to be applied to and/or are to be generated based on the one or more conditions. This information may be specified, for example, using a predetermined language or format that may be interpreted by the intake system 1410 to implement the user-defined conditions and data streams. In some cases a user provides the one or more conditions and associated data streams using a user interface, such as a graphical user interface (GUI). In the GUI the user may visually add, remove, arrange and connect pipelines that represent data streams to define flows of data in the intake system 1410. Within connections between pipelines the user may include the conditions that will be evaluated by the conditional processing logic 1432 to determine which messages to include in the various data streams from a connecting data stream. In some embodiments, user input to the GUI is automatically translated by an application (e.g., of the networked computer system 100, such as a client application 110) into computer code representing the user-defined information (e.g., in a predetermined language or format). The streaming data processor may receive the computer code (e.g., in a JavaScript Object Notation format and/or file) and compile the code to implement the user-defined flows using the conditional processing logic 1432. It is noted that other approaches to implementing the conditional processing logic 1432 are possible.

At least one condition of the conditional processing logic 1432 may define which messages from an originating data stream(s) are included in and/or excluded from one or more generated data streams. As an example, where a condition regarding a message is satisfied, the message may be included in one data streams and where the condition is not satisfied, the message may instead be included in another data stream. Additionally, or alternatively, at least one condition of the conditional processing logic 1432 may define or cause at least one processing operation to be performed on the messages from the original data stream. One or more of the processing operations may be performed on the message prior to being included in one or more generated data streams, after being included in the one or more generate data streams, while the message is included in the one or more generate data streams, and/or further downstream, such as while the message is included in a subsequently generated data stream. Further, one or more of the processing operations may be performed by any combination of the intake system 1410 and/or a downstream component and/or system, examples of which have been provided above.

In various embodiments, one or more of the conditions implemented by the conditional processing logic 1432 when evaluating a message may be associated with a sourcetype inferred for the message. For example, the condition can be based on sourcetype inferences for messages made using a sourcetyping engine 1439 (and/or a feedback manager 1434). This may include any combination of information described with respect to the sourcetype association data 1216 for the messages, such as based on a value(s) of a metadata field(s) that corresponds to one or more sourcetypes for a message, such as inferred sourcetypes for the message and/or confidence scores thereof. The sourcetyping engine 1439 may in some embodiments correspond to the sourcetyping engine 1202 of FIG. 12. While the sourcetyping engine 1439 is shown as being included in the streaming data processor 1408, the sourcetyping engine 1439 may be included upstream from the streaming data processor 1408, such as in the forwarder(s) 1402. Further, one or more components of the sourcetyping engine 1439 and the feedback manager 1434 may be external to the streaming data processor 1408. As an example, the streaming data processor 1408 may access the sourcetyping engine 1439 and the feedback manager 1434 externally to use those components to implement functionality described herein (e.g., using API calls).

The sourcetyping engine 1439 may processes messages of a data stream in an order or sequence of the data stream and provide the corresponding sourcetype association data 1216 in the order or sequence. For example, in some embodiments, the sourcetyping engine 1439 may sequentially analyze the data representation 1208 of the portion of machine data of a message, generate a sourcetype inference based on the analysis, record the sourcetype inference in the sourcetype association data 1216 (e.g., in metadata of the message), then repeat this process for a subsequent message in the data stream.

By having sourcetypes inferences for messages of data streams available to the streaming data processor 1408 of the intake system 1410, the conditional processing logic 1432 can use the sourcetype inferences to processes the data streams and/or the messages thereof such that the appropriate processing operations may be performed using the portions of machine data of the messages. For example, this may cause the intake system 1410, an indexing system (e.g., the indexing system 212 of FIG. 2), a query system (e.g., the query system 214 of FIG. 2), and/or other systems (e.g., the other system(s) 262), to perform the appropriate processing operations on the appropriate portions of machine data and/or messages. These processing operations may include processing to filter or select messages, extract information from messages, evaluate and/or determine field values and/or fields associated with messages, calculate statistics regarding messages, order messages, alert and monitor messages, create summaries of messages, perform an aggregation function on messages, to display messages, and/or to execute queries on messages.

An example of at least one processing operation includes publishing a message that satisfies a condition (or fails to satisfy the condition) to a corresponding topic on the ingestion buffer 1406. For example, messages may be published to the topic on the same ingestion buffer as the originating data stream and/or a different ingestion buffer (e.g., from the intake ingestion buffer 306 to the output ingestion buffer 310). Topics 1412 are examples of such topics, which may include any combination of the topics described herein. In some embodiments, this may be performed in accordance with the illustrative algorithm or routine for processing messages described in FIG. 5. As an example, a condition may correspond to one or more of the rules described with respect to FIG. 5.

Another example of at least one processing operation comprises assigning a sourcetype to at least one message that satisfies a condition (or fails to satisfy the condition). A sourcetype may, for example, be assigned to a message based on being a sourcetype that is associated with the message using the sourcetyping engine 1439.

A further example of at least one processing operation includes generating, using the streaming data processor 1408, a data stream from another data stream. For example, a data stream generated from an originating data stream may itself be an originating data stream for another data stream (e.g., based on an additional condition associated with a message of the data stream).

A further example of at least one processing operation includes analyzing the portion of machine data of at least one message of a data stream, and based on the analyzing, adjusting the inference data 1204 associated with the inference model 1206 to adjust inferences of sourcetypes made by the inference model 1206.

A further example of at least one processing operation includes one or more of assigning a sourcetype associated with the message to the message, parsing the portion of machine data of the message based on the sourcetype assigned to the message to produce an event comprising the portion of machine data associated with a timestamp (e.g., performed by an indexing system), storing the event as part of a plurality of events in a data store (e.g., performed by an indexing system), and/or executing a query against the events from the data store to retrieve a set of events that meet criteria specified in the query (e.g., performed by a query system).

Additionally, or alternatively, a processing operation may comprise any of the various functionality described with respect to the feedback manager 1320 of FIG. 13. For example, the feedback manager 1320 may be implemented in one or more of the intake system 1410, an indexing system (e.g., the indexing system 212 of FIG. 2), a query system (e.g., the query system 214 of FIG. 2), and/or other systems (e.g., the other system(s) 262), to perform at least one of the processing operations. In the example shown, at least one streaming data processor 1408 includes the feedback manager 1434, which may correspond to the feedback manager 1320 of FIG. 13. In this regard, the one or more conditions described with respect to the feedback manager 1320 of FIG. 13 may refer to at least one of the conditions described above that the conditional processing logic 1432 evaluates to define processing of at least one data stream by the streaming data processor 1408 to generate one or more data streams from a data stream. For example, a message from an originating data stream may be included in multiple different data stream, each corresponding to a different sourcetype.

The feedback manager 1434 may analyze messages of the data streams (e.g., in parallel) and perform any of the various actions based on result sets produced using the analysis, such as those described with respect to the feedback manager 1320. For example, where a message is included in one data stream based on being associated with sourcetype A, the feedback manager 1434 may produce the result set 1332 for sourcetype A, and where the message is included in another data stream based on being associated with sourcetype B, the feedback manager 1434 may produce the result set 1334 for sourcetype B. The result set analyzer 1328 may be used to analyze one or more of the result sets to determine at least one action on one or more of inference data associated with the inference model of the sourcetyping engine 1439 and the portion of machine data one or more messages (e.g., of the data streams). For example, an action may be performed on one or more of the data streams and/or messages thereof (e.g., as described with respect to the feedback manager 1320). An action on a data stream may include, for example, terminating the data stream, adding one or more messages to the data stream, deleting one or more messages from the data stream, and/or modifying one or more messages of the data stream. As a further example, an action may include routing the one or more of the data streams and/or messages thereof to one or more particular indexes, such as an index associated with a sourcetype inferred for the messages. Additionally, or alternatively, an action on a data stream may include any of the various processing operations described above.

In some embodiments, the streaming data processor 1408 is operable to access a data stream (e.g., the data stream 1430A) from the ingestion buffer 1406 and track contextual data 1440 with respect to messages of the data stream. The contextual data 1440 may capture information regarding the messages of the data stream, such as a rolling window of messages in the data stream (e.g., based on temporal data associated with the messages). At least some of the contextual data 1440 may correspond to one or more sourcetypes assigned to the messages, such as a count, or other statistical value regarding particular sourcetypes of the messages and/or other associated characteristics. For example, a statistical value could correspond to a count of how many of the messages are associated with a particular sourcetype and/or sourcetype combination. As another example, a statistical value could correspond to a count of how many of the messages are associated with more than one sourcetype. A statistical value may comprise, for example, a rolling average or other rolling value. Further, a statistical value may be determined by the streaming data processor 1408 analyzing metadata of the messages, such as inferred sourcetype information.

In various embodiments, the contextual data 1440 may indicate a number of messages that are proximate a message in the data stream and that are assigned a given sourcetype. The number of message may precede and/or follow the message in the data stream. The contextual data 1440 may generally capture information regarding characteristics of messages of a data stream that may be used to infer one or more characteristics of one or more other messages of the data stream. For example, the streaming data processor 1408 may track the contextual data 1440 regarding the sourcetypes that are assigned to the messages to infer a sourcetype should be assigned to one or more other messages (e.g., a message that does not have an assigned sourcetype, but may have an inferred sourcetype).

The streaming data processor 1408 may select a sourcetype for the one or more messages based on the contextual data 1440. For example, the streaming data processor 1408 may select the sourcetype for a message from one or more sourcetypes that are associated with the message (e.g., in metadata of the message). Further, the streaming data processor 1408 may perform at least one action based on the selected sourcetype. This may include any combination of actions described as being performed by the feedback manager 1320, by way of example (e.g., including selecting and/or suggesting at least one use case and/or workflow for messages). For example, the selected message may be assigned to the message (e.g., in metadata of the message). To illustrate an example of the forgoing, assume the contextual data 1440 indicates five out of six messages proximate a message are associated with sourcetype A. Based on the contextual data 1440, the streaming data processor 1408 may associate sourcetype A with the message and/or assign sourcetype A to the message. For example, the five messages may be assigned sourcetype A, while the message has inferred sourcetypes of sourcetype A and sourcetype B. The streaming data processor 1408 may select sourcetype A from the inferred sourcetypes for the message based on the contextual data 1440. In some embodiments the selection may be based on a statistical value of the contextual data 1440 exceeding a threshold value.

In many cases it may be difficult to infer relationships between messages. For example, messages may be heterogeneous in characteristics such that characteristics of a group of the messages may not be indicative of characteristics of particular messages from the group. As an example, messages.be from any of a variety of data sources, may capture any of a variety of sourcetypes, and may be generated by any of a variety of components of an information technology environment according to different methodologies. Using the streaming data processor 1408, data streams of the messages can be processed using the conditional processing logic 1432 (e.g., iteratively) to curate the messages, such that characteristics of the messages in a given data stream may more reliably be attributable to particular messages. Thus, for example, the contextual data 1440 may reliably be used to infer characteristics of particular messages of a data stream. While the contextual data 1440 is shown in the streaming data processor 1408, the contextual data 1440 may be stored externally, such as in an external database.

8.0. Example Embodiments

Figure 15:
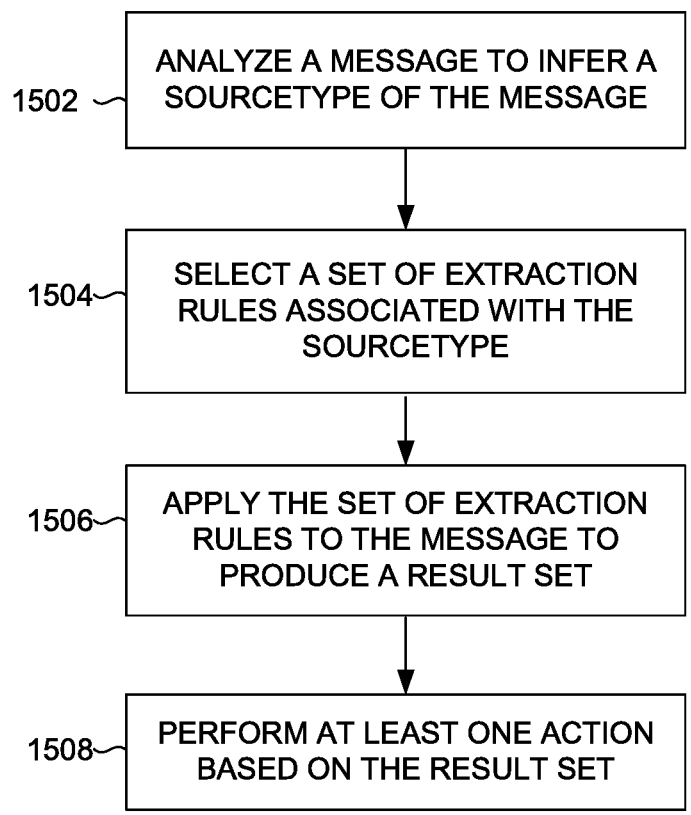
FIG. 15 is a flow diagram illustrating a method for providing feedback on inferred Sourcetypes, in accordance with example embodiments.

FIG. 15 is a flow diagram illustrating a method for providing feedback on inferred sourcetypes, in accordance with example embodiments. Block 1502 includes analyzing a message to infer a sourcetype of the message. For example, the sourcetyping engine 1202 may analyze a portion of machine data of a message to infer, using the inference model 1206, a sourcetype of the message.

Block 1504 includes selecting a set of extraction rules associated with the sourcetype. For example, based on the inference (e.g., the sourcetype association data 1216), the feedback manager 1504 may select a set of extraction rules associated with the sourcetype using the extraction rule selector 1322.

Block 1504 includes applying the set of extraction rules associated with the message. For example, the feedback manager 1504 may apply the set of extraction rules to the portion of machine data of the message to produce the result set 1332 using the extraction rule applier 1324.

Block 1506 includes performing at least one action based on the result set. For example, the feedback applier 1326 may, based on the result set 1332, perform at least one action on one or more of the inference data 1204 associated with the inference model 1206 and one or more messages, such as the message and/or other messages.

Figure 16:
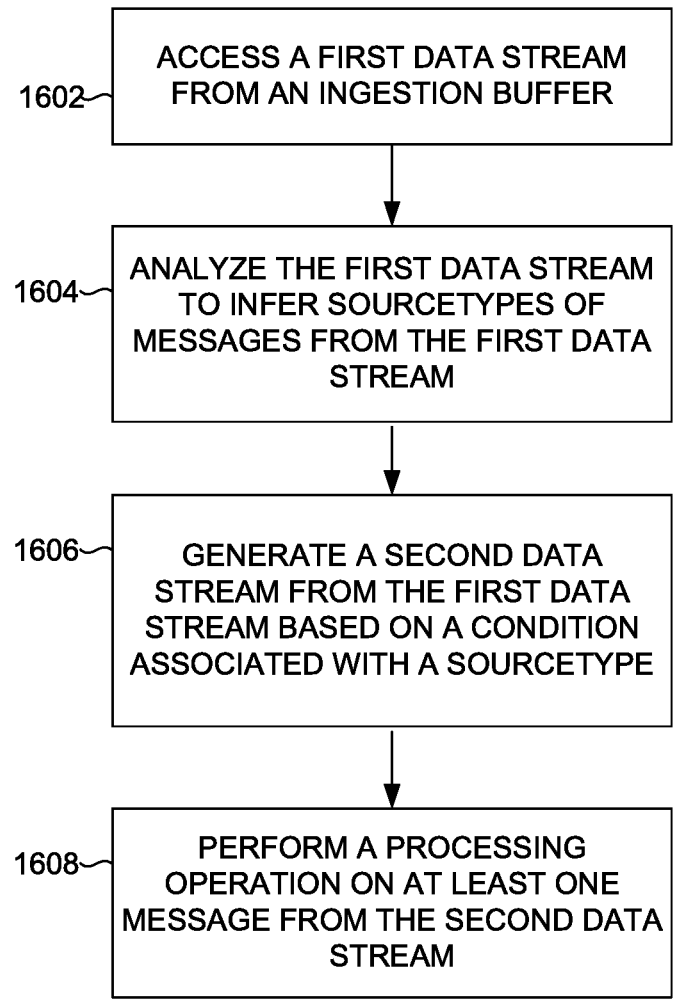
FIG. 16 is a flow diagram illustrating a method for conditional processing based on inferred sourcetypes, in accordance with example embodiments.

FIG. 16 is a flow diagram illustrating a method for conditional processing based on inferred sourcetypes, in accordance with example embodiments. Block 1602 includes accessing a first data stream from an ingestion buffer. For example, the streaming data processor 1408 may access messages of the data stream 1430A from the ingestion buffer 1406 that is in communication with the streaming data processor 1408 to receive data from the data stream 1430A.

Block 1604 includes analyzing the first data stream to infer sourcetypes of messages from the first data stream. For example, the sourcetyping engine 1439 may analyze one or more messages from the data stream 1230, to infer, using the inference model 1206, a sourcetype of the one or more messages. The inference may be recorded in the sourcetype association data 1216.

Block 1606 includes generating a second data stream from the first data stream based on a condition associated with a sourcetype. For example, using the conditional processing logic 1432, the streaming data processor 1408 may generate the data stream 1430B and/or the data stream 1430C from the data stream 1430A. The data stream 1430B may include a subset of messages from the data stream 1430A based on a condition associated with the sourcetypes of the messages.

Block 1608 includes performing a processing operation on at least one message from the second data stream. For example, one or more components of the intake system 1410, an indexing system (e.g., the indexing system 212 of FIG. 2), a query system (e.g., the query system 214 of FIG. 2), and/or other systems (e.g., the other system(s) 262), may perform at least one processing operation on at least one of the subset of messages from the data stream 1430B. This may in some cases include at least one processing operation on a message of a data stream generated from the data stream 1430B. This may, for example, include subscribing to a topic corresponding to the data stream 1430B, messages of which may be published to the intake buffer 1406.

Figure 17:
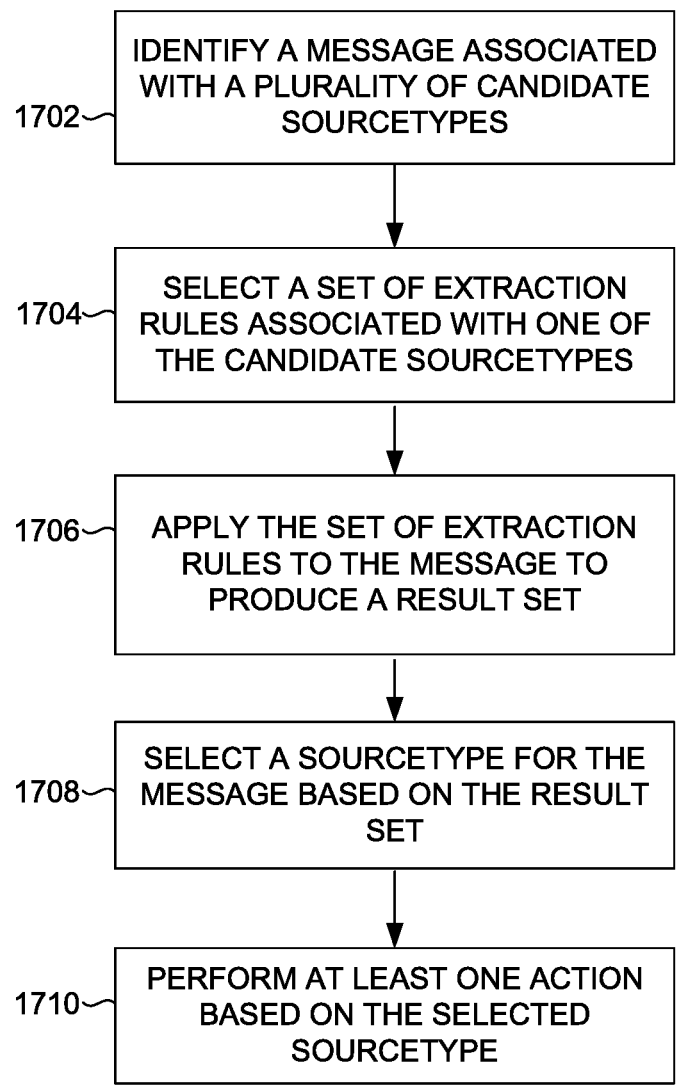
FIG. 17 is a flow diagram illustrating a method for conditional processing based on inferred sourcetypes, in accordance with example embodiments.

FIG. 17 is a flow diagram illustrating a method for conditional processing based on inferred sourcetypes, in accordance with example embodiments. Block 1702 includes identifying a message associated with a plurality of sourcetypes. For example, the streaming data processor 1408 may identify a message based on the message being associated with a first sourcetype by the data stream 1430B and a second data stream by the data stream 1430C. The message may be included in each data stream using the conditional processing logic 1432. A condition for the inclusion in a data stream may be based on the message being associated with more than one sourcetype (e.g., an inferred sourcetype and a conflicting assigned sourcetype, two different inferred sourcetypes, etc.) and/or a sourcetype that corresponds to the data stream.

Block 1704 includes selecting a set of extraction rules associated with one of the candidate sourcetypes. For example, the feedback manager 1434 may use the extraction rule selector 1322 to select a set of extraction rules for the sourcetype associated with the message for the data stream 1430B. Optionally, the feedback manager 1434 may also use the extraction rule selector 1322 to select a set of extraction rules for the sourcetype associated with the message for the data stream 1430C.

Block 1706 includes applying the set of extraction rules to the message to produce a result set. For example, the feedback manager 1434 may use the extraction rule applier 1324 to apply the set of extraction rules associated with the data stream 1430B to the portion of machine data of the message to produce the result set 1332. Optionally, the feedback manager 1434 may also use the extraction rule applier 1324 to apply the set of extraction rules associated with the data stream 1430C to the portion of machine data of the message to produce the result set 1334.

Block 1708 includes selecting a sourcetype for the message based on the result set. For example, the feedback manager 1434 may use the result set analyzer 1328 to select one of the sourcetypes from the sourcetypes associated with the message.

Block 1710 includes performing at least one action based on the selected sourcetype. For example, the feedback manager 1434 may use the feedback applier 1326 to perform at least one action on one or more of the inference data 1204 associated with one or more messages (e.g., the message), the portion of machine data of one or more messages (e.g., the message), metadata of one or more messages (e.g., the message), one or more of the data stream 1430B and the data stream 1430C (e.g., based on the conditional processing logic 1432) and/or one or more messages therein (e.g., the message).

Figure 18:
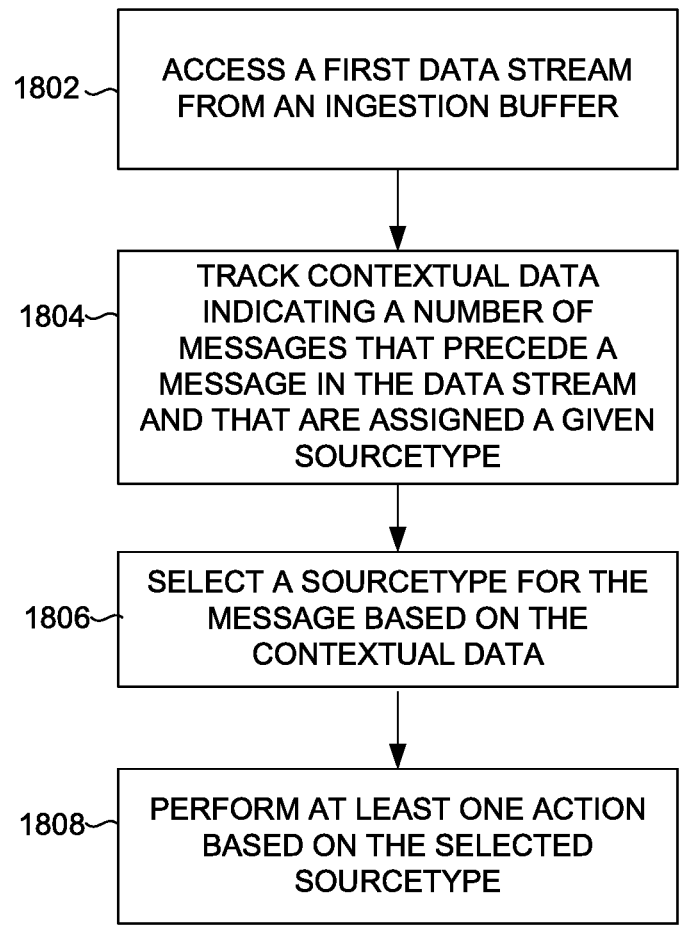
FIG. 18 is a flow diagram illustrating a method for contextually inferring a sourcetype of a message, in accordance with example embodiments.

FIG. 18 is a flow diagram illustrating a method for contextually inferring a sourcetype of a message, in accordance with example embodiments. Block 1802 includes accessing a first data stream from an ingestion buffer. For example, the streaming data processor 1408 may access the data stream 1430A from the ingestion buffer 1406.

Block 1804 includes tracking contextual data indicating a number of messages that are proximate a message in the data stream and that are assigned a given sourcetype. For example, the streaming data processor 1408 may track the contextual data 1440 for the data stream 1430A, which may indicate how many messages proximate a message in the data stream 1430A are associated with the given sourcetype. For example, the given sourcetype may be one of a plurality of inferred sourcetypes for the message.

Block 1806 includes selecting a sourcetype for the message based on the contextual data. For example, the streaming data processor 1408 may select a sourcetype for the message based on the contextual data 1440, such as the number of messages within a defined proximity to the message in the data stream 1430A and that are assigned the given sourcetype.

Block 1808 includes performing at least one action based on the selected sourcetype. For example, the streaming data processor 1408 may perform at least one action based on the selected sourcetype. This may include any combination of actions described as being performed by the feedback manager 1320, by way of example.

8.1. Example Graphical Interface Elements

FIGS. 19A-19F are interface diagrams of examples of user interface elements based on inferred sourcetypes of messages, in accordance with example embodiments. The user interface elements may be provided using data from any suitable source or system described herein. For example, the user interface elements may be populated, at least partially, using inferred sourcetype information of events and/or messages, such as the sourcetype association data 1216 and/or inferred sourcetype information that has been updated using the feedback manager 1320. For example, the inferred sourcetype information of events and/or messages may be provided from an intake system (e.g., the intake system 210 of FIG. 2), an indexing system (e.g., the indexing system 212 of FIG. 2), a query system (e.g., the query system 214 of FIG. 2), and/or other systems (e.g., the other system(s) 262), such as in association with events stored and/or processed by those systems.

Figure 19A:
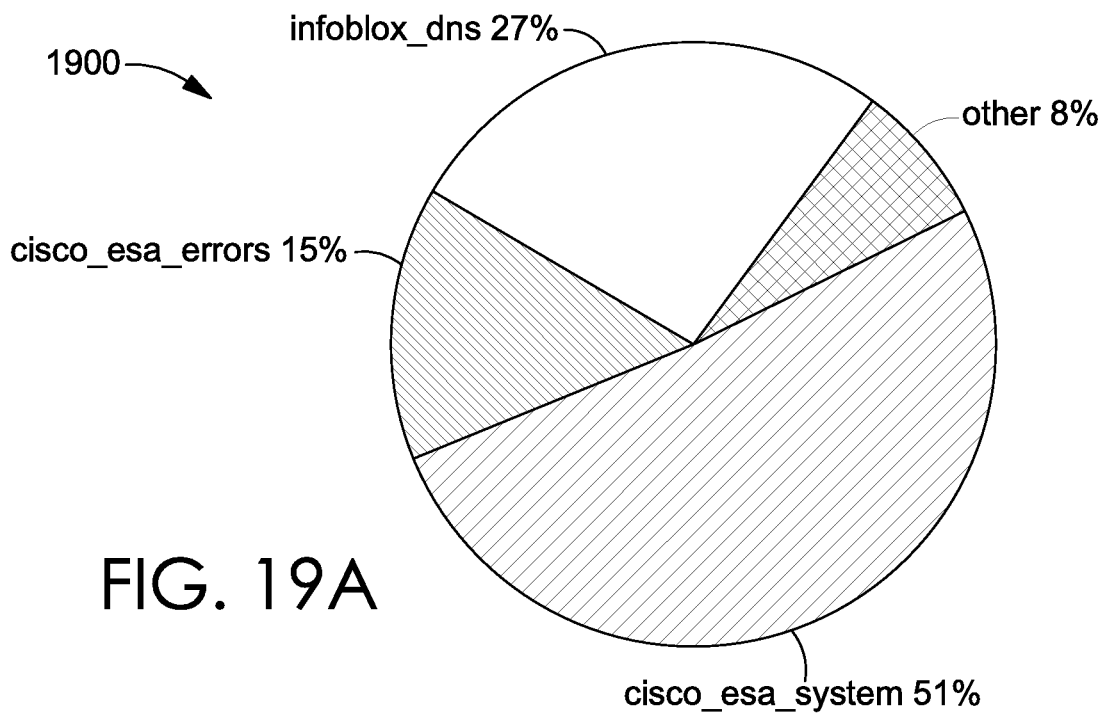
FIGS. 19A-19F are interface diagrams of examples of user interface elements based on inferred sourcetypes of messages, in accordance with example embodiments.
Figure 19B:
Figure 19C:
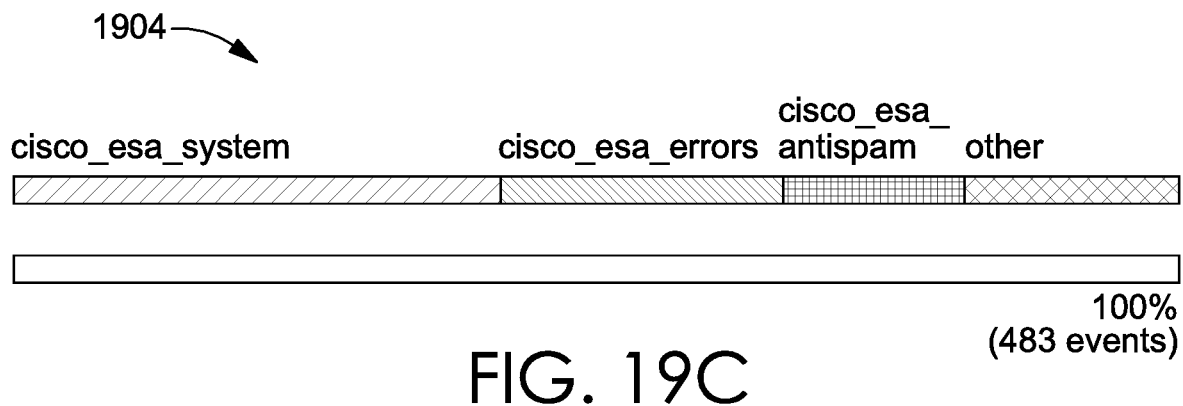
Figure 19D:
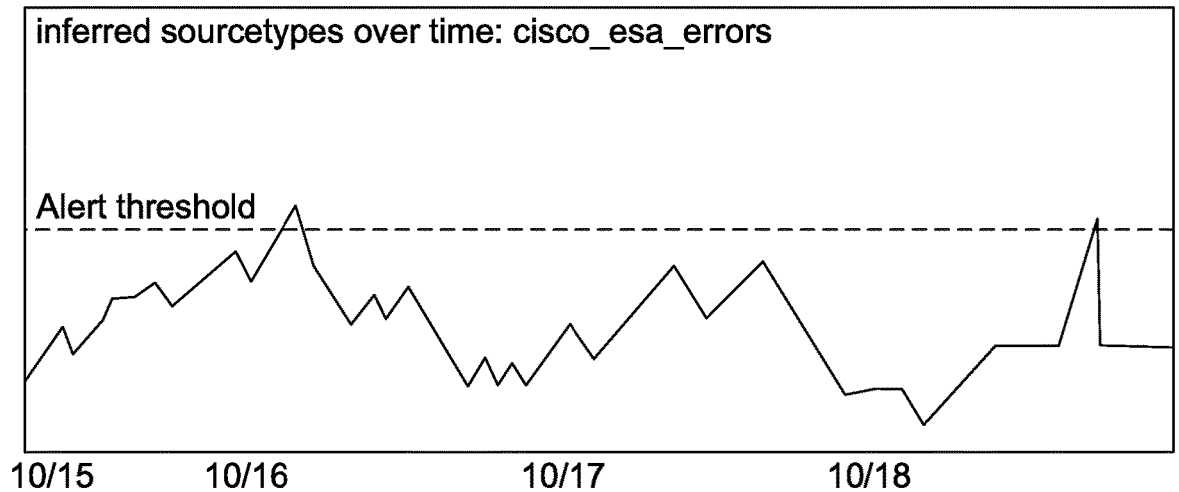

The user interface element 1900 of FIG. 19A is an example of a user interface element comprising a graph or chart of at least inferred sourcetypes of a set of messages. For example, the user interface element 1900 is shown as a pie chart indicating the distribution of inferred sourcetypes amongst a set of messages. The user interface element 1902 of FIG. 19B is an example of a user interface element comprising a bar chart of at least inferred sourcetypes of a set of messages, and the user interface element 1904 of FIG. 19C is another example of a user interface element comprising a bar chart of at least inferred sourcetypes of a set of messages. FIG. 19D is a further example of a user interface element 1906 comprising a graph or chart of at least one or more inferred sourcetypes of a set of messages over time.

In various implementations, the set of messages of a user interface element may correspond to one or more data objects, such as a data source(s), a data stream(s) or a forwarder(s) (e.g., of the intake system 210 of FIG. 2), an index(es) or indexer(s) (e.g., of the indexing system 212 of FIG. 2), and/or a query (e.g., of the query system 214 of FIG. 2). In some cases, a user may provide user input selecting the one or more data objects and/or inferred sourcetypes (e.g., that are available for a given data object) to include in the graphs and/or charts.

FIG. 19D also illustrates an example of anomaly detection using at least one inferred sourcetype. For example, an inferred sourcetype of a data object may be monitored over time for anomalies. As an example, a statistical value of an inferred sourcetype(s) could be determined regarding historical inferred sourcetypes for messages of a data object(s), such as such as a count of messages having an inferred sourcetype and/or a percentage of messages having an inferred sourcetype. An anomaly may be determined, for example, based on determining a deviation from the statistical value(s) that are based on inferred sourcetypes. The deviation could be detected, for example, by analyzing a set of messages over a period of time. To illustrate the forgoing, where typically ten percent of messages have an inferred sourcetype of "cisco-asa," if in the last hour, fifty percent of messages have the inferred sourcetype of "cisco-asa," an anomaly may be determined, as the percentage has deviated sufficiently from the historical value. Based on determining the anomaly in an inferred sourcetype, an alert may be triggered and provided to a user(s) associated with the messages.

Figure 19E:
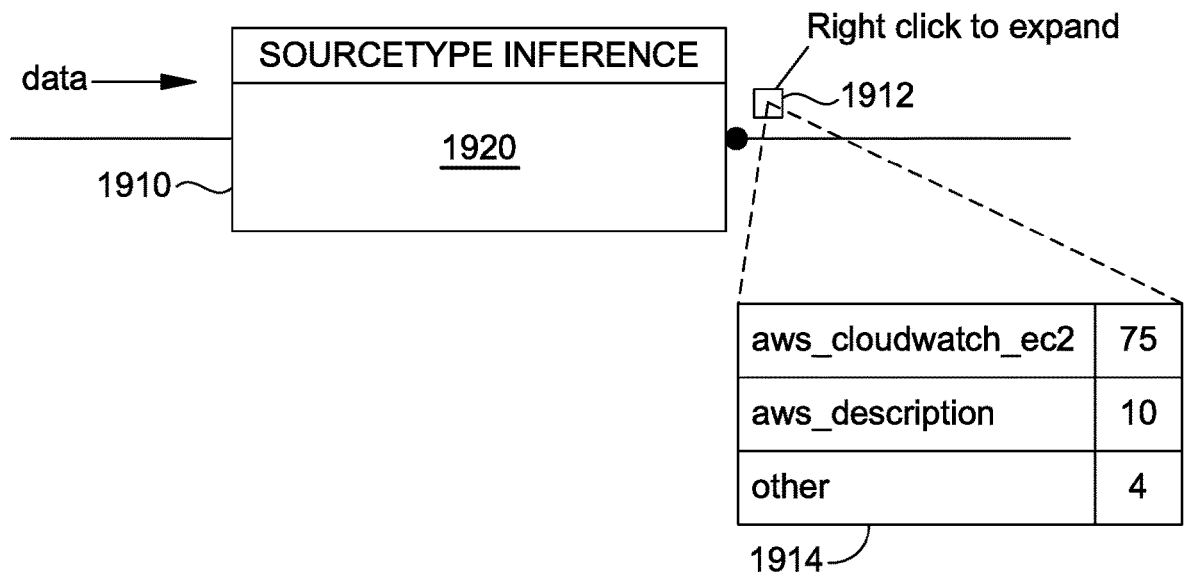

The user interface element 1906 of FIG. 19E is an example of a user interface element 1908 comprising a data sink module 1910. The data sink module 1910 may be graphically inserted into a data stream or more generally a data path of a set of messages, such as a set of messages of one or more data objects, as described above. In some embodiments, at least one GUI element, such as a GUI element 1912, is provided. User input to the GUI element may selectively expand and/or contract at least a display of inferred sourcetype information regarding messages of the data path. In the example shown, the display include a table 1914 showing a breakdown of messages received by the data sink module 1910 (e.g., over a period of time or over another defined interval). In some embodiments, the display may at least partially be within the data sink module 1910, such as in area 1920. Further, other types of display formats may be used, such as the various user interface elements described with respect to FIGS. 19A-19E. While the GUI element 1912 is shown, the display may be provided without the GUI element 1912. Further, the data path of FIG. 19E may include any number of data sink modules, where an output of a data sink module may be provided as an input to one or more other modules.

One or more of the data sink modules may represent a data processing module. For example, the data sink module 1910 represents a sourcetype inference module, indicating a relative location in the data path where sourcetypes may be inferred for messages of the data path. For example, the sourcetype inference module may represent an instance of the sourcetyping engine 1202 of FIG. 12 and the display (e.g., the table 1914) may represent an output of the sourcetype inference module. As a further example, the data sink module 1910 may similarly represent the feedback manager 1320 of FIG. 13. As another example, the data sink module 1910 may represent a conditional processing module that defines conditional processing logic (e.g., a portion of the conditional processing logic 1432 of FIG. 14) to be performed on messages of the data path. A conditional processing module may have multiple outputs, at least one of which may be based on the inferred sourcetypes of the messages of the data path. In some embodiments, a user may select and place various types of data sink modules at different positions in a data path to define processing of the data path. In some embodiments, the data sink modules are part of the GUI described above with respect to FIG. 14, such as the GUI used to generate the computer code readable by the streaming data processor to implement user-defined data flows. However, the discussion of FIG. 19E is not limited to data streams and/or streaming data processors. As indicated above, the messages received by a data sink module may correspond to any suitable data object described herein.

Figure 19F:
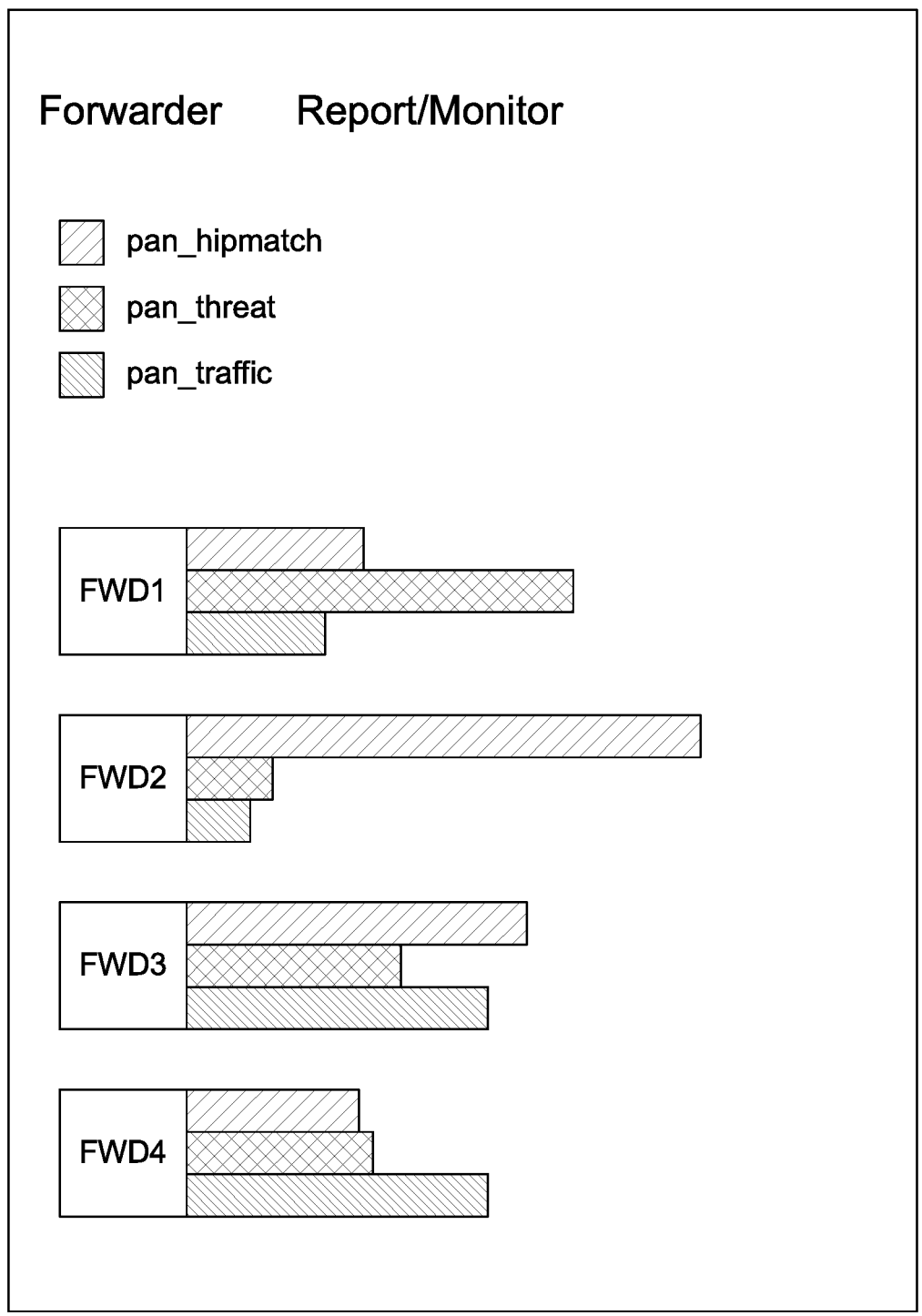

FIG. 19F is a further example of a user interface element 1922 comprising graphs or charts of at least inferred sourcetypes of sets of messages. The user interface element 1922 shows graphs or charts of messages grouped by associated data objects. In this case, the messages are grouped by forwarder, such as the forwarder 302 of FIGS. 3A and 3B. Each graph or chart for forwarders FWD1, FWD2, FWD3, and FWD4 may visually indicate (e.g., using different colors and/or shading) relative proportions of messages having various inferred sourcetypes received by a corresponding forwarder. The inferred sourcetypes may be determined for the messages at any suitable time, such as prior to being received by the forwarder, by the forwarder, or after having left the forwarder. The user interface element 1922 may additionally or alternatively display similar information for messages associated with other types of data objects described herein.

9.0. Other Architectures

In view of the description above, it will be appreciate that the architecture disclosed herein, or elements of that architecture, may be implemented independently from, or in conjunction with, other architectures. For example, the Relevant Applications disclose a variety of architectures wholly or partially compatible with the architecture of the present disclosure.

Generally speaking, one or more components of the data intake and query system 108, the intake system 210, the indexing system 212, the query system 214, and/or the intake system 1410 of the present disclosure can be used in combination with or replaced with one or more components of the data intake and query system 108 of the Relevant Applications. Suitable examples of the data intake and query system 108, the intake system 210, the indexing system 212, the query system 214, and the intake system 1410 of the present disclosure and other relevant material is described in U.S. patent application Ser. No. 15/967,581, entitled "ITERATIVE MESSAGE-BASED DATA PROCESSING INCLUDING STREAMING ANALYTICS," filed on Apr. 30, 2018, which is hereby incorporated by reference in its entirety for all purposes.

10.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

11.0. Additional Examples

Various example embodiments of methods, systems, and non-transitory computer-readable media relating to features described herein can be found in the following clauses:

Clause 1. A computer-implemented method, comprising:
accessing messages of a first data stream from an ingestion buffer in communication with a streaming data processor to receive data from the first data stream;
determining, at the streaming data processor, using an inference model, a sourcetype associated with one or more messages from the first data stream, the one or more messages including a portion of machine data generated by one or more components in an information technology environment;
generating, using the streaming data processor, a second data stream from the first data stream, the second data stream comprising a subset of messages from the first data stream, a message of the subset of messages being included in the second data stream based on a condition associated with the sourcetype for the message; and
performing at least one processing operation on at least one of the subset of messages from the second data stream.

Clause 2. The method of Clause 1, further comprising storing the second data stream to one or more of the ingestion buffer and another ingestion buffer.

Clause 3. The method of Clause 1, wherein the messages of the first data stream are published to a topic on the ingestion buffer, and the streaming data processor receives the one or more messages for the determining from a subscription to the topic on the ingestion buffer.

Clause 4. The method of Clause 1, wherein the streaming data processor receives the one or more messages for the determining from a subscription to a first topic on the ingestion buffer, and publishes the subset of messages to a second topic on one or more of the ingestion buffer and another ingestion buffer.

Clause 5. The method of Clause 1, wherein the condition associated with the sourcetype of the message is based on a confidence score of the sourcetype for the message.

Clause 6. The method of Clause 1, wherein the condition associated with the sourcetype of the message is based on a plurality of candidate sourcetypes associated with the message.

Clause 7. The method of Clause 1, wherein the condition associated with the sourcetype of the message is based on a determined sourcetype for the message.

Clause 8. The method of Clause 1, wherein the condition excludes, from the second data stream, a plurality of the messages of the first data stream based on the plurality of the messages being associated with a single sourcetype.

Clause 9. The method of Clause 1, wherein the subset of messages from the first data stream are included in the second data stream based on satisfying the condition and the method further comprises generating, using the streaming data processor, a third data stream from the first data stream, the third data stream comprising an additional subset of messages from the first data stream, a message of the additional subset of messages being included in the second data stream based on failing to satisfy the condition.

Clause 10. The method of Clause 1, wherein the at least one processing operation comprises publishing the subset of messages to a topic on another ingestion buffer.

Clause 11. The method of Clause 1, wherein the at least one processing operation comprises assigning the sourcetype to the at least one of the subset of messages.

Clause 12. The method of Clause 1, wherein the at least one processing operation comprises appending metadata to the at least one of the subset of messages.

Clause 13. The method of Clause 1, wherein the at least one processing operation comprises appending metadata to the at least one of the subset of messages, the metadata including the determined sourcetype associated with the message.

Clause 14. The method of Clause 1, wherein the at least one processing operation comprises generating, using the streaming data processor, a third data stream from the second data stream, the third data stream comprising a subset of messages from the second data stream, a message of the subset of messages being included in the third data stream based on an additional condition associated with the message.

Clause 15. The method of Clause 1, wherein the at least one processing operation comprises:
selecting a set of extraction rules associated with the sourcetype, wherein each extraction rule defines criteria for identifying a sub-portion of text from the portion of machine data of the message to identify a value;
applying the set of extraction rules to the portion of machine data of a message from the subset of messages to produce a result set that indicates a number of values identified using the set of extraction rules; and
based on the result set, performing at least one action on one or more of inference data associated with the inference model and one or more messages.

Clause 16. The method of Clause 1, wherein the at least one processing operation comprises:
tracking, using the streaming data processor, contextual data indicating a number of the subset of messages that precede a given message in the second data stream and that are assigned the sourcetype;
based on the contextual data, selecting the sourcetype from a plurality of candidate sourcetypes associated with the given message; and
assigning the selected sourcetype to the message.

Clause 17. The method of Clause 1, wherein the at least one processing operation comprises:
determining, using the streaming data processor, contextual data indicating a number of the subset of messages that are in a defined proximity to the given message in the second data stream and that are assigned the sourcetype; and
based on the contextual data, assigning the sourcetype to the given message.

Clause 18. The method of Clause 1, wherein the at least one processing operation comprises analyzing the portion of machine data of the at least one of the subset of messages, and based on the analyzing, adjusting inference data associated with the inference model to adjust inferences of sourcetypes made by the inference model.

Clause 19. The method of Clause 1, further comprising providing the at least one of the subset of messages from the second data stream to a downstream component comprising at least one of an indexing system, a query processing system, a metrics collection system, and a notification system.

Clause 20. The method of Clause 1, wherein the inference model infers the sourcetype by at least analyzing a data representation of the message in view of model data, wherein the model data includes a plurality of data representations corresponding to known sourcetypes.

Clause 21. The method of Clause 1, wherein the inference model infers the sourcetype by at least analyzing a punctuation pattern in the portion of machine data of the message.

Clause 22. The method of Clause 1, wherein the at least one processing operation comprises:
assigning the sourcetype to the message;
parsing the portion of machine data of the message based on the sourcetype assigned to the message to produce an event comprising the portion of machine data associated with a timestamp;
storing the event as part of a plurality of events in a data store; and
executing a query against the events from the data store to retrieve a set of events that meet criteria specified in the query.

Clause 23. A computer-implemented system, comprising:
one or more processors; and
computer memory having instructions stored thereon, the instructions, when executed by the one or more processors, to cause the system to perform a method, comprising:
accessing messages of a first data stream from an ingestion buffer in communication with a streaming data processor to receive data from the first data stream;
determining, at the streaming data processor, using an inference model, a sourcetype associated with one or more messages from the first data stream, the one or more messages including a portion of machine data generated by one or more components in an information technology environment;
generating, using the streaming data processor, a second data stream from the first data stream, the second data stream comprising a subset of messages from the first data stream, a message of the subset of messages being included in the second data stream based on a condition associated with the sourcetype for the message; and
performing at least one processing operation on at least one of the subset of messages from the second data stream.

Clause 24. The system of Clause 23, wherein the method further comprises storing the second data stream to one or more of the ingestion buffer and another ingestion buffer.

Clause 25. The system of Clause 23, wherein the messages of the first data stream are published to a topic on the ingestion buffer, and the streaming data processor receives the one or more messages for the determining from a subscription to the topic on the ingestion buffer.

Clause 26. The system of Clause 23, wherein the streaming data processor receives the one or more messages for the determining from a subscription to a first topic on the ingestion buffer, and publishes the subset of messages to a second topic on one or more of the ingestion buffer and another ingestion buffer.

Clause 27. One or more non-transitory computer-readable media having instructions stored thereon, the instructions, when executed by at least one processor of at least one computing device, to cause the at least one computing device to perform a method, comprising:
accessing messages of a first data stream from an ingestion buffer in communication with a streaming data processor to receive data from the first data stream;
determining, at the streaming data processor, using an inference model, a sourcetype associated with one or more messages from the first data stream, the one or more messages including a portion of machine data generated by one or more components in an information technology environment;
generating, using the streaming data processor, a second data stream from the first data stream, the second data stream comprising a subset of messages from the first data stream, a message of the subset of messages being included in the second data stream based on a condition associated with the sourcetype for the message; and
performing at least one processing operation on at least one of the subset of messages from the second data stream.

Clause 28. The computer-readable media of Clause 27, wherein the method further comprises storing the second data stream to one or more of the ingestion buffer and another ingestion buffer.

Clause 29. The computer-readable media of Clause 27, wherein the messages of the first data stream are published to a topic on the ingestion buffer, and the streaming data processor receives the one or more messages for the determining from a subscription to the topic on the ingestion buffer.

Clause 30. The computer-readable media of Clause 27, wherein the streaming data processor receives the one or more messages for the determining from a subscription to a first topic on the ingestion buffer, and publishes the subset of messages to a second topic on one or more of the ingestion buffer and another ingestion buffer.

Clause 31. A computer-implemented method, comprising:
analyzing a portion of machine data of a message to infer, using an inference model, a sourcetype of the message, the portion of machine data generated by one or more components in an information technology environment;
based on the inference, selecting a set of extraction rules associated with the sourcetype, wherein each extraction rule defines criteria for identifying a sub-portion of text from the portion of machine data of the message to produce a value;
applying the set of extraction rules to the portion of machine data of the message to produce a result set that indicates a number of values identified using the set of extraction rules; and
based on the result set, performing at least one action on one or more of inference data associated with the inference model and one or more messages.

Clause 32. The method of Clause 31, wherein the at least one action includes assigning the sourcetype to the message.

Clause 33. The method of Clause 31, wherein the at least one action includes assigning a different sourcetype to the message.

Clause 34. The method of Clause 31, wherein the inference data includes a confidence score of the sourcetype, and the at least one action includes modifying the confidence score.

Clause 35. The method of Clause 31, wherein the at least one action includes adjusting the inference data to adjust inferences of sourcetypes made by the inference model.

Clause 36. The method of Clause 31, wherein the result set includes a count of the number of values and the at least one action is based at least in part on the count of the number of values identified using the set of extraction rules.

Clause 37. The method of Clause 31, wherein the set of extraction rules define a set of fields, the result set includes a count of a number of the fields identified using the set of extraction rules, and the at least one action is based at least in part on the count of the number of fields identified using the set of extraction rules.

Clause 38. The method of Clause 31, wherein the at least one action is based at least in part on comparing a number of fields of the result set identified using the set of extraction rules to a number of fields associated with the sourcetype.

Clause 39. The method of Clause 31, further comprising:
selecting an additional set of the extraction rules that is associated with an additional sourcetype inferred for the message; and
applying the additional set of the extraction rules to the portion of machine data of the message to produce an additional result set that indicates a number of values identified using the additional set of extraction rules;
wherein the at least one action is based at least in part on a comparison between the result set and the additional result set.

Clause 40. The method of Clause 31, wherein the inference data includes a confidence score of the sourcetype, and the selecting of the set of extraction rules is based at least in part on the confidence score being below a threshold value.

Clause 41. The method of Clause 31, wherein the message is of a data stream on an ingestion buffer, and the analyzing of the portion of machine data of the message is performed by a streaming data processor processing the data stream from the ingestion buffer.

Clause 42. The method of Clause 31, wherein the message is of a data stream published to a first topic on an ingestion buffer, and the at least one action includes publishing the one or more messages to a second topic on one or more of the ingestion buffer and another ingestion buffer.

Clause 43. The method of Clause 31, wherein the message is of a first data stream on an ingestion buffer, and the method further comprises:
generating, using a streaming data processor, a second data stream from the first data stream, the second data stream comprising a subset of messages of the first data stream, wherein the message is included in the subset of messages based on a condition associated with the sourcetype of the message;
wherein the applying the set of extraction rules to the portion of machine data of the message is performed, using the streaming data processor, on the second data stream.

Clause 44. The method of Clause 31, wherein the message is an event that is accessed for the analyzing from a field-searchable data store for which a search query containing a criterion for a field can be executed against the event in the field-searchable data store to cause comparison between the criterion and values extracted from the event by an extraction rule defining the field.

Clause 45. The method of Clause 31, wherein the set of extraction rules comprise one or more regular expressions.

Clause 46. The method of Clause 31, wherein the at least one action is performed by one or more of an indexing system, a query system, and an intake system.

Clause 47. The method of Clause 31, wherein the applying the set of extraction rules to the portion of machine data is performed by one or more of an indexing system, a query system, and an intake system.

Clause 48. The method of Clause 31, wherein the method further comprises:
tracking, using a streaming data processor, a contextual data indicating a number of messages that precede the message in a data stream and that are assigned the sourcetype;
based on the contextual data, selecting from the sourcetype from a plurality of candidate sourcetypes associated with the message; and
assigning the selected sourcetype to the message Clause 49. The method of Clause 31, wherein the method further comprises:
determining, using a streaming data processor, a contextual data indicating a number of messages that are in a defined proximity to the message in a data stream and that are assigned the sourcetype; and
based on the contextual data, assigning the sourcetype to the message.

Clause 50. A computer-implemented system, comprising:
one or more processors; and
computer memory having instructions stored thereon, the instructions, when executed by the one or more processors, to cause the system to perform a method, comprising:
analyzing a portion of machine data of a message to infer, using an inference model, a sourcetype of the message, the portion of machine data generated by one or more components in an information technology environment;
based on the inference, selecting a set of extraction rules associated with the sourcetype, wherein each extraction rule defines criteria for identifying a sub-portion of text from the portion of machine data of the message to produce a value;
applying the set of extraction rules to the portion of machine data of the message to produce a result set that indicates a number of values identified using the set of extraction rules; and
based on the result set, performing at least one action on one or more of inference data associated with the inference model and one or more messages.

Clause 51. The system on Clause 50, wherein the at least one action includes assigning the sourcetype to the message.

Clause 52. The system on Clause 50, wherein the at least one action includes assigning a different sourcetype to the message.

Clause 53. The system on Clause 50, wherein the inference data includes a confidence score of the sourcetype, and the at least one action includes modifying the confidence score.

Clause 54. The system on Clause 50, wherein the at least one action includes adjusting the inference data to adjust inferences of sourcetypes made by the inference model.

Clause 55. The system on Clause 50, wherein the result set includes a count of the number of values and the at least one action is based at least in part on the count of the number of values identified using the set of extraction rules.

Clause 56. One or more non-transitory computer-readable media having instructions stored thereon, the instructions, when executed by at least one processor of at least one computing device, to cause the at least one computing device to perform a method, comprising:
analyzing a portion of machine data of a message to infer, using an inference model, a sourcetype of the message, the portion of machine data generated by one or more components in an information technology environment;

based on the inference, selecting a set of extraction rules associated with the sourcetype, wherein each extraction rule defines criteria for identifying a sub-portion of text from the portion of machine data of the message to produce a value;

applying the set of extraction rules to the portion of machine data of the message to produce a result set that indicates a number of values identified using the set of extraction rules; and based on the result set, performing at least one action on one or more of inference data associated with the inference model and one or more messages.

Clause 57. The computer-readable media of Clause 26, wherein the at least one action includes assigning the sourcetype to the message.

Clause 58. The computer-readable media of Clause 26, wherein the at least one action includes assigning a different sourcetype to the message.

Clause 59. The computer-readable media of Clause 26, wherein the inference data includes a confidence score of the sourcetype, and the at least one action includes modifying the confidence score.

Clause 60. The computer-readable media of Clause 26, wherein the at least one action includes adjusting the inference data to adjust inferences of sourcetypes made by the inference model.

Any of the above methods may be embodied within computer-executable instructions which may be stored within a data store or non-transitory computer-readable media and executed by a computing system (e.g., a processor of such system) to implement the respective methods.

The invention claimed is:

1. A computer-implemented method, comprising:
generating a representation of a portion of machine data of a message of a data stream, wherein the data stream is accessed from an ingestion buffer of a data system, the portion of machine data generated by one or more components in an information technology environment;
predicting, based at least on applying the representation of the portion of machine data to an inference model, a sourcetype of the message, wherein predicting the sourcetype of the message using the inference model efficiently processes the message via one or more system components by reducing processing time of the message having an absence of an associated sourcetype or an inaccurate sourcetype;
based on the sourcetype of the message, selecting a set of extraction rules associated with the sourcetype for extraction of a set of values from the message, wherein each extraction rule defines criteria for identifying a sub-portion of text from the portion of machine data of the message to produce a value of the set of values, the value representing the sub-portion of text;
executing the extraction based at least on applying the set of extraction rules to the portion of machine data of the message to produce a result set that indicates the set of values identified using the set of extraction rules; and
based on the sourcetype and the set of values indicated by the result set, executing at least one action that includes routing, via a router, one or more messages associated with the sourcetype from the data stream to one or more endpoints associated with the sourcetype, wherein the at least one action is based at least in part on comparing a number of fields of the result set identified using the set of extraction rules to a number of fields associated with the sourcetype, and wherein at least one endpoint comprises a field-searchable data store and the message is stored in the field-searchable data store as an event that is accessed from the field-searchable data store responsive to a search query containing a criterion for a field being executed against the event in the field-searchable data store to cause comparison between the criterion and values extracted from the event by an extraction rule defining the field.

2. The method of claim 1, wherein the at least one action includes assigning the sourcetype to the message.

3. The method of claim 1, wherein the at least one action includes assigning a different sourcetype to the message.

4. The method of claim 1, wherein the at least one action includes modifying a confidence score associated with the sourcetype.

5. The method of claim 1, wherein the at least one action includes adjusting inference data used by the inference model, the adjusting causing adjustment to inferences of sourcetypes made by the inference model.

6. The method of claim 1, wherein the result set includes a count of elements in the set of values and the at least one action is based at least in part on the count.

7. The method of claim 1, wherein the set of extraction rules define a set of fields, the result set includes a count of a number of the fields identified using the set of extraction rules, and the at least one action is based at least in part on the count of the number of fields identified using the set of extraction rules.

8. The method of claim 1, further comprising:
selecting an additional set of the extraction rules that is associated with an additional sourcetype inferred for the message; and
applying the additional set of the extraction rules to the portion of machine data of the message to produce an additional result set that indicates a number of values identified using the additional set of extraction rules;
wherein the at least one action is based at least in part on a comparison between the result set and the additional result set.

9. The method of claim 1, wherein the routing is based at least in part on a count of elements in the set of values exceeding a threshold value.

10. The method of claim 1, wherein the routing stores data from the one or more messages in one or more data stores associated with the sourcetype and the method includes:
running a query against the data stored in the one or more data stores to generate search results that are responsive to the query; and
displaying one or more of the search results in a user interface.

11. The method of claim 1, wherein the data stream is published to a first topic on the ingestion buffer, and the at least one action includes publishing the one or more messages to a second topic on one or more of the ingestion buffer and another ingestion buffer.

12. The method of claim 1, wherein the data stream is a first data stream, and the routing comprises:
generating, using a streaming data processor, a second data stream from the first data stream, the second data stream comprising a subset of messages of the first data stream, wherein the message is included in the subset of messages based on a condition associated with the sourcetype of the message.

13. The method of claim 1, wherein the set of extraction rules comprise one or more regular expressions.

14. The method of claim 1, wherein the at least one action is performed by one or more of an indexing system, a query system, and an intake system.

15. The method of claim 1, wherein the data system is a data intake and query system.

16. The method of claim 1, wherein the method further comprises:
tracking, using a streaming data processor, contextual data indicating a number of messages that precede the message in the data stream and that are assigned the sourcetype;
based on the contextual data, selecting the sourcetype from a plurality of candidate sourcetypes associated with the message; and
assigning the selected sourcetype to the message.

17. The method of claim 1, wherein the method further comprises:
determining, using a streaming data processor, contextual data indicating a number of messages that are in a defined proximity to the message in the data stream and that are assigned the sourcetype; and
based on the contextual data, assigning the sourcetype to the message.

18. A computer-implemented system, comprising:
one or more processors; and
computer memory having instructions stored thereon, the instructions, when executed by the one or more processors, to cause the system to perform a method, comprising:
generating a representation of a portion of machine data of a message of a data stream, wherein the data stream is accessed from an ingestion buffer of a data system, the portion of machine data generated by one or more components in an information technology environment;
predicting, based at least on applying the representation of the portion of machine data to an inference model, a sourcetype of the message, wherein predicting the sourcetype of the message using the inference model efficiently processes the message via one or more system components by reducing processing time of the message having an absence of an associated sourcetype or an inaccurate sourcetype;
based on the sourcetype of the message, selecting a set of extraction rules associated with the sourcetype for extraction of a set of values from the message, wherein each extraction rule defines criteria for identifying a sub-portion of text from the portion of machine data of the message to produce a value of the set of values, the value representing the sub-portion of text;
executing the extraction based at least on applying the set of extraction rules to the portion of machine data of the message to produce a result set that indicates the set of values identified using the set of extraction rules; and
based on the sourcetype and the set of values indicated by the result set, executing at least one action that includes routing, via a router, one or more messages associated with the sourcetype from the data stream to one or more endpoints associated with the sourcetype, wherein the at least one action is based at least in part on comparing a number of fields of the result set identified using the set of extraction rules to a number of fields associated with the sourcetype, and wherein at least one endpoint comprises a field-searchable data store and the message is stored in the field-searchable data store as an event that is accessed from the field-searchable data store responsive to a search query containing a criterion for a field being executed against the event in the field-searchable data store to cause comparison between the criterion and values extracted from the event by an extraction rule defining the field.

19. The system of claim 18, wherein the at least one action includes assigning the sourcetype to the message.

20. The system of claim 18, wherein the at least one action includes assigning a different sourcetype to the message.

21. The system of claim 18, wherein the at least one action includes modifying a confidence score associated with the sourcetype.

22. The system of claim 18, wherein the at least one action includes adjusting inference data used by the inference model, the adjusting causing adjustment to inferences of sourcetypes made by the inference model.

23. The system of claim 18, wherein the result set includes a count of elements in the set of values and the at least one action is based at least in part on the count.

24. One or more non-transitory computer-readable media having instructions stored thereon, the instructions, when executed by at least one processor of at least one computing device, to cause the at least one computing device to perform a method, comprising:
generating a representation of a portion of machine data of a message of a data stream, wherein the data stream is accessed from an ingestion buffer of a data system, the portion of machine data generated by one or more components in an information technology environment;
predicting, based at least on applying the representation of the portion of machine data to an inference model, a sourcetype of the message, wherein predicting the sourcetype of the message using the inference model efficiently processes the message via one or more system components by reducing processing time of the message having an absence of an associated sourcetype or an inaccurate sourcetype;
based on the sourcetype of the message, selecting a set of extraction rules associated with the sourcetype for extraction of a set of values from the message, wherein each extraction rule defines criteria for identifying a sub-portion of text from the portion of machine data of the message to produce a value of the set of values, the value representing the sub-portion of text;
executing the extraction based at least on applying the set of extraction rules to the portion of machine data of the message to produce a result set that indicates the set of values identified using the set of extraction rules; and
based on the sourcetype and the set of values indicated by the result set, executing at least one action that includes routing, via a router, one or more messages associated with the sourcetype from the data stream to one or more endpoints associated with the sourcetype, wherein the at least one action is based at least in part on comparing a number of fields of the result set identified using the set of extraction rules to a number of fields associated with the sourcetype, and wherein at least one endpoint comprises a field-searchable data store and the message is stored in the field-searchable data store as an event that is accessed from the field-searchable data store responsive to a search query containing a criterion for a field being executed against the event in the field-searchable data store to cause comparison between the criterion and values extracted from the event by an extraction rule defining the field.

25. The computer-readable media of claim 24, wherein the at least one action includes assigning the sourcetype to the message.

26. The computer-readable media of claim 24, wherein the at least one action includes assigning a different sourcetype to the message.

27. The computer-readable media of claim 24, wherein the at least one action includes modifying a confidence score associated with the sourcetype.

28. The computer-readable media of claim 24, wherein the at least one action includes adjusting inference data used by the inference model, the adjusting causing adjustment to inferences of sourcetypes made by the inference model.

* * * * *